(12) United States Patent
Platt et al.

(10) Patent No.: US 8,375,068 B1
(45) Date of Patent: Feb. 12, 2013

(54) EXTENSIBLE FRAMEWORK AND GRAPHICAL USER INTERFACE FOR SHARING, COMPARING, AND DISPLAYING RESOURCE USAGE DATA

(75) Inventors: Gavin Matthew Platt, Oakland, CA (US); Vladislav Kantchev Shunturov, Sofia (BG); Michael Edward Murray, Oakland, CA (US); John Edmund Petersen, Oberlin, OH (US)

(73) Assignee: Lucid Design Group, LLC, Oakland, CA (US)

( * ) Notice: Subject to any disclaimer, the term of this patent is extended or adjusted under 35 U.S.C. 154(b) by 727 days.

(21) Appl. No.: 12/369,181

(22) Filed: Feb. 11, 2009

Related U.S. Application Data

(63) Continuation-in-part of application No. 11/867,565, filed on Oct. 4, 2007, now Pat. No. 8,176,095.

(60) Provisional application No. 61/028,568, filed on Feb. 14, 2008.

(51) Int. Cl.
*G06F 17/30* (2006.01)

(52) U.S. Cl. ...................................... 707/805; 705/7.29

(58) Field of Classification Search .................. 707/705,
707/805, 999.102, 600–603; 715/700, 741;
705/7.11, 7.29, 7.31, 7.32, 7.33, 7.34, 7.35,
705/7.36, 7.37, 14.12, 14.16, 14.17, 14.19,
705/7.229
See application file for complete search history.

(56) References Cited

U.S. PATENT DOCUMENTS

| | | | |
|---|---|---|---|
| 6,002,398 A | 12/1999 | Wilson | |
| 6,341,270 B1 * | 1/2002 | Esposito et al. | 705/7.35 |
| 7,076,434 B1 * | 7/2006 | Newnam et al. | 705/7.29 |
| 7,076,504 B1 * | 7/2006 | Handel et al. | 705/14.39 |
| 7,823,068 B2 | 10/2010 | Cowtan et al. | |
| 2002/0178047 A1 * | 11/2002 | Or et al. | 705/10 |
| 2003/0126151 A1 | 7/2003 | Jung | |
| 2003/0177176 A1 | 9/2003 | Hirschfield et al. | |
| 2003/0182250 A1 * | 9/2003 | Shihidehpour et al. | 706/21 |
| 2003/0191683 A1 * | 10/2003 | Bailey | 705/10 |
| 2005/0096975 A1 * | 5/2005 | Moshe | 705/14 |
| 2005/0132041 A1 | 6/2005 | Kundu | |
| 2005/0182750 A1 | 8/2005 | Krishna et al. | |
| 2005/0246229 A1 | 11/2005 | Goldstein | |
| 2005/0251440 A1 * | 11/2005 | Bednarek | 705/10 |
| 2006/0178918 A1 * | 8/2006 | Mikurak | 705/7 |
| 2006/0190319 A1 | 8/2006 | Hanswadkar | |
| 2007/0162292 A1 * | 7/2007 | Bell et al. | 705/1 |

OTHER PUBLICATIONS

Clive Thompson, "Clive Thompson Thinks: Desktop Orb Could Reform Energy Hogs", in Wired Magazine, Issue 15.08, Jul. 24, 2007.
"Wattson", printed from www.diykyoto.com/wattson.html (printed on Jan. 8, 2008).
"Wattson—How it Works", printed from www.diykyoto.com/howitworks.html (printed on Jan. 8, 2008).
"Wattson—Features and Benefits", printed from www.diykyoto.com/features.html (printed on Jan. 8, 2008).
"Wattson—Community", printed from www.diykyoto.com/community.html (printed on Jan. 8, 2008).
Da Cruz, Monitoring E-Business Web Services Usage through a Log Based Architecture, Web Services 2004, Proceedings IEEE International Conferences on, Jul. 6-9, 2004, pp. 1-10.

\* cited by examiner

*Primary Examiner* — Greta Robinson
(74) *Attorney, Agent, or Firm* — Raubvogel Law Office

(57) ABSTRACT

A framework and graphical user interface for sharing, comparing, and displaying resource usage data provide for the ability to construct an extensible framework for configuring a graphical user interface (GUI) containing resource usage data pertaining to one or more entities. In various embodiments, the framework enables competitions and comparisons, event tagging, carbon offsetting, or any combination thereof. The framework also makes the GUI available by various means, including Internet distribution. The GUI may take the form of websites, standalone applications, desktop widgets, blog or social networking applications, and the like.

33 Claims, 49 Drawing Sheets

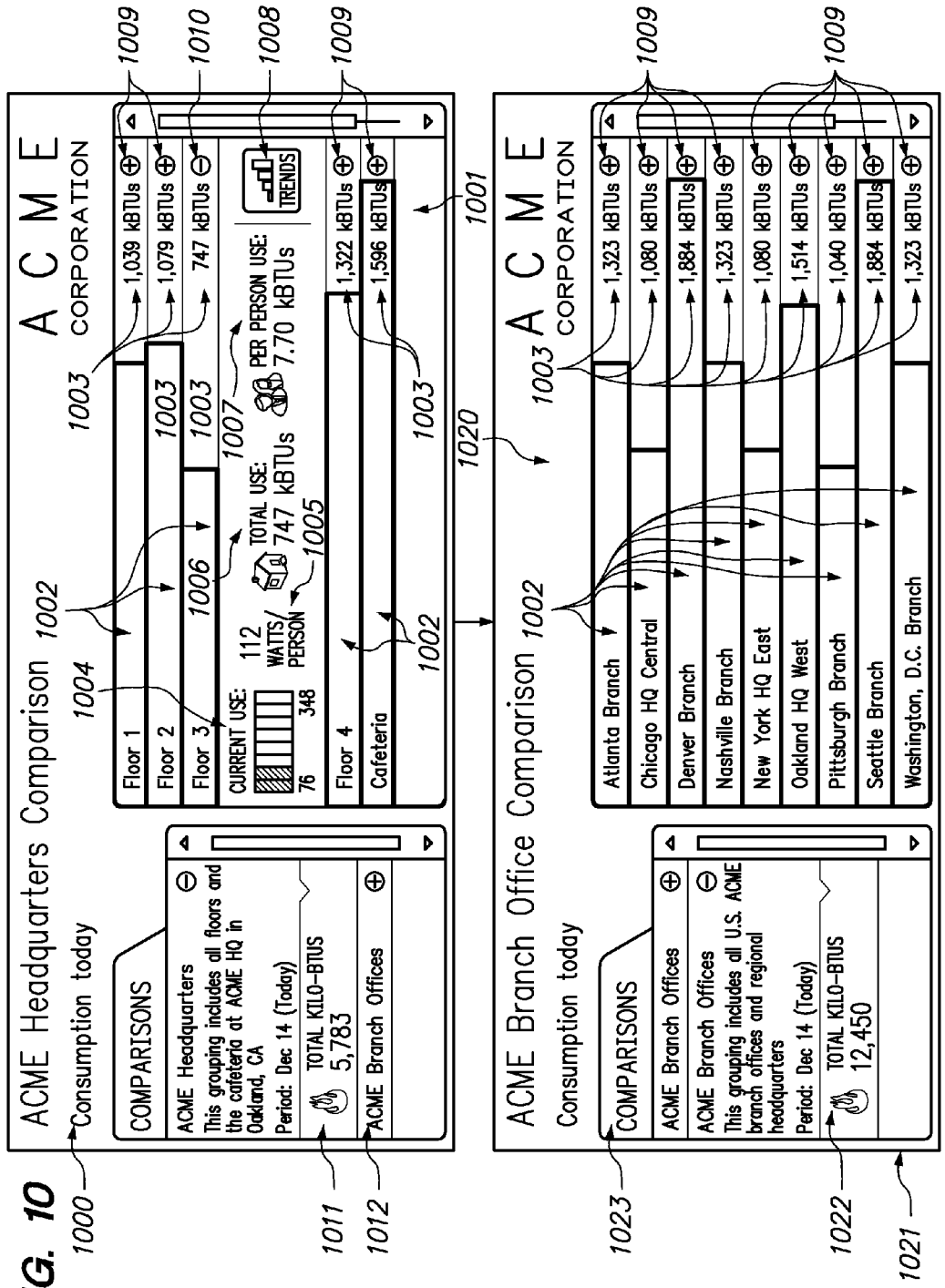

EXTENSIBLE FRAMEWORK AND GRAPHICAL USER INTERFACE FOR SHARING, COMPARING, AND DISPLAYING RESOURCE USAGE DATA

CROSS-REFERENCE TO RELATED APPLICATIONS

The present patent application claims priority from U.S. Provisional Patent Application Ser. No. 61/028,568, filed Feb. 14, 2008, for "Extensible Framework And Graphical User Interface For Sharing, Comparing, And Displaying Resource Usage Data", which is incorporated herein by reference.

The present patent application also claims priority as a continuation-in-part of U.S. Utility patent application Ser. No. 11/867,565, filed Oct. 4, 2007, for "Collecting, Sharing, Comparing, and Displaying Resource Usage Data", which is incorporated herein by reference.

FIELD OF THE INVENTION

The present invention is related to systems and methods for presenting data showing comparative resource usage, and more particularly to an extensible framework and user interface that facilitates the sharing, comparing, and displaying of such data.

BACKGROUND OF THE INVENTION

Consumers of resources often have economic and/or environmental incentives to engage in conservation. Many such resources, such as electricity, natural gas, and water are scarce and/or expensive; in addition, their use can have negative environmental consequences. Increased awareness of the environmental and economic impacts of resource usage has caused individuals, organizations, and governments to engage in efforts to reduce consumption through a wide variety of resource-saving and renewable energy technologies. Examples include photovoltaic and solar thermal panels, energy-efficient heating systems, water- and power-conserving appliances and equipment, and the like. In addition to the incorporation of efficient or renewable energy technology, consumer behavior plays a critical role in resource use. Changes in behavior can substantially reduce resource use.

In the description provided herein, the terms "user", "customer", and "entity" are used interchangeably to refer to either an individual user or a group of users. A "user", "customer", or "entity" may therefore include any or all of an individual user, household, company, organization, or any definable groups (which may be defined according to any relevant criteria, such as for example social, economic, geographic, demographic, and/or other criteria).

Conservation efforts are more effective when entities receive tangible feedback showing them the results of their efforts. Traditionally, such feedback has been limited and nonspecific; often, the only feedback an entity receives is the monthly utility bill. Without more specific information, a homeowner, renter, business owner, or other defined group might experience changes in their utility bill from one month to the next without knowing which appliances, usage patterns, or choices are responsible for the changes. Some entities, such as those whose utilities are paid by others, receive no feedback on their resource usage at all. With limited or non-existent information the entity is unable to effectively isolate and identify appliances and/or equipment that are responsible for the greatest resource usage. Conservation efforts are greatly hampered by this lack of information.

It is also useful for entities to see how their resource usage compares against that of others. Entities may be interested in comparing their resource usage against any of a variety of benchmarks, including their own historical usage and/or usage of other entities, including for example, average use by all similarly defined entities, average use by a similar demographic of consumers within a comparable geographic or climatic region, a cross-section of similar entities, a specific community of other entities, and the like. In some circumstances, it may be useful and desirable for entities to compete against each other to minimize resource use. Existing resource usage monitoring technologies typically lack a mechanism for an entity to compare its resource usage with that of other entities. Visual comparison of resource usage by an entity with that of other entities is useful both at an instant in time and as a comparative trend of resource use over time.

An entity may also wish to make its resource usage data public, or to share it with certain other entities, for example in a social network, website, newsgroup, or other forum. Publication of such data may be useful for social purposes, for marketing purposes, or to motivate members of one's own group and other groups to increase their conservation efforts. Existing resource usage monitoring techniques generally do not provide effective, intuitive, and convenient mechanisms for sharing data in this manner.

Entities may also wish to compare a current temporal pattern of usage with a previously established temporal pattern of usage over either a defined time period (e.g. this week with last week) or with a long-term pattern of usage over similar time periods (e.g. hourly usage for this week compared with hourly usage for all previous week at this particular time of day or during this particular season). This may help identify the effect of certain events or changes on energy usage. Existing resource usage technologies do not provide an easy way to compare temporal patterns in this way; it is therefore difficult for entities to establish a cause-and-effect relationship that can help improve understanding of the effectiveness of resource conservation efforts.

Existing resource usage monitoring products fail to provide features to address these needs. Kill A Watt is an electricity usage monitor, available from P3 International Corporation of New York, N.Y., providing functionality for measuring resource usage of individual plug loads or appliances. TED (The Energy Detective) is an electricity monitor, available from Energy, Inc. of Charleston, S.C. and described at www.theenergydetective.com, providing electricity usage information on an in-home digital readout. The PowerCost Monitor, available from Blue Line Innovations, Inc. of St. John's, Newfoundland and Labrador, Canada, provides electricity usage information on a similar hand-held readout. None of these products provides a comprehensive mechanism or framework for collecting, displaying, sharing, and comparing resource usage data. Nor do these products offer a computer interface allowing an entity to mark an event (such as the install date of a device, or the time and date of a social event) and compare pre-event usage with post-event usage.

More generally, existing resource usage monitoring products fail to provide an extensible framework for rapidly developing, modifying, and configuring custom user interfaces enabling the sharing of resource usage data.

What is needed, therefore, is a system and method for implementing and supporting an extensible framework that can be utilized for developing, modifying, and configuring custom user interfaces. What is further needed is a mechanism to facilitate the development of custom user interfaces in a manner that is efficient and easy-to-use.

SUMMARY OF THE INVENTION

According to various embodiments of the present invention, a framework and graphical user interface for sharing, comparing, and displaying resource usage data are provided. The invention provides for the ability to construct an extensible framework for configuring a graphical user interface (GUI) containing resource usage data pertaining to one or more entities. Such entities may include, for example, buildings, homes, individuals, social or geographic groups, and/or locales. In various embodiments, the framework enables competitions and comparisons, event tagging, carbon offsetting, or any combination thereof. The framework also makes the GUI available by various means, including Internet distribution. The GUI may take the form of websites, standalone applications, desktop widgets, blog or social networking applications, and the like.

Data collected via resource usage monitoring devices, meters or other data collection systems is transformed and processed, so that it can be displayed within a context that enables competitions and comparisons, event tagging, carbon offsetting, or any combination thereof. In addition, the transformed and processed data can be made available, in the form of interactive reports and GUIs, to a variety of users and entities, either locally or remotely, over a network such as the Internet. If desired, access to these interactive reports and GUIs can be controlled by an authentication mechanism.

The present invention thus provides mechanisms for building a community around publicly displayed resource usage data, so as to provide a public, comparative context that enhances the value of feedback on resource usage and achieves greater resource usage reductions. The present invention also provides mechanisms for configuring and enforcing private access to resource usage data, comparisons, competitions, and the like.

The extensible framework of the present invention enables construction of a user interface by which entities can publish and/or selectively share resource usage data with specified other entities, as well as engage in competition with other entities so as to further encourage resource conservation and responsible usage patterns. The competitions enabled by the present invention serve as a motivational mechanism for reducing resource usage. Entities can share their data in a group environment such as a social network, including 1) specialized social networks designed for sharing resource usage data and/or 2) existing social networks such as Facebook or MySpace.

In various embodiments, the invention includes several components such as a competition module, event tagging module, and carbon offsetting module, which can be implemented singly or in any combination. These and other modules provide a public, comparative context in which feedback on resource usage can be delivered to the user. The framework described herein can be used for rapidly developing custom GUIs that can be modified and configured by an author or administrator and then provided to an end user.

The collection, display, and sharing of information according to the present invention can be implemented using electronic means, such as via a client/server architecture wherein various components communicate with one another using a known network protocol. One example is an Internet-enabled implementation in which communication among components takes place via TCP/IP and HTTP. One skilled in the art will recognize that other implementations are also possible.

As mentioned above, usage reports can be made available via any known delivery mechanism, whether electronic or otherwise. For example, reports can be made available via a display, website, printed report, email, kiosk, voice-based systems, text messages, and the like. Entities can specify what kind of information is collected, how often it is collected, and whether and how it is made available to others. Entities can also specify whether and how they wish to receive usage reports, and whether and how such reports are made available to specified other entities or with the public at large. Reports can be interactive, so that end users can control the type of information displayed and the appearance of the reports.

The present invention provides a framework for building a community around publicly displayed resource usage data. Competitions and comparisons are enabled as a motivational mechanism to encourage reductions in resource usage. Event tagging is a labeling and identifying mechanism that facilitates analysis as to the effect of various events on resource usage. Carbon offsetting is a compensation mechanism that enables balancing of personal carbon-producing actions and events with carbon-offsetting measures.

In various embodiments, the present invention performs any or all of the following functionality:

Provide for an extensible framework that can accommodate and display usage for different types of resources, including any number of unique monitoring scenarios Enable users to link actions and behavior with resource usage data, at specific point(s) in time and/or over a period of time Enable users to share and compare usage information within the context of a community or social network Enable users to share usage information and compete with other people in a public or private community, so as to provide incentives to reduce consumption Enable tagging of events identified as contributing towards increases or decreases in resource consumption Enable accounting for and offsetting of carbon dioxide emissions, including increases and decreases as a result of events, behavior changes and competitions

BRIEF DESCRIPTION OF THE DRAWINGS

The accompanying drawings illustrate several embodiments of the invention and, together with the description, serve to explain the principles of the invention. One skilled in the art will recognize that the particular embodiments illustrated in the drawings are merely exemplary, and are not intended to limit the scope of the present invention.

FIG. 10 includes screen shots depicting examples of user interface screens for multiple-entity comparison of resource usage, according to one embodiment.

DETAILED DESCRIPTION OF THE EMBODIMENTS

The description uses the terms "user", "customer", and "entity" interchangeably to refer to either an individual user or a group of users. A "user", "customer", or "entity" may therefore include any or all of an individual user, household, company, organization, or any definable groups (which may be defined according to any relevant criteria, such as for example social, economic, geographic, demographic, and/or other criteria). Groups may include individuals who do not directly pay utility bills, such as for example renters whose utilities are included in rent payments, employees of companies, and the like.

In the following description of embodiments of the present invention, numerous specific details are set forth in order to provide a more thorough understanding of the present invention. However, it will be apparent to one skilled in the art that the present invention may be practiced without one or more of these specific details. In other instances, well-known features have not been described in detail to avoid unnecessarily complicating the description.

For illustrative purposes, the present invention is described in terms of displays of resource usage. One skilled in the art will recognize that the invention can be applied to any type of resource. Examples include electricity, water, natural gas, and other resources that are consumed. Resource production can also be monitored, such as for example electricity that is produced (e.g., via photovoltaic panels) and water that is saved or recycled. "Usage" therefore refers to a net positive consumption level (consumption, or production plus consumption) and/or a net reduction level (reduced consumption, or savings relative to a baseline period).

In addition, the drawings and descriptions present several examples of interactive displays, web pages, and user interfaces. These are provided for illustrative purposes only. One skilled in the art will recognize that many other layouts, arrangements, visual elements, features, widgets, and interactive components may be provided without departing from the essential characteristics of the present invention as set forth in the claims. One skilled in the art will further recognize that the particular elements and arrangements of elements depicted are merely illustrative and that any particular element may be moved, changed, or deleted without departing from the essential characteristics of the present invention as set forth in the claims.

System Architecture

Figure 1A:
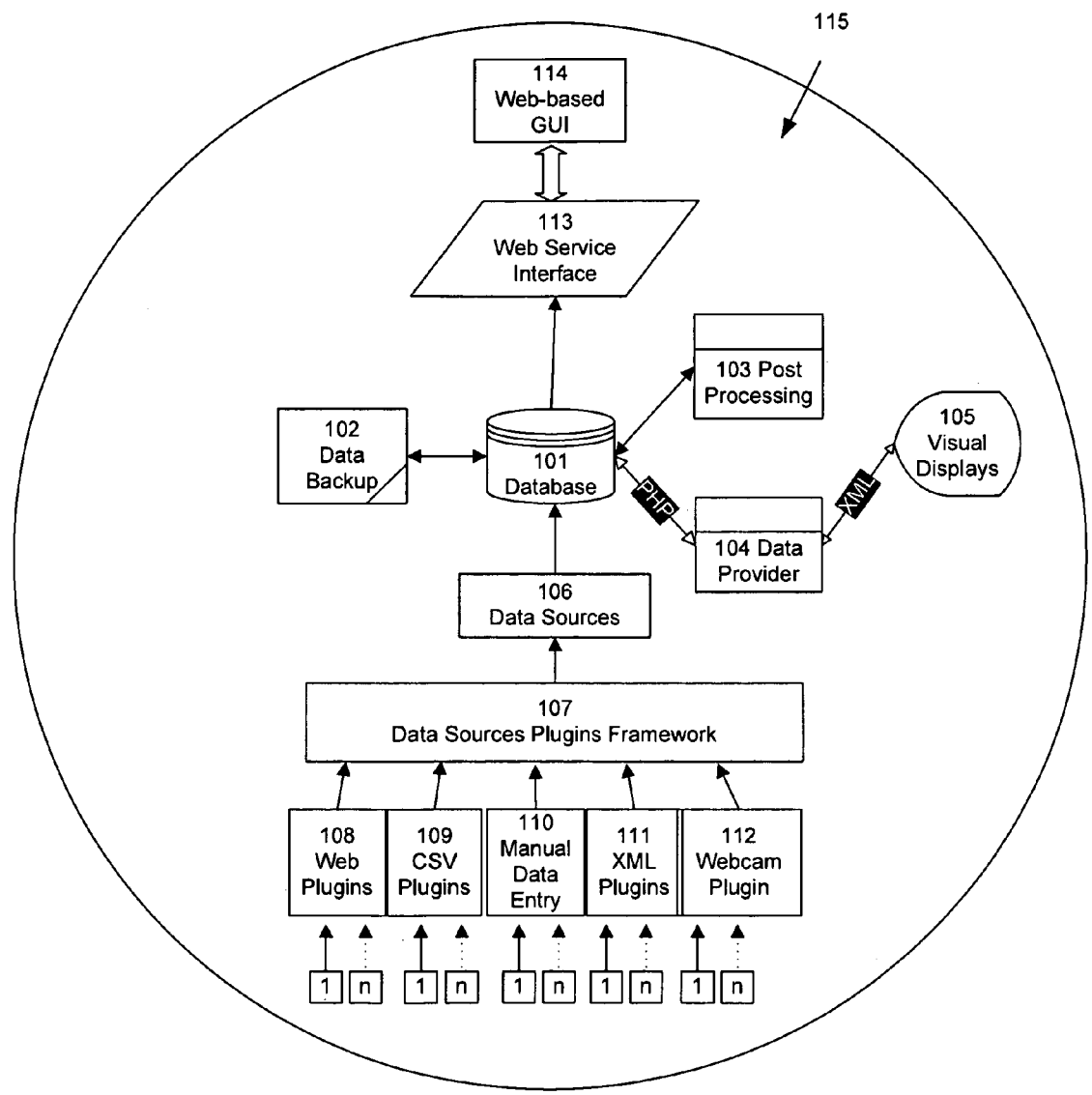
FIG. 1A is a block diagram depicting a server-side architecture for practicing the present invention according to one embodiment.

Referring also to FIG. 1A, there is shown a block diagram depicting a server-side architecture for practicing the present invention according to one embodiment. In one embodiment, the components of FIG. 1A are implemented as a hosted service 115 running, for example, on a server. The various components can be implemented as part of such a server or as separate elements that are communicatively coupled with one another.

Database 101 is an electronic data storage mechanism that includes records describing resource usage for various entities such as individuals, households, organizations, companies, and the like. A mechanism can be included for periodically copying database 101 or portions thereof to a data backup storage area 102.

Resource usage data for database 101 is collected from various data sources 106, which in turn collect usage data by monitoring meters, receiving user input, receiving data records from other sources, and the like. In one embodiment, a data sources plug-in framework 107 is provided to act as an interface for providing data in a format that can be transformed, normalized and stored in database 101. Framework 107 enables the receiving and/or collecting of data from various sources including, for example and without limitation:

- web plug-ins 108 for collecting data via HTTP or other web-enabled services;
- CSV plug-ins 109 for collecting data from comma-separated-value format or other delimited format;
- manual data entry 110 for receiving data entered manually;
- XML plug-ins 111 for collecting data in XML format;
- webcam plug-ins 112 for collecting and interpreting data from a webcam-type source; and
- plug-in for receiving data pushed by a data source over TCP or UDP network protocol(s), either in binary or plain text encoding (the plain text encoded data can be formatted either as key-value pairs, XML, or CSV format).

Any or all of the sources can include any number of instances.

Figure 1B:
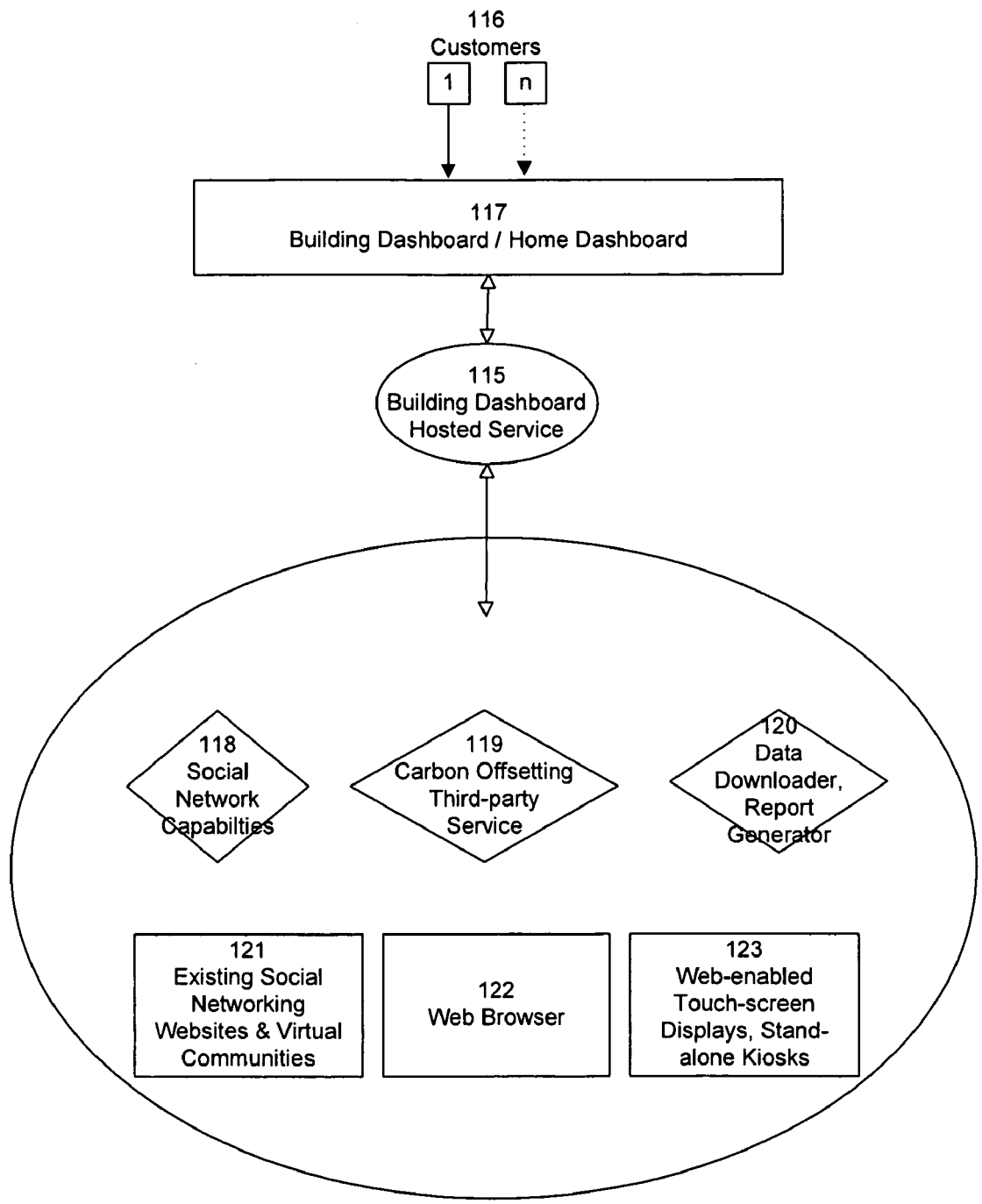
FIG. 1B is a block diagram depicting a client-side architecture for practicing the present invention according to one embodiment.
Figure 1C:
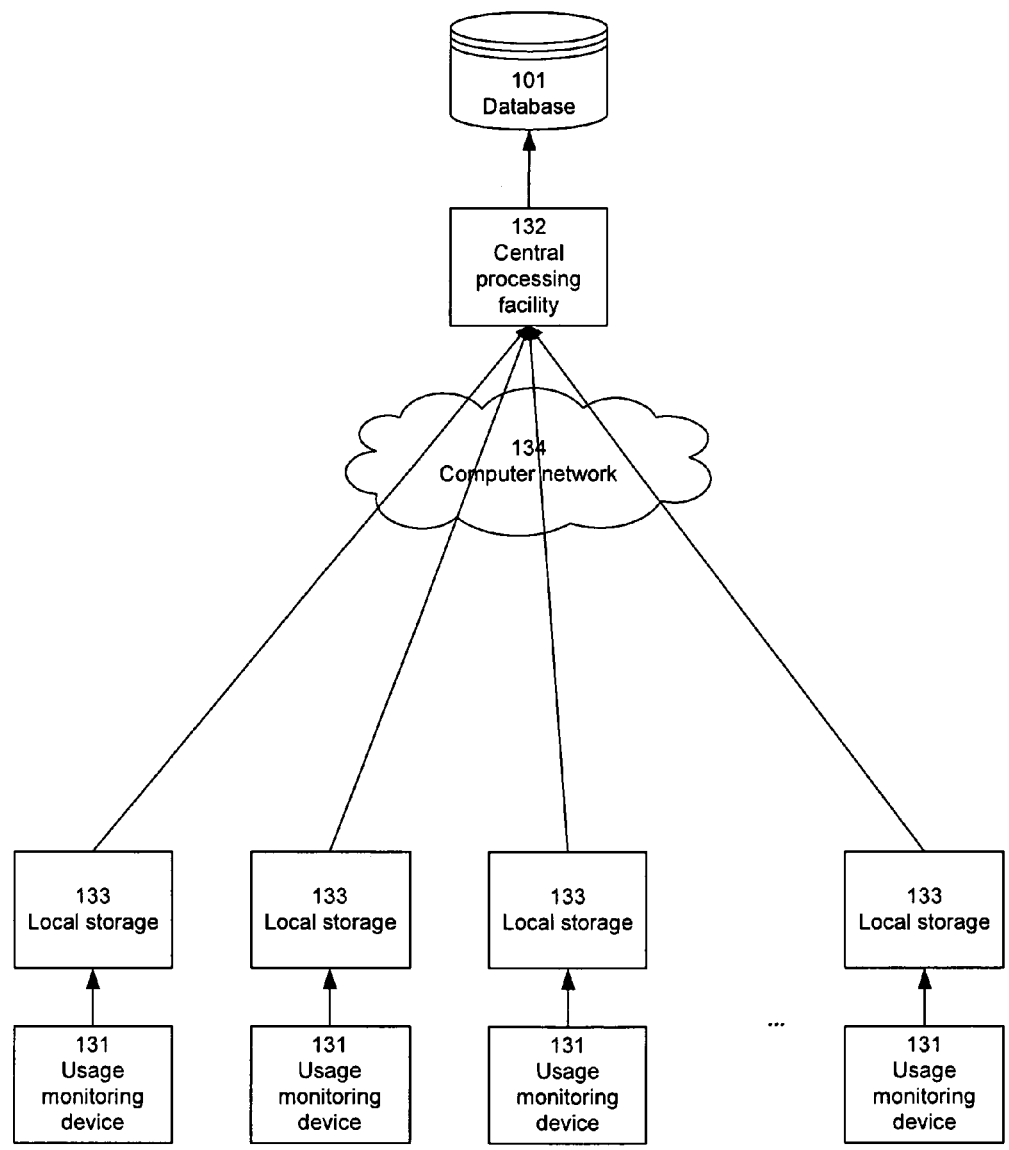
FIG. 1C is a block diagram depicting an architecture for collecting usage data according to one embodiment.
Figure 1D:
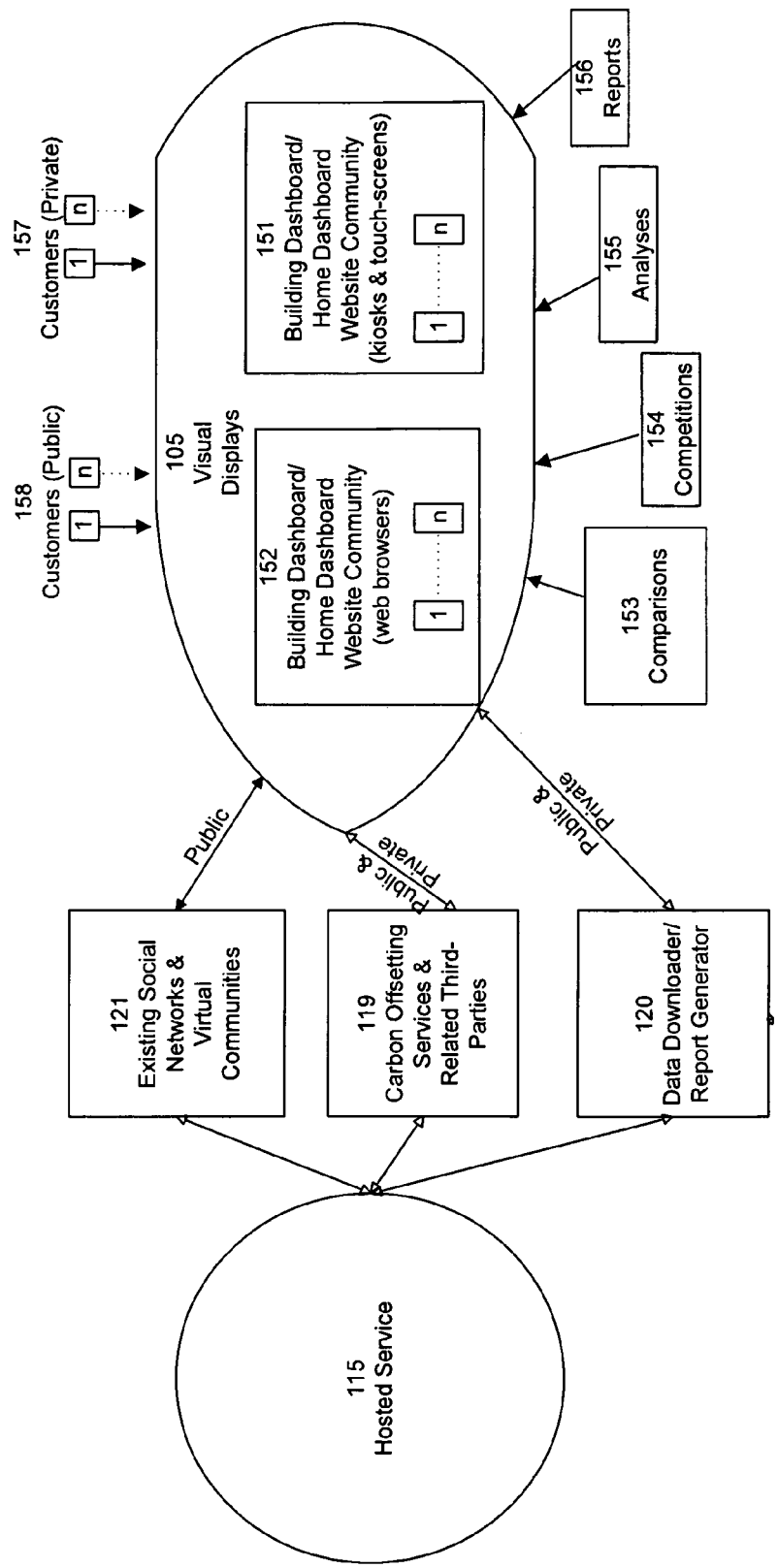
FIG. 1D is a block diagram depicting an architecture for transforming and sharing resource usage data among entities according to one embodiment.

Referring now to FIG. 1D, there is shown a block diagram depicting an architecture for transforming and sharing resource usage data among entities according to one embodiment. Hosted service 115 is the server-based architecture as depicted in FIG. 1A. Hosted service 115 interfaces with existing social networks and virtual communities 121, carbon offsetting services and related third parties 119, and/or data downloader/report generator 120. Each of these components provides data for transformation and display on visual displays 105. Visual displays 105 provide comparisons with data from various sources, including public data 158 from customers or other entities, private data 157 from customers or other entities, comparisons 153, competitions 154, analyses 155, and reports 156. Visual displays 105 can include, for example, a dashboard website 152 visible via a browser, and/or a dashboard website 151 visible via kiosks and touchscreens.

In one embodiment, data collection and transformation takes place automatically and without user intervention. Referring now to FIG. 1C, there is shown a block diagram depicting an architecture for collecting resource usage data. Resource usage monitoring devices 131 are placed wherever convenient to measure usage. For example, electricity usage data can be collected by power meters located on site where the electricity is being used. Data from monitoring devices 131 is uploaded to a central processing facility 132 for aggregation and storage in database 101. In one embodiment, data is stored locally at or near monitoring devices 131, in a local storage device 133 such as flash memory, RAM, or a hard drive; periodically, data is transmitted from local storage device 133 to central processing facility 132. An entity can specify the frequency with which data are transferred, or can specify that data transfer is to be triggered in response to occurrence of certain events. Data transfer from devices 131 and/or from local storage device 133 to central processing facility 132 can be accomplished using any known data transmission technique, for example via a computer network 134 such as the Internet or other means.

In an alternative embodiment, devices 131 do not store any data locally; rather, devices 131 push data to central processing facility 132, either in response to a trigger event or according to a predefined schedule. In such an embodiment, local storage 133 may be omitted.

Post processing module 103 transforms and processes usage data in database 101 according to techniques that are described in more detail below. Such activity can include, for example, comparison, aggregation, normalization, and the like. Data provider 104 extracts processed usage data from database 101 to generate visual displays 105 for presentation to entities. In one embodiment, data provider 104 obtains data via the PHP scripting language, and data provider 104 provides data to the visual displays 105 via XML. Visual displays can then be presented using any technology capable of reading XML.

In one embodiment, web service interface 113 is provided to allow web-based access to database 101 via a graphical user interface 114. In this manner, users and administrators can view and edit data in database 101 and control other operations associated with the collection and display of resource usage data.

Referring now to FIG. 1B, there is shown a block diagram depicting a client-side architecture for practicing the present invention according to one embodiment. In one embodiment, dashboard 117 is provided, to act as a user interface for interacting with hosted service 115. Customers 116 are thereby able to access their data via dashboard 117 which in turn communicates with hosted service 115. In one embodiment, dashboard 117 is able to interact with various third-party features such as social network capabilities 118, carbon offsetting services 119, and data downloading and report generation services 120.

Other mechanisms are also provided for displaying usage data, as shown in FIG. 1B. As will be described in more detail below, usage data can be displayed in the context of existing social networking websites and virtual communities 121. Also, usage data can be shown in a web browser 122, displays and kiosks 123, and the like.

Operation of the Invention

The system and method of the present invention provide a framework and graphical user interface for allowing users to view, share, and compare resource usage data. The display of such resource usage data, along with the comparative mechanisms, can be provided via any known display device, including for example a computer display, mobile device, or other electronic, analog, or digital medium. For illustrative purposes, the invention is described herein in the context of a display shown on a personal computer, wherein data is transmitted over a computer network such as the Internet, using known techniques. One skilled in the art will recognize, however, that other display mechanisms and communication mechanisms are possible without departing from the essential characteristics of the present invention. In one embodiment, the extensible framework of the present invention is implemented as part of web service interface 113 and graphical user interface 114 as depicted in FIG. 1A.

Using the interface, users may share resource usage data with other users. Users may also compare usage with other individuals or groups, within a given building or area of a building, among buildings, or within or among social or geographic groups or locales. Users may also publicly or privately compare and compete with individuals, groups, buildings, or other entity formations to reduce resource usage by a given amount, to remain within a given consumption range, or to meet a resource usage or reduction target. Users may also compete with themselves to remain within a resource usage budget or to meet a reduction target. A social or geographic group can include any definable group, such as a business, institution, home, friends, family, coworkers, public utility district, municipality, ZIP code, city, state, region, or other social organization or locale.

The invention provides for the ability to tag, label, or categorize events associated with past and present data at a given time or over a given time interval. Data are manually or automatically associated with events by way of either directly or indirectly interacting with a graphical representation of the data, such as a time series graph, or a user input form. The interface allows users to track, make available, trade, or purchase carbon offsets for the purpose of offsetting the negative environmental impact of their or other users' resource usage. Furthermore, the interface provides a conduit for commenting, supplying suggestions, and exchanging other information with users in a forum-like environment.

The system of the present invention is implemented, in one embodiment, with a back end support mechanism characterized by a high degree of customizability and ease of deployment. The GUI, or front end, is characterized by a high degree of customizability, clarity, and interpretability for non-technical end users. The back end can be used to construct the front end in a top-down fashion led by an author or administrator, or the back end can be configured via the front end in a bottom-up fashion led by an end user, such as in the "wizard" for defining a competition within the competition module. In the latter example the end user serves the role of administrator in customizing and constructing resource usage displays. In one embodiment, the specific kinds of content, or "modules," that comprise the interface are assembled from a library of available modules based on an administrator's or user's settings.

The invention allows an administrator or end user to specify resource usage data modules or other non-resource usage modules for display. Data are specified by data location as in a database or by manual input. After specifying or selecting a resource, any number of variables can be chosen to transform, modify, and/or enhance the display of resource usage data. These variables include various time scales, unit equivalents, and social and geographic viewpoints for manipulating the data presentation, as well as size, colors, display format (e.g., website, desktop widget, blog or profile post), or variables that further customize the display (e.g., zip code, energy cost, regional fuel mix). Viewpoint displays resource usage data at various resolutions, including but not limited to per locale, per organization, per building, per floor, per person, or per square foot. A viewpoint is, in one embodiment, a predefined resolution of monitored usage that is observed at the level of a whole building, floor(s) or area(s) of a building, and social or geographic groups associated with buildings or networks of buildings, or by end use. For example, headquarters, billing department, floors 1 & 2, San Francisco & New York offices, lighting or electricity use, and the like. More generally, a viewpoint can be any indication of monitored usage at a particular resolution level and/or associated with a particular subset of resource users (and/or producers).

User Interface

In one embodiment, the system of the present invention implements a framework containing a plurality of configurable modules which can be loaded into web-based graphical user interface 114. Each module is accompanied by an iconographic button, text link, or numeric readout of resource usage on a menu from which each respective resource usage data section, or data "module," is selected and loaded. One skilled in the art will recognize that other types of indicators of resource usage can be used. Users may view resource usage data in the form of charts, graphs, numeric readouts, color gradients, and other visual representations. Users may also select from the variety of variables mentioned above to modify and enhance the display of resource usage data. Resource usage data can be compared with that of other users by way of menus, building maps, geographic maps, or the like, that allow other users or entities to be selected for comparison.

For example, described here is one possible methodology by which a resource usage competition might take place between or among users according to an embodiment of the present invention. A user clicks on an icon representing the competition module, which loads into place in the interface. The user then selects a friend or coworker from a list against which to privately or publicly compete. The user 1) specifies the beginning and ending date of the competition, 2) specifies the baseline period for comparison against which changes in use will be measured, 3) selects the desired reduction goal based on previous usage patterns, the ideal amount of usage over a given timescale, and the method for comparison (e.g., overall relative rank or standing, percent reduction, total reduction, greatest reduction within a one-day period, etc.), and 4) supplies a message to accompany the request. The reduction target can be set by way of interacting with a comparative graph showing the usage of the users or may be selected from a list or inputted manually. The user has the option of publishing the interface to other locations, such as a blog or social networking site, where anyone can view the performance of those competing at any given time.

DETAILED DESCRIPTION OF THE DRAWINGS

Figure 1E:
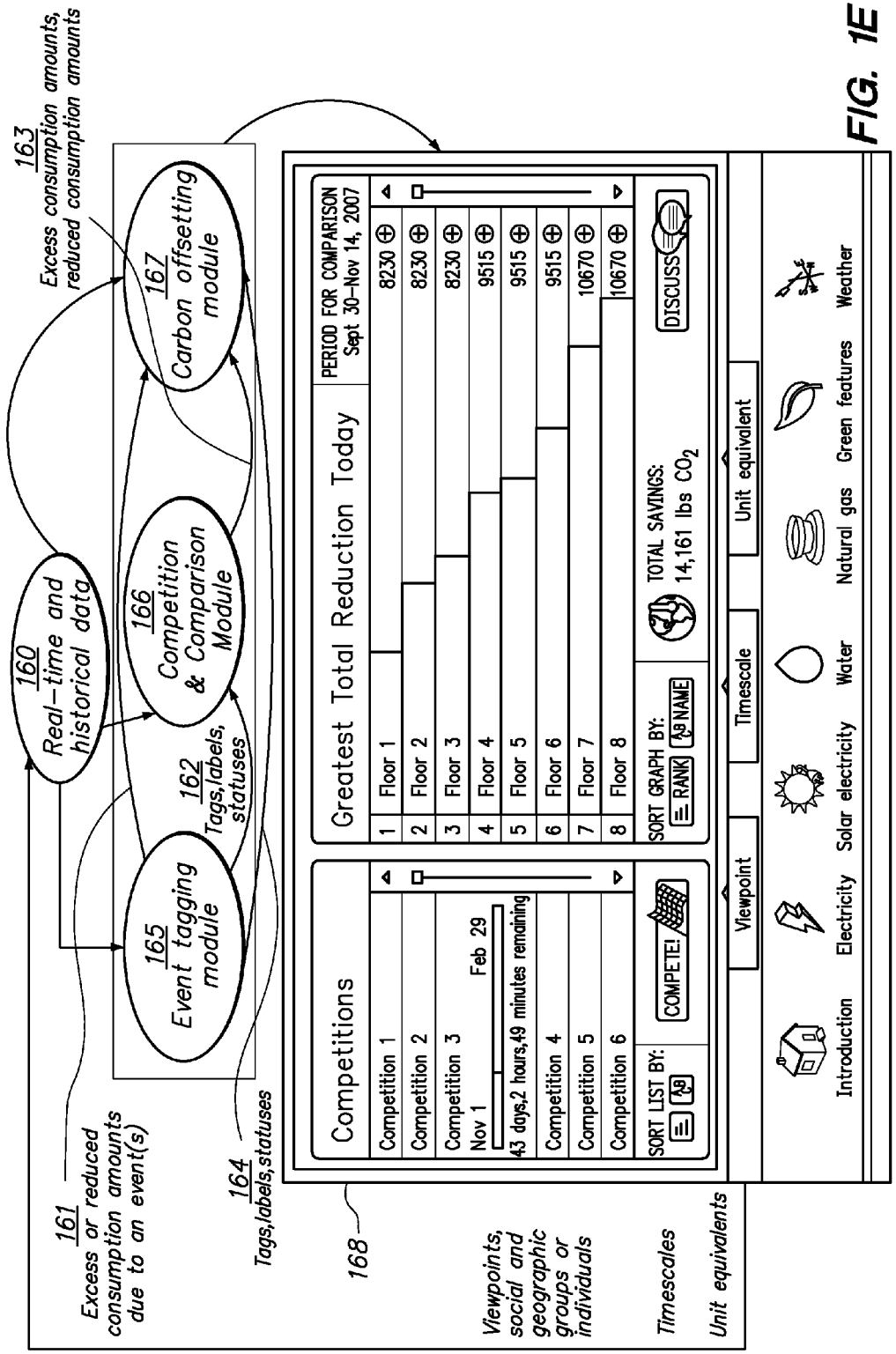
FIG. 1E is a block diagram depicting an overall functional architecture for the system of the present invention according to one embodiment.

Referring now to FIG. 1E, there is shown an overall functional architecture for the system of the present invention according to one embodiment, showing how event tagging module 165, competition and comparison module 166, and carbon offsetting module 167 interact with one another. In one embodiment, the functional architecture depicted in FIG. 1E is implemented using some combination of the physical architectures depicted in FIGS. 1A through 1D. Thus, the modules depicted in FIG. 1E are implemented in computer systems or other electronic systems operating under the direction of software applications.

Event tagging module 165 is an interface providing for the ability to allow an individual, group end user, and/or administrator to tag, label, or categorize events associated with past, present, and expected future data at a given time or over a given time interval. Events are defined, for example, as observed changes, outcomes, episodes, or recurring changes, outcomes, episodes that contribute in whole or in part to increases, decreases, or no changes in resource usage or production. Operation of event tagging module 165 is described in more detail below in connection with FIGS. 3A through 3B.

Competition and comparison module 166 is an interface providing for the ability to allow an individual, group end user, and/or administrator to privately or publicly compete with either identified or anonymous individuals or members of a given group or network to reduce resource usage. In one embodiment, competition and comparison module 166 also enables comparisons outside the context of a competition.

Carbon offsetting module 167 is an interface providing for the ability for end users to track, make available, and purchase carbon offsets for excess consumption or convert and sell certificates or green attributes for reduced consumption in a marketplace or auction, or through a third party such as TerraPass or CarbonFund.

The various modules 165, 166, and 167 operate in connection with one another. In one embodiment, all modules 165, 166, and 167 receive real-time and historical data 160 from a measurement source or from a source of stored data. Furthermore, modules 165, 166, and 167 exchange data with one another to enable operation of the system.

For example, event tagging module 165 transmits, to carbon offsetting module 167, data describing changes in usage, including excess and/or reduced usage amounts due to one or more events. Event tagging module 165 also transmits, to competition and comparison module 166, descriptions of tags and labels corresponding to events, as well as statuses of various events, for use in generating comparison and competition displays. Competition and comparison module 166 in turn transmits, to carbon offsetting module 167, data describing excess and/or reduced usage amounts, so that module 167 can use such data in managing carbon offsets.

Modules 165, 166, and 167 work together to transform the collected data and generate dashboard user interface 168, so as to present resource usage data in various ways. For example, dashboard UI 168 can display ongoing competitions and results, and can provide the user with various ways to interact with other users and with the system as a whole, as described in more detail below. Using dashboard UI 168, the user can also specify viewpoints, social and geographic groups, and/or individuals for comparison or competition, and can configure time scales and unit equivalents as desired. Based on such configuration data, appropriate data 160 is collected, processed, and transformed by modules 165, 166, 167 to generate dashboard 168. As discussed above, a viewpoint can be any indication of monitored usage at a particular resolution level and/or associated with a particular subset of resource users (and/or producers).

Competition and Comparison Module

Referring now to FIGS. 2A through 2G, there is shown a flow diagram depicting operation of competition and comparison module 166 according to one embodiment, allowing an individual, group end user, and/or administrator to configure and/or engage in private and/or public competitions with either identified or anonymous individuals or members of a given group or network to reduce resource usage. Module 166 also allows configurations of comparisons among entities outside the context of competitions.

In one embodiment, data describing each competition is stored in database 101, which may take the form of any electronic storage medium. Such data includes, for example, any or all of the following fields:
  Competition name,
  entity (data point names+proxies),
  yes/no approval from admin (optional),
  private/public,
  compare/compete mode,
  graphical presentation mode,
  rank and sort (increment depending on last to expire, best performance, alphabetically, etc.),
  baseline start/end date and time,
  duration start/end data and time,
  # occupants,
  # sq. ft.,
  final total usage/savings,
  final per person usage/savings,
  expiration date or duration (for being unlisted with completed competitions listing),
  incentive,
  notification settings (throughout competition/only post-competition summary, frequency/threshold at which notifications take place),
  discussion ID (for relating posts to this competition),
  color manager class ID (for saving color settings),
  admin ID (for identifying admin who set up competition).

In one embodiment, the system of the present invention enables discussions among users or other entities. Database 101 or other data storage component can store, for each discussion post, any or all of the following fields:
  Post title (optional),
  message body,
  submitter name/anonymous,
  thumbs up/down,
  % relevance or validity (optional or derived),
  time submitted,
  discussion ID.

In one embodiment, database 101 or other data storage component stores an admin profile for each user or entity that has administrative privileges. Appropriate authentication mechanisms can be put in place to control access to administrative functions. The profile can store, for example, any or all of the following fields:
  Username,
  password,
  real name,
  recipient e-mail contact list fields,
  admin ID.

In one embodiment, module 166 presents a main screen 217. From this main screen 217, a user can select a competition panel 210 or a scorecard panel 218. Competition panel 210 provides access to a listing 201 of various competitions, including competition name, start/end date and time, time remaining until competition begins/ends, and the like. Competition panel 210 also provides access to buttons 209 for launching a new competition, for viewing and/or posting discussions, and the like.

Main screen 217 also provides access to scorecard panel 218. Scorecard panel 218 provides any or all of the following features:
  search box 211 where the user can enter queries to find particular users, entities, and the like;
  header 212 showing overall savings and/or usage for an entity or combination of entities;
  footer 213 depicting a baseline period and specifying units of expression;
  proxy name 214 for a point, and performance data;
  resource usage statistics 206, including for example percentage reduction or increase, total savings and/or usage, per person savings and/or usage, number of occupants, number of square feet, number of discussion posts, number of tagged events, and the like.

In one embodiment, a baseline is a calculation serving as a comparison or control, consisting of two parts: 1) a range of time during which usage data has been monitored in the past, and, additionally, 2) an optional method for normalizing or standardizing performance based on a number of factors, including building infrastructure characteristics, per person or per square foot consumption, relative average usage within a locale or similar social or geographic group, and weather conditions.

Module 166 also provides access to discussion panel 241, which may be displayed on any part of the interface, for example overlapping an existing portion of the display such as scorecard panel 218. A "post message" button can be displayed. The user can post a message by clicking on a button. A message post interface 243 is provided, wherein the user can input a title, message, name (if desired), thumbs up/down, percentage relevance, and/or any combination thereof. Once a message has been posted, the user is returned to discussion area 241. In one embodiment, a close button is presented, to allow the user to close discussion area 241.

Certain functions may be made available only to administrators and/or other individuals that have appropriate credentials for authenticated access to the system. Accordingly, in one embodiment module 166 provides access to a login screen 246 that allows a user or administrator to provide a login name and password. As will be recognized by one skilled in the art, any known authentication means can be used, including biometrics, physical security, password protection, encryption, identification cards, and the like. Functionality may also be provided for creating 245 new administrator accounts.

In one embodiment, only administrators can edit existing competitions. Accordingly, once an administrator has logged in and been authenticated, an "admin" or "edit" button 247 can be presented at the top of a competition panel. The administrator can select 248 a competition to modify. At that point, the scorecard panel area shows 249 those parameters that can be modified, such as for example the name, baseline, duration, entities, and the like. A button or link can also be provided for canceling the competition. Once the administrator confirms his or her changes, cancellations, and the like, the competition panel is updated 250 accordingly.

In one embodiment, module 166 provides access to a linearly directed user interface, referred to as a "wizard", for configuring competitions. In one embodiment, the wizard takes the user through four major steps:
  specification 219 of participants, comparison, and presentation (described below in connection with FIG. 2C), specification 251 of baseline, duration, and incentive (described below in connection with FIG. 2D), specification 271 of notification options (described below in connection with FIG. 2E), and specification 287 of additional publication methods (described below in connection with FIG. 2F).

Auxiliary functionality may also be provided for specifying comparisons outside the context of competitions, as described in connection with FIG. 2G.

In step 1, the user is given an opportunity to specify 219 participants, comparison, and presentation of the competition. The user specifies the resource usage data to be compared, for example by selecting any of the following, alone or in any combination:

data point name and default proxy name 220 (as discussed above, a proxy name is a name assigned to a data point or group of points in order to more easily identify and describe the point(s));

data point name with newly assigned proxy name for point or point group 221;

previously saved proxy name or group 222.

The user can also select 223 between competition mode and a comparison mode, wherein resource usage is compared without a competition. The user can also specify 230 certain goals for the competition, including for example, total reduction, percentage reduction, target low within some time period (such as 24 hours, a week, a month, or the like), or some custom metric incorporating any desired combination of reduction measurements.

The user can also select 224 whether the competition will be publicly viewable.

The user can also select 229 a graphical presentation mode. This can include any form of display, such as bar graphs (standard columns and/or points), time series graphs (lines and/or points), and/or any other graphs or custom presentation modes. The user can also use a color manager class 234 to specify various output options. For example, the user can assign 235 color gradients or other visual elements according to percentage reduction, total usage, fraction of total bars being shown regardless of performance, relation to social/geographic group usage, and/or the like. Alternatively, the user can specify that some predetermined color pattern be used, such as alternating colors or a uniform color.

In step 2, the user is given an opportunity to specify 251 baseline, duration, and incentive. This includes selecting 252 a starting and ending baseline period, or using a default. The user can also select 253 a baseline calculation method, including for example:

average value over baseline period;

daily average for each day (or other period) within the baseline period;

overall average since some initial time; and/or a custom metric.

The user can also select 261 a baseline entity, or comparison point, for the competition. This can include, for example:

the user's building or home, or a friend or virtual neighbor, or other social entity;

a community average or social/geographic group average; or a standardized average, based on any known factors such as square footage, occupancy, building characteristics, building type or function, weather conditions, and the like.

The user can also select 258 starting and ending points for the duration. The user can also specify 259 an incentive for the competition, such as winnings and/or a prize. The user can also specify 260 an expiration date or duration for competition results.

In step 3, the user is given an opportunity to specify 271 notification options, so as to indicate who will be notified of competition results, and what type of information will be sent to those individuals being notified. This includes specifying 272 any or all of sender name, message, and recipient e-mail addresses. The notification messages can automatically include start/end period and other information as appropriate. If desired, the user can select 273 recipient email addresses from a contact list.

The user can also specify 278 the type of notifications to be sent. For example, the user can specify that, at the end of some period of time (for example, when the competition is completed), a message should be sent to the specified recipients, including a summary of results. Alternatively, or in addition to the end-of-period notification, messages can be sent to recipients throughout the period. The user can specify the frequency at which notifications are sent, or can specify thresholds or trigger events that cause notifications to be sent. Notifications can include any desired information, including for example:

current rankings;

status report;

total and/or percentage reduction needed to improve ranking;

personalized recommendations and/or tips based on analysis of current and/or previous performance.

In step 4, the user is given an opportunity to specify 287 additional publication methods. For example, the user can specify 288 that competition results are to be published via a public or private widget, on a website, blog, social networking profile, virtual community, or any combination thereof. The user can also specify the type of information that is published. The user can also specify 289 publication via a widget or application for a desktop computer, cell phone, PDA, or the like. Alternatively, the user can specify 290 publication via update of an existing public or private widget.

Upon completion of the wizard, the system presents a new main screen 216, including an indication 215 that the competition is pending. Various potential participants are given an opportunity to accept or reject the competition. If they accept it, an indication 208 is presented to show that the competition is upcoming. The user is then returned to main screen 217.

When a competition is completed 205, participants are notified 203 according to the previously configured notification options. Competition results are displayed 202 in a competition panel, and ranking badges or other comparative indicators are displayed. Users are given an option 204 allowing them to save and/or print a scorecard representing their performance in the competition. In one embodiment, the scorecard includes the same information provided in results 202, and allows users to print, export, and/or save such results. If appropriate, data is transmitted to carbon offsetting module 167 representing excess and/or reduced usage that is to be offset.

Figure 2A:
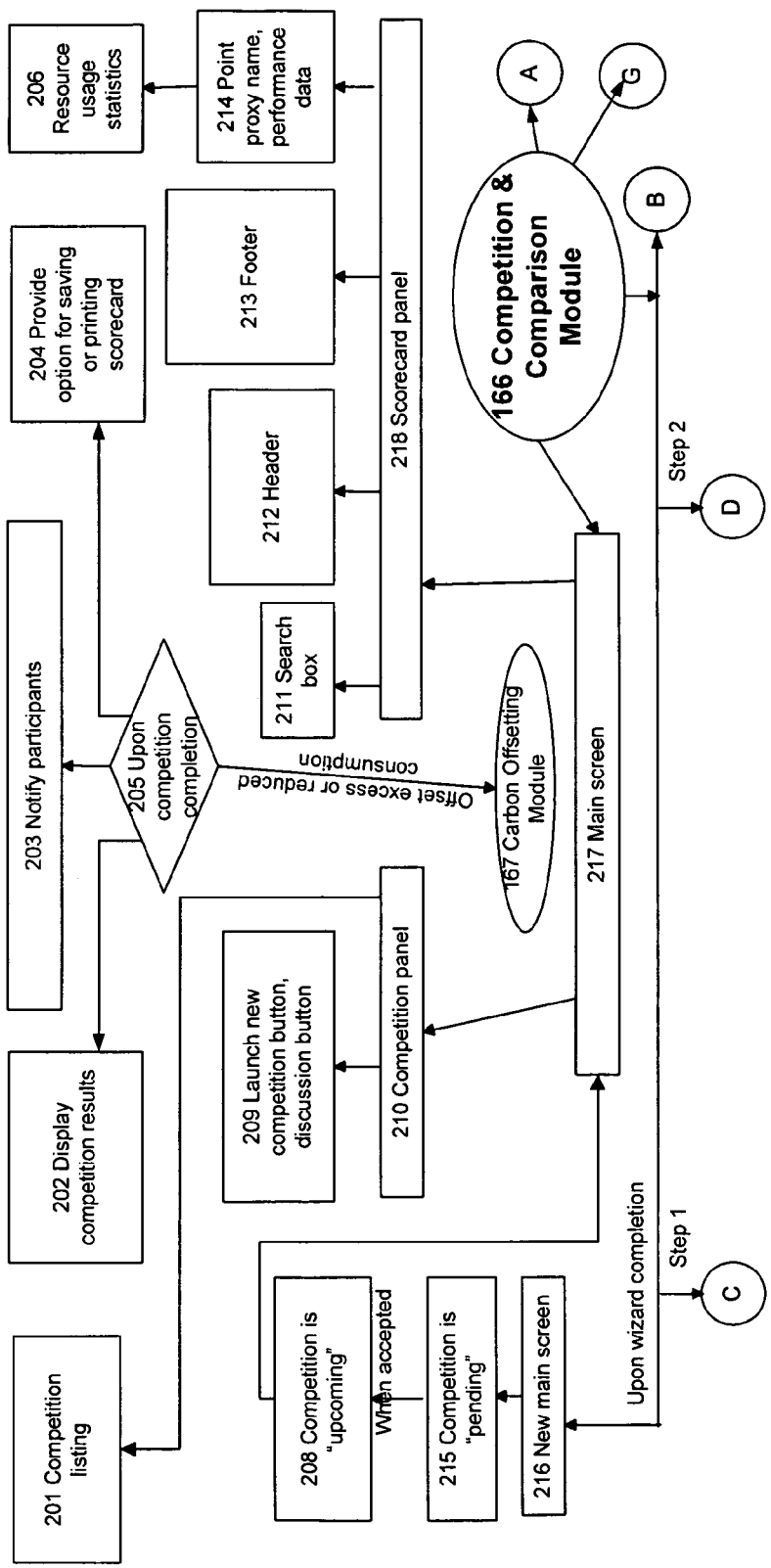
FIGS. 2A through 2G are a flow diagram depicting operation of a competition and comparison module according to one embodiment of the present invention.
Figure 2B:
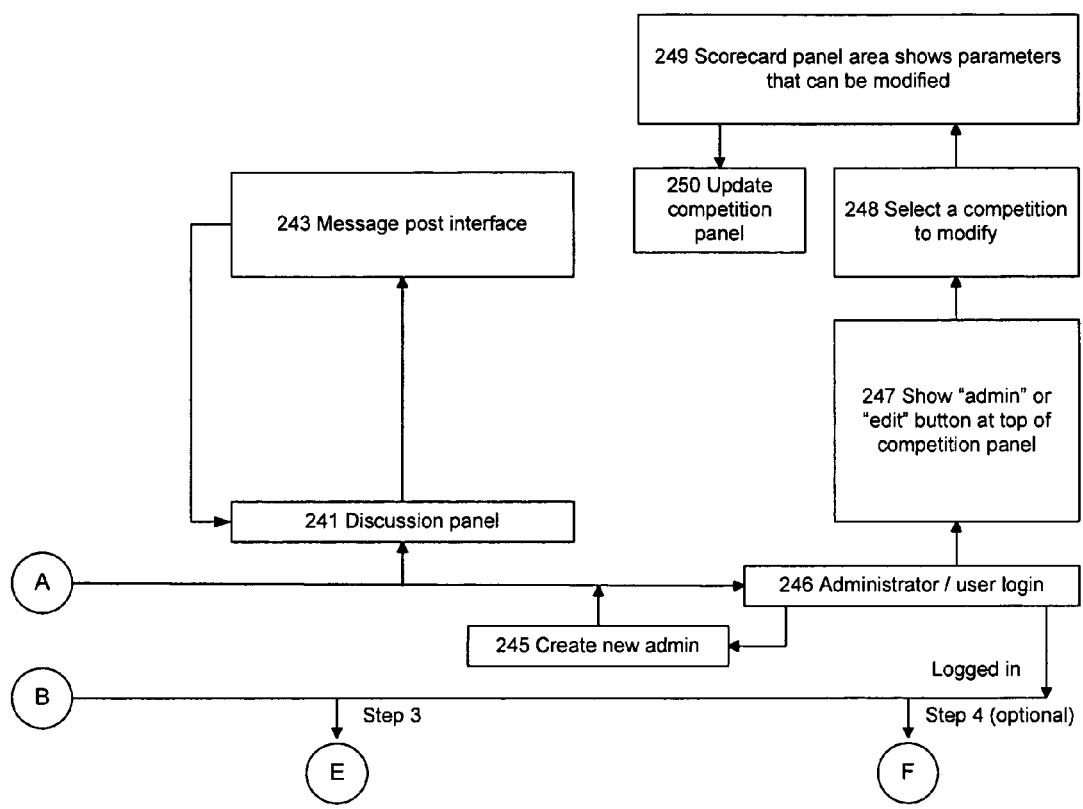
Figure 2C:
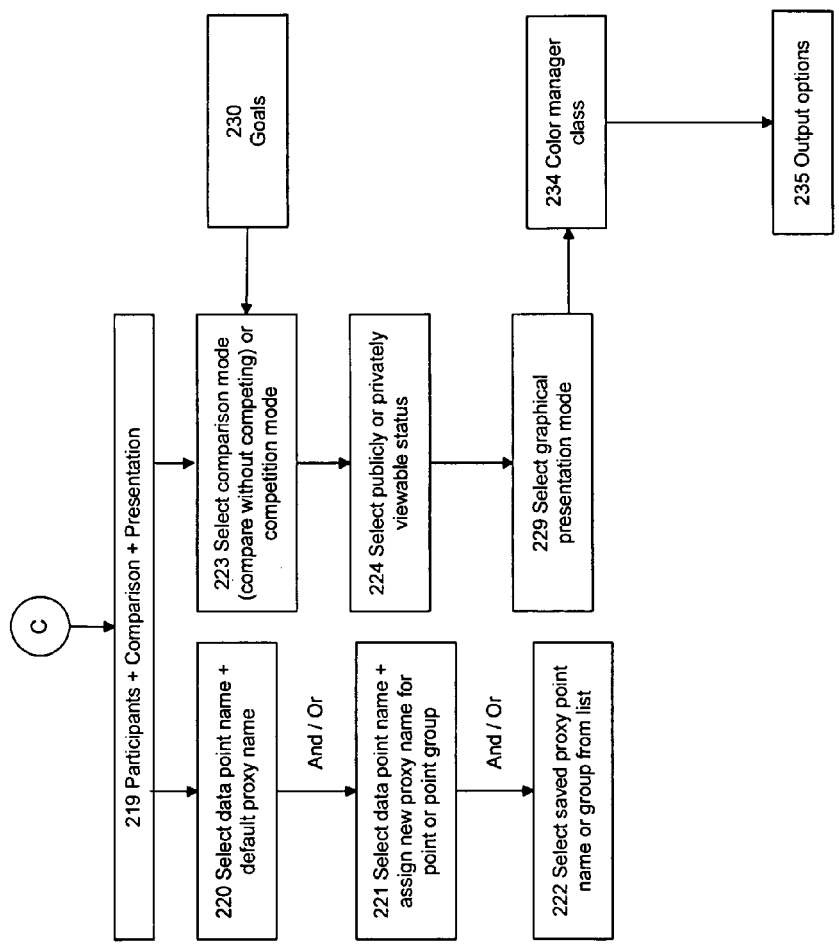
Figure 2D:
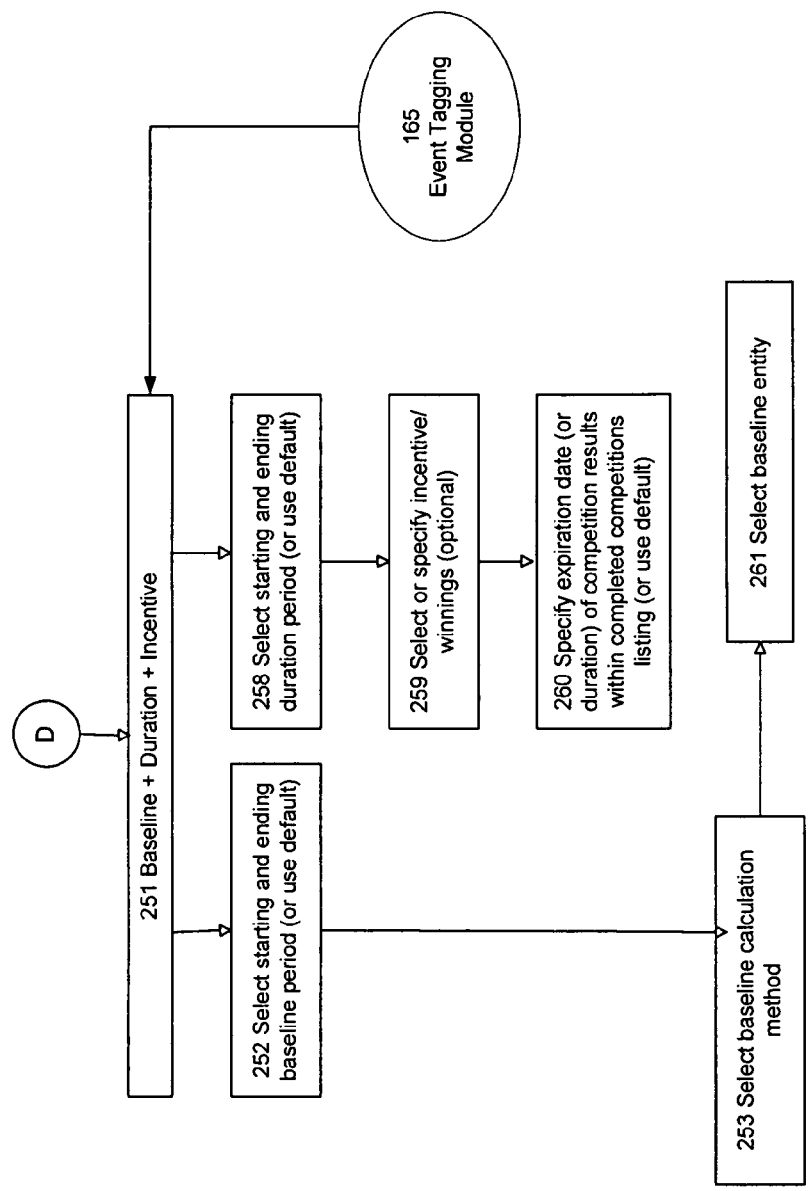
Figure 2E:
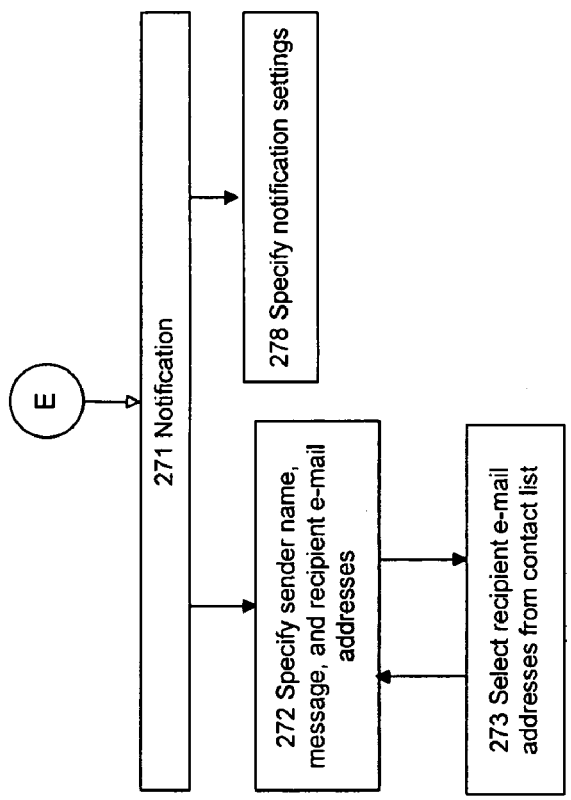
Figure 2F:
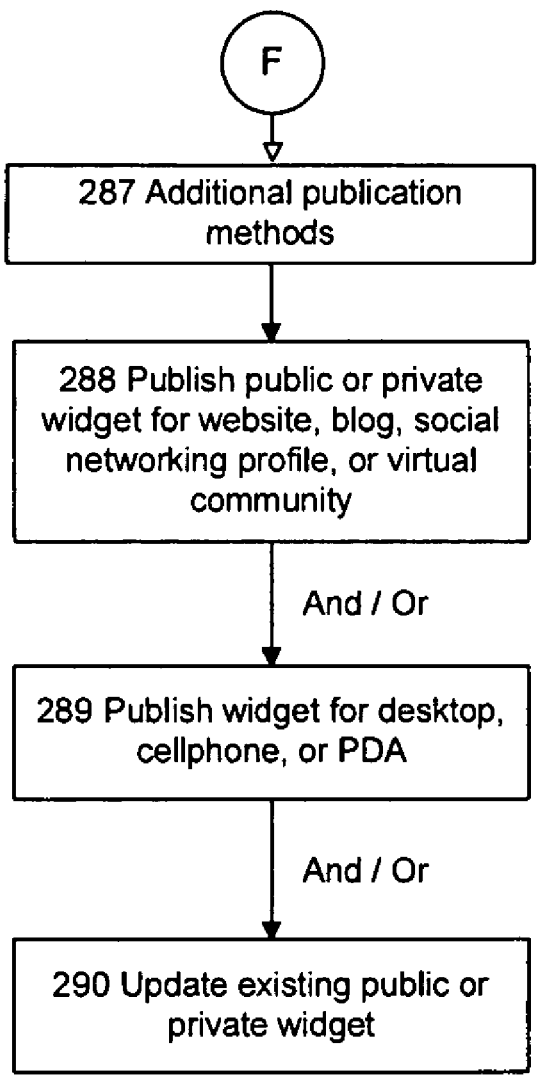
Figure 2G:
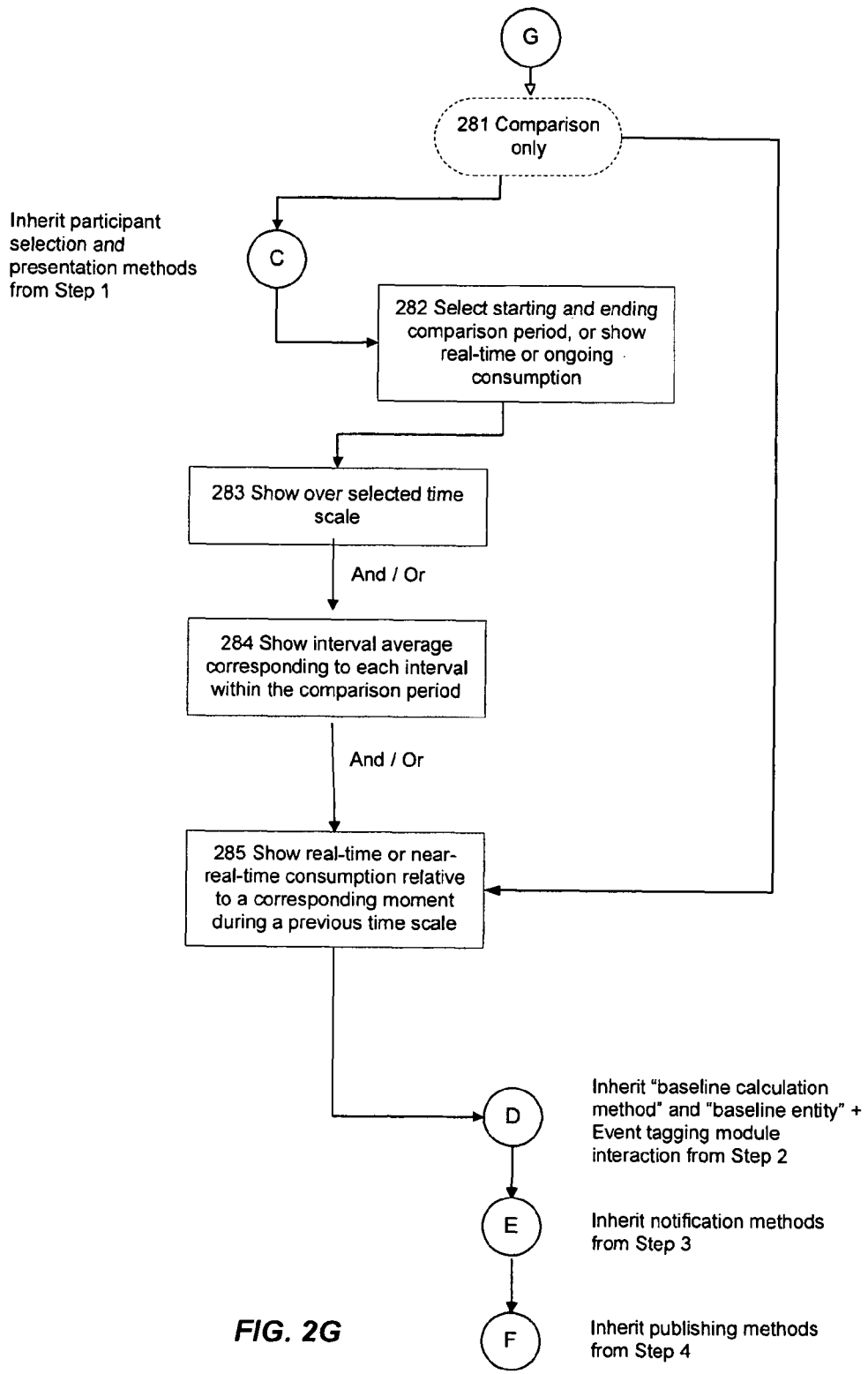

As shown in FIG. 2G, the user can also specify parameters for a comparison 281 without a competition. Participant selection and presentation methods can be performed as described above in connection with FIG. 2C and elements 219 through 235. The user selects 282 a starting and ending comparison period, or can request that the system show real-time or ongoing usage. In the first case, the system shows 283 data over a selected time scale, and/or shows 284 an interval average corresponding to each interval (such as hour, day, week, month, or the like) within the comparison period, and/ or shows 285 real-time (or near real-time) usage relative to a corresponding moment during a previous time scale (for example a comparison of a current hour of the day with the same hour over the past thirty days).

Alternatively, participant selection and presentation methods can be omitted, so that the system simply shows 285 real-time (or near real-time) usage relative to a corresponding moment during a previous time scale.

In the comparison methodology, remaining steps can be performed in a similar manner as described above. Accordingly, steps 2, 3, and 4 can be performed as described above.

Event Tagging Module

Figure 3A:
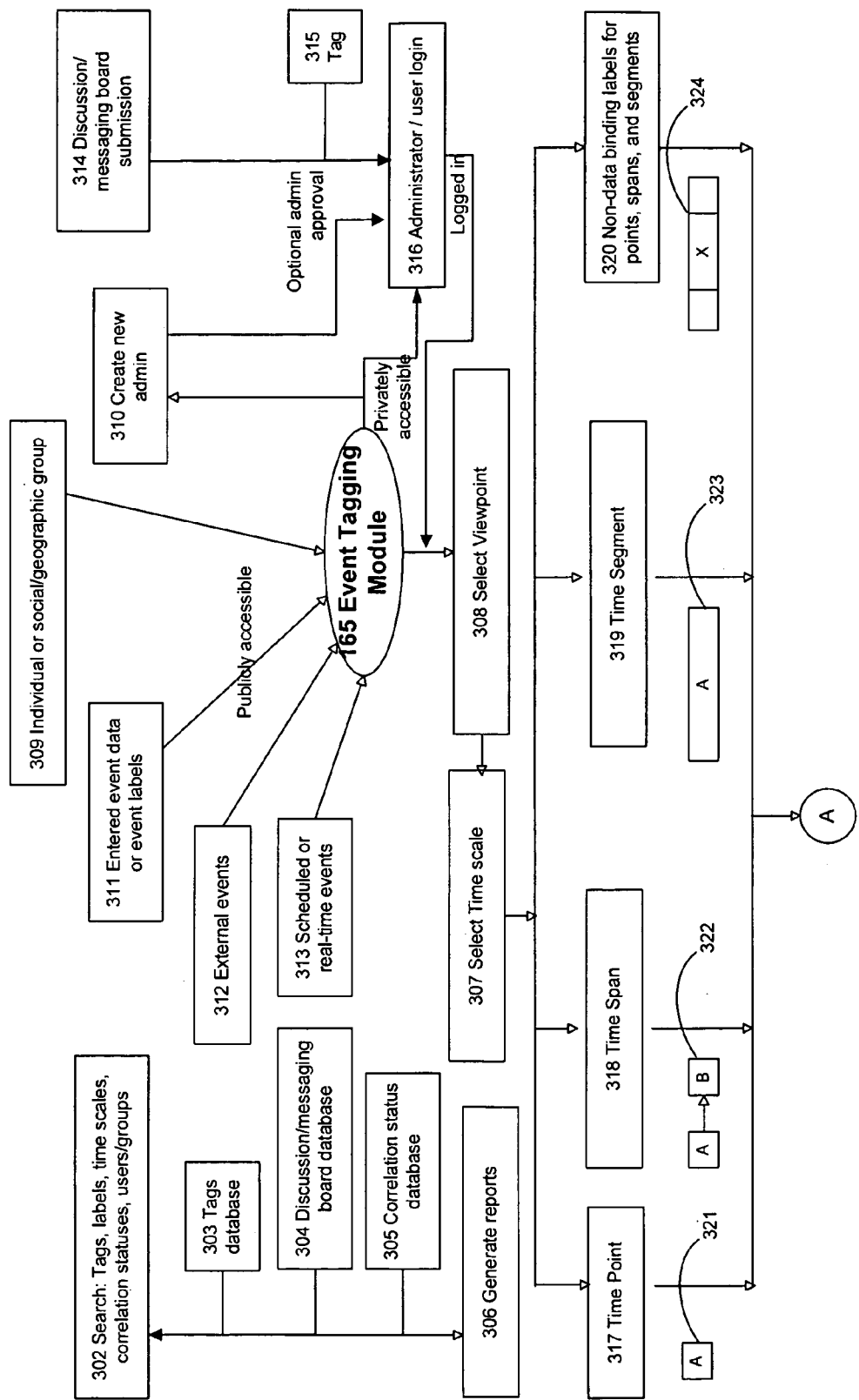
FIGS. 3A through 3B are a flow diagram depicting operation of an event tagging module according to one embodiment of the present invention.
Figure 3B:
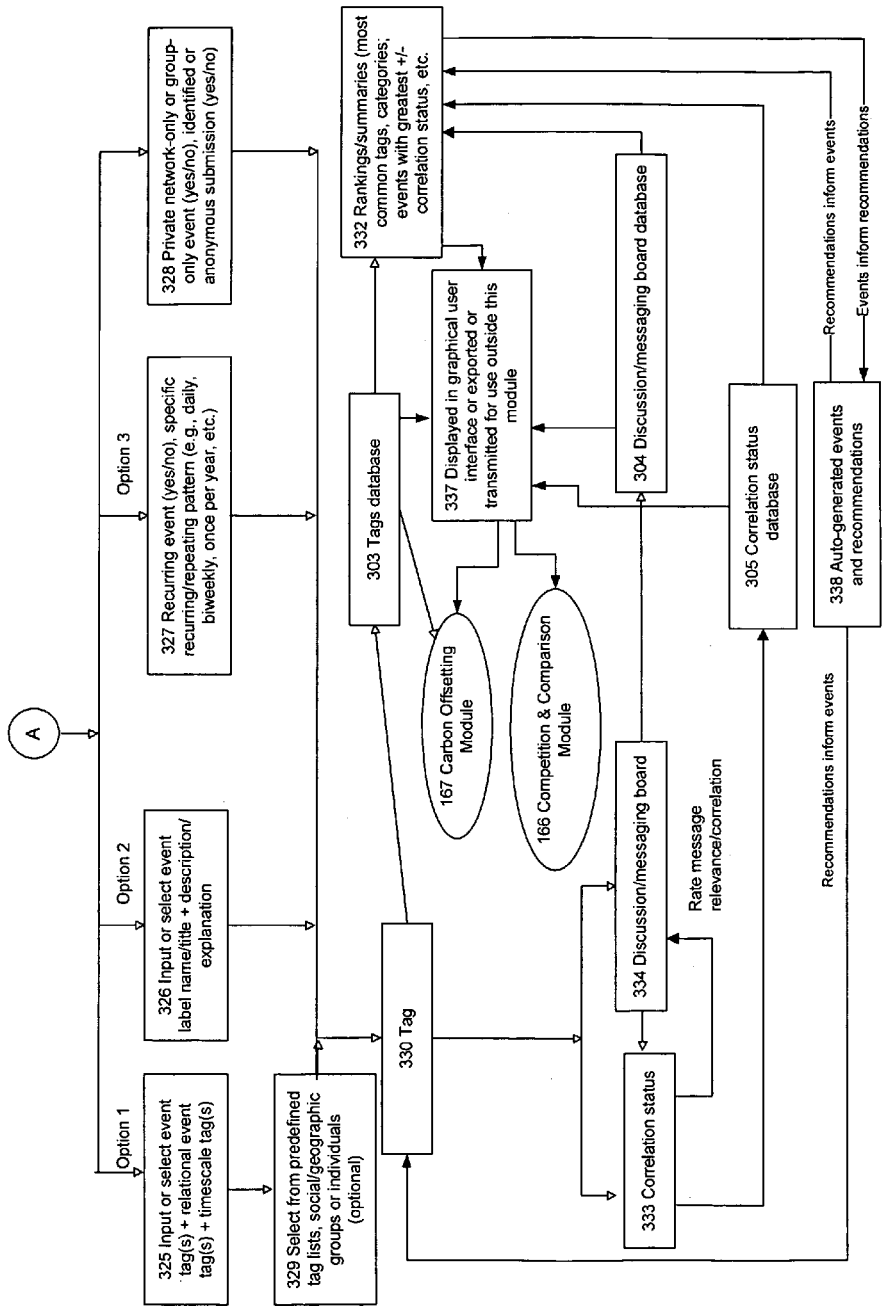

Referring now to FIGS. 3A through 3B, there is shown a flow diagram depicting operation of event tagging module 165 according to one embodiment. In one embodiment, event tagging module 165 implements an interface providing for the ability to allow an individual, group end user, and/or administrator to tag, label, or categorize events associated with past, present, and expected future data at a given time or over a given time interval. In this manner, the user (and others) can see the effect of certain events on resource usage patterns.

In one embodiment, database 101 (or another data storage mechanism) stores various items of information for each event or event thread. Such items can include any of the following fields, in any desired combination:

Event label name,
event label description,
viewpoint or social/geographic group ID,
time scale point/span,
non-data binding label,
event tag(s) ID,
relational event tag(s) ID,
timescale tag(s) ID,
correlation status,
recurring event (yes/no),
recurring event pattern,
approval from admin (yes/no, optional),
private network-only or group-only event (yes/no),
identified or anonymous submission (yes/no),
rankings (most common tags, categories; events with greatest +/−correlation status),
discussion ID (for relating posts to this event),
admin ID (for identifying admin oversight).

Event tags are, in one embodiment, data markers that identify an event as being associated with a social or geographic group or individual or new/predefined category, or vice versa. Examples include "renter A," "coworkers," "birthday party," "floor 5," or "east wing." Event tags can be relational, so that they identify an event as being associated with another event or multiple events. For example, "conference event" tag is related to "facilities staff" tag group and "adverse weather" tag category. Event labels can be provided, to indicate a brief name/title and description/explanation of an event; such a field may serve as metadata for a tag or as a stand-alone note. For example, title: "Lightbulb overhaul," subject: "John Doe replaced 500 100-W incandescent lightbulbs with 500 23-W CFLs."

The output of module 165 can be publicly accessible or restricted to private viewing, depending on configuration. Publicly accessible data can be viewed by any individual or group 309 via a website or other user interface.

For private access, a login screen 316 is implemented to authenticate an individual before access is granted. A screen 310 for creating a new admin account is also provided. In embodiments where discussion boards and messaging boards are provided, submissions 314 can be moderated and approved by an administrator before posting. If appropriate, administrators can also specify and/or approve tags 315 before they are associated with events and/or submissions 314.

Many different types of events can be tagged, including for example:

Entered event data or event labels 311: including data entered by a high-level administrator such as a building owner, utility provider, or other individual or authority; such data can include data pertaining to individuals, entities, and/or social/geographic groups;

External events 312: including events from outside parties and/or third-party products, such as, calendar applications, mail applications, RSS feeds, and the like;

Scheduled or real-time events 313: including planned events, forecasts, peak demand cost events, tiered rate/seasonal events, and the like.

If desired, a time scale tag can be provided. A time scale tag is a data marker for identifying a time scale as being associated with an event or multiple events. For example, "summer season" tag can be applied to all events occurring between June 22 and September 22.

Event tagging module 165 provides a select viewpoint screen 308, wherein a user can indicate what viewpoint is desired for the data to be displayed. For example, the user can select all-building, or an area of a building, or a social/demographic group, or the like. The user can also select a time scale 307, such as past, present, or future, so as to view events corresponding to the selected time scale. The user can also select specific events to view according to their associated time stamp. For example, the user can select any or all of:

a time point 317 (an instantaneous moment in time, one-minute interval, or other time interval that corresponds to the lowest possible resolution of monitored usage; such as 12:35 pm, or hour of 8:00 am, or the like);

a time span 318 (a period in time stretching from one time point, hour, day, month, or year to another; such as 12:35 pm to 1 pm, or December 4 to 20, or the like);

a time segment 319 (a predefined or standard interval in time that is derived from the chronology of a calendar or other time table or register; such as a day, week, month, year, weekend, holiday, or the like).

Additionally or alternatively, the user can specify non-data binding labels for points, spans, and/or segments 320. This optional field assigns a label to any point, span, or segment without relating it to any events. For example, looking at a future time scale, a user may specify the label, "Expect this week to have greater than average usage."

Examples of the various mechanisms for selecting specific events are shown in FIG. 3A: time point 321, time span 322, time segment 323, and non-data binding label 324.

Module 165 provides several mechanisms for specifying event tags and their characteristics. The user can input or select event tag(s) 325 (including relational event tag(s) and/or timescale tag(s), if appropriate). This may include selecting 329 from predefined tag lists, social/geographic groups, and/or individuals. Alternatively, the user can input or select event label names, titles, descriptions, and/or explanations. 326. The user can indicate 327 whether the event is recurring, and can specify a recurrence pattern. The user can also specify whether the event is private network-only, group-only, and whether it is identified or anonymous.

A tag 330 is associated with the event, and stored in tags database 303.

A correlation status 333 can be associated with the tag, expressed as a percent, thumbs up/down, rating, or the like. In one embodiment, correlation status 333 is some indication, according to grade or rank, indicating an amount by which an event, event tag, relational event tag, or timescale tag either positively or negatively correlates to changes in usage. For example, "event A: lowering thermostat set point temperature by 5 degrees F." contributes to "50%" of the witnessed reduction in energy use; "event A" gets a "thumbs up" or "3 stars" for being a substantial contributor to the reduction in energy use. The correlation status 333 is stored, for example, in a correlation status database 305.

In one embodiment, other users are given the opportunity to comment on or rate the relevance or correlation status 333 via discussion/messaging board 334. Such comments are stored in discussion/messaging board database 304. In one embodiment, events and recommendations can also be auto-generated 338, for example based on other events and/or recommendations.

Rankings and/or summaries 332 are generated based on data from correlation status database 305, discussion/messaging board database 304, and/or auto-generated events and recommendations 338.

In one embodiment, data from tags database 303, rankings/summaries 332, discussion/messaging board database 304, and correlation status database 305 is displayed in a graphical user interface, and/or transmitted over a network, and/or stored, exported, or otherwise used. In one embodiment, such data is provided to carbon offsetting module 167 for use in determining appropriate carbon offsets to associate with resource usages. In one embodiment, such data is provided to competition and comparison module 166 for use in competitions and comparison analysis and displays.

In one embodiment, a search interface is provided that allows users to search 302 on tags, labels, time scales, correlation statuses, users/groups. Based on search queries, the system of the present invention retrieves appropriate information from tags database 303, discussion/messaging board database 304, correlation status database 305, and other relevant sources of information, so as to generate reports 306.

Carbon Offsetting Module

Figure 4:
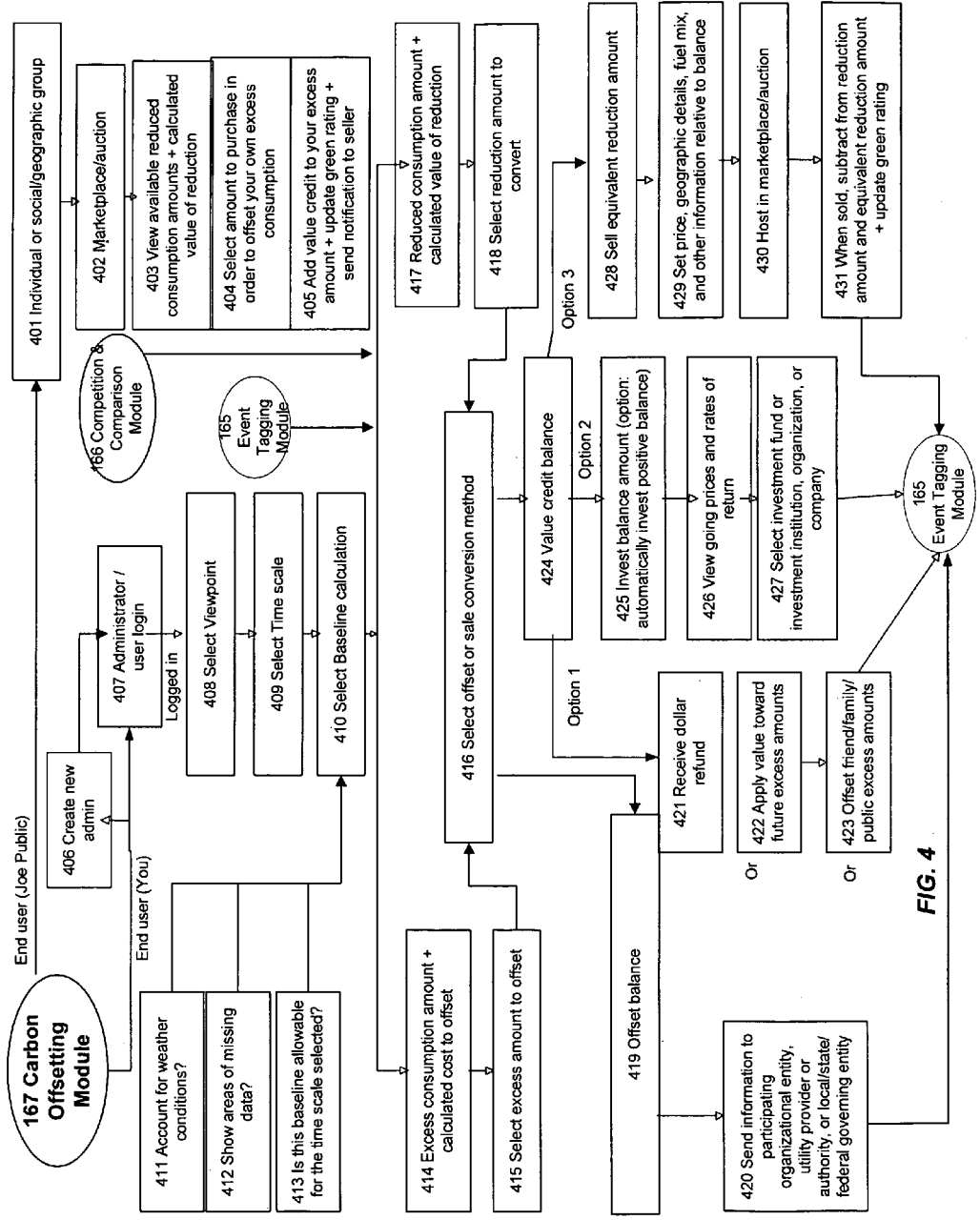
FIG. 4 is a flow diagram depicting operation of a carbon offsetting module according to one embodiment of the present invention.

Referring now to FIG. 4, there is shown a flow diagram depicting operation of a carbon offsetting module 167 according to one embodiment, allowing end users to track, make available, and purchase carbon offsets for excess consumption or convert and sell certificates or green attributes for reduced consumption in a marketplace or auction, or through a third party.

As discussed above, in one embodiment, a baseline is a calculation serving as a comparison or control, consisting of two parts: 1) a range of time during which usage data has been monitored in the past, and, additionally, 2) an optional method for normalizing or standardizing performance based on a number of factors, including building infrastructure characteristics, per person or per square foot usage, relative average usage within a locale or similar social or geographic group, and weather conditions. Based on the baseline and on a chosen viewpoint and/or time scale, an excess usage amount or a reduced usage amount can be derived. A marketplace and/or auction can be established, either publicly or privately, wherein direct value or indirect value associated with reduced usage can be traded, leased, or sold. Direct value can include, for example, "negawatts" (hypothetical tradable units of saved energy), averted carbon emissions, preserved land area, and the like. Indirect value can include, for example, fewer emissions-related illnesses, economic benefits, and the like.

In one embodiment, database 101 (or another data storage mechanism) stores various items of information for carbon offsetting units. Such items can include any of the following fields, in any desired combination:

Total excess usage tally,
total reduction amount tally,
offset balance,
value balance,
viewpoint or social/geographic group ID,
viewpoint selection,
time scale selection,
baseline calculation parameters (time range, weather conditions yes/no, missing data yes/no, relative to mean),
offset/sale conversion method,
price per resource reduction unit,
geographic location ID,
local fuel mix ID,
auto-invest option ID,
meta data label,
private network-only or group-only marketplace availability (yes/no),
identified or anonymous offset availability/purchase (yes/no),
green rating (a classification according to grade or rank that indicates relative performance with respect to, for example, two measurements: overall usage and purchased offsets. For example, a "thumbs up" or "2.5 stars (or 2.5 green leaves) out of 5" for being an average consumer of resources or average offsetter of excess individual, group, family, friend, or public resource usage),
admin ID.

In one embodiment, members of the public can access module 167 to view carbon offsets for individuals or social/geographic groups 401, and can view a public marketplace/auction 402 if configured to be publicly available. Here, members of the public can view 403 available reduced usage amounts and calculated values of such reductions, and can select 404 amounts to purchase in order to offset excess usage. Additional functionality 405 is also provided, including adding value credit to the excess amount, updating a green rating for the member of the public, and/or sending notification to the seller.

In one embodiment, certain functions are limited to authorized users. Thus, module 167 includes functionality for administrator/user login 407 and/or creating 406 new admin accounts.

Once login credentials are authenticated, an authorized user can select 408 a viewpoint (such as all-building, area of building, social or geographic group, or the like), a time scale 409, and/or a baseline calculation 410. The baseline calculation can account for any desired factors, including for example weather conditions 411. If desired, module 167 can be configured to show areas of missing data 412, and to check 413 whether the selected baseline calculation is allowable for the selected time scale.

Based on the user's selections, and based on information from event tagging module 165 and/or competition and comparison module 166 (if appropriate), module 167 determines either an excess usage amount 414 or a reduced usage amount 417. If an excess usage amount exists, module 167 calculates a cost to offset the excess, and allows the user to select 415 an excess amount to offset. If a reduced usage amount exists, module 167 calculates a value for the reduction, and allows the user to select 418 a reduction amount to convert. The user can then select 416 an offset or sale conversion method, using dollars, Renewable Energy Certificates (RECs), green tags/certificates, carbon reduction credits, other tax(es), or the like. Appropriate financial transactions can be initiated electronically via an interface to financial institutions and other entities.

In one embodiment, a user can select an offset balance 319 method. Module 167 sends 420 information to a participating organizational entity, utility provider or authority, or local/state/federal governing entity. Such transactions are tracked by event tagging module 165.

In one embodiment, a user can select a value credit balance 424 method. The user can receive 421 a dollar refund, or can apply 422 the value to future excess amounts, or can offset 423 excess amounts of a friend or family or a public excess amount.

Alternatively, in one embodiment, the balance amount can be invested 425, and the user can view 426 current prices and rates of return for such investments. The user can select 427 an investment fund, institution, organization, or company for the investment. Such transactions are tracked by event tagging module 165.

Alternatively, in one embodiment, a user can sell 428 an equivalent reduction amount. Price is set 429 based on various factors, including for example geographic details, fuel mix, and other information. A marketplace or auction is hosted 430 for the reduction amount. When the reduction amount is sold, it is subtracted 431 from the total reduction amount for the user and the user's green rating is updated. Such transactions are tracked by event tagging module 165.

User Interface

Referring now to FIGS. 5A through 5E, there is shown an example of a user interface for configuring a dashboard interface according to one embodiment of the present invention. Each screen depicts one or more graphical components that can be configured and assembled to generate an interface for presenting comparative resource usage information. In one embodiment, many aspects of the user interface are configurable, so that the present invention provides an extensible framework that can be used for constructing and configuring the display as needed.

Figure 5A:
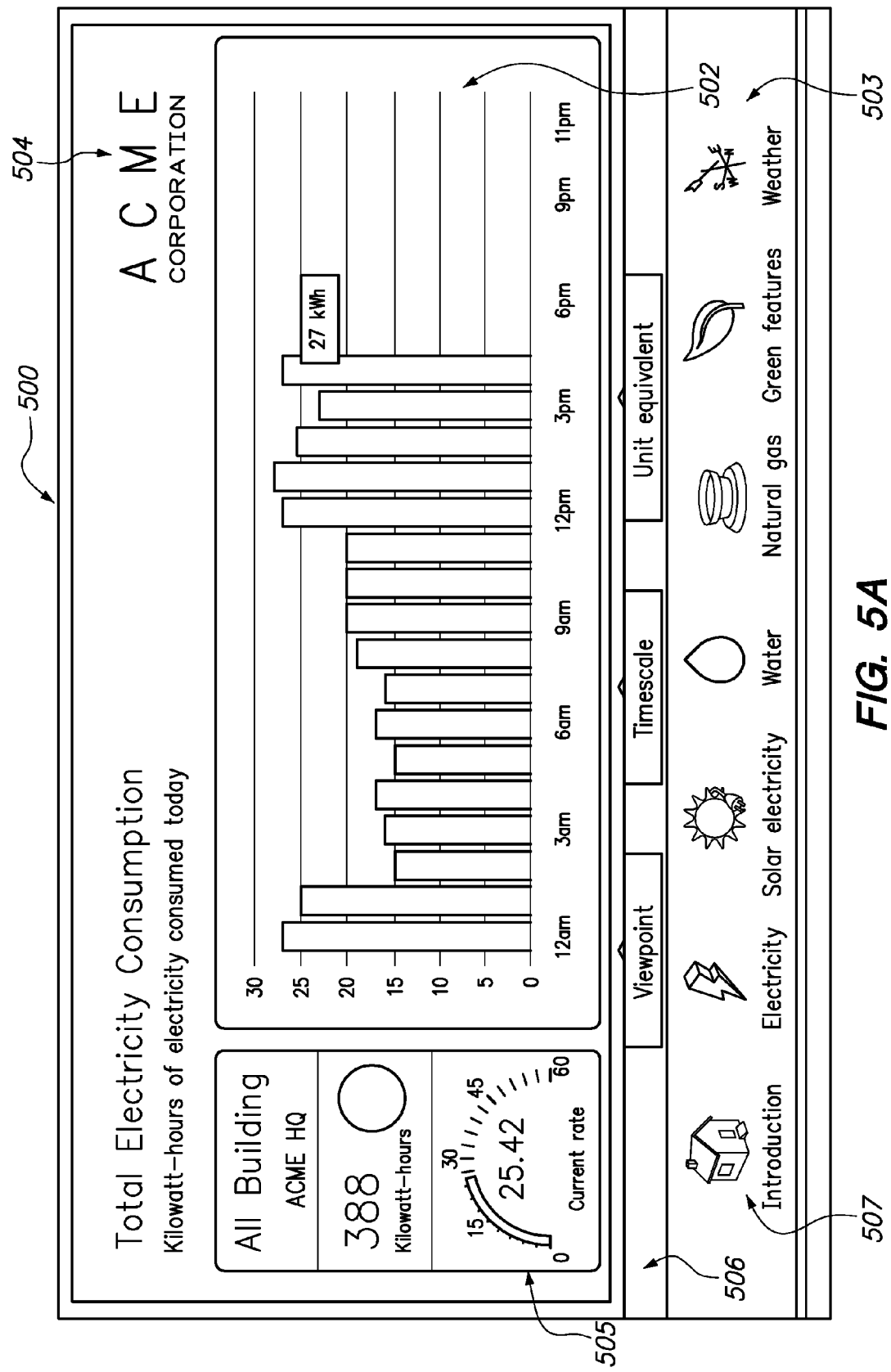
FIGS. 5A through 5E are screen shots depicting an example of a user interface for configuring a dashboard interface according to one embodiment of the present invention.

FIG. 5A depicts an example of a resource usage screen 500 constructed using various configurable components. Screen 500 includes a content section 502 for displaying content, a controls section 506 for changing various settings, and a features section 503 for providing access to other features of the system.

Figure 5B:
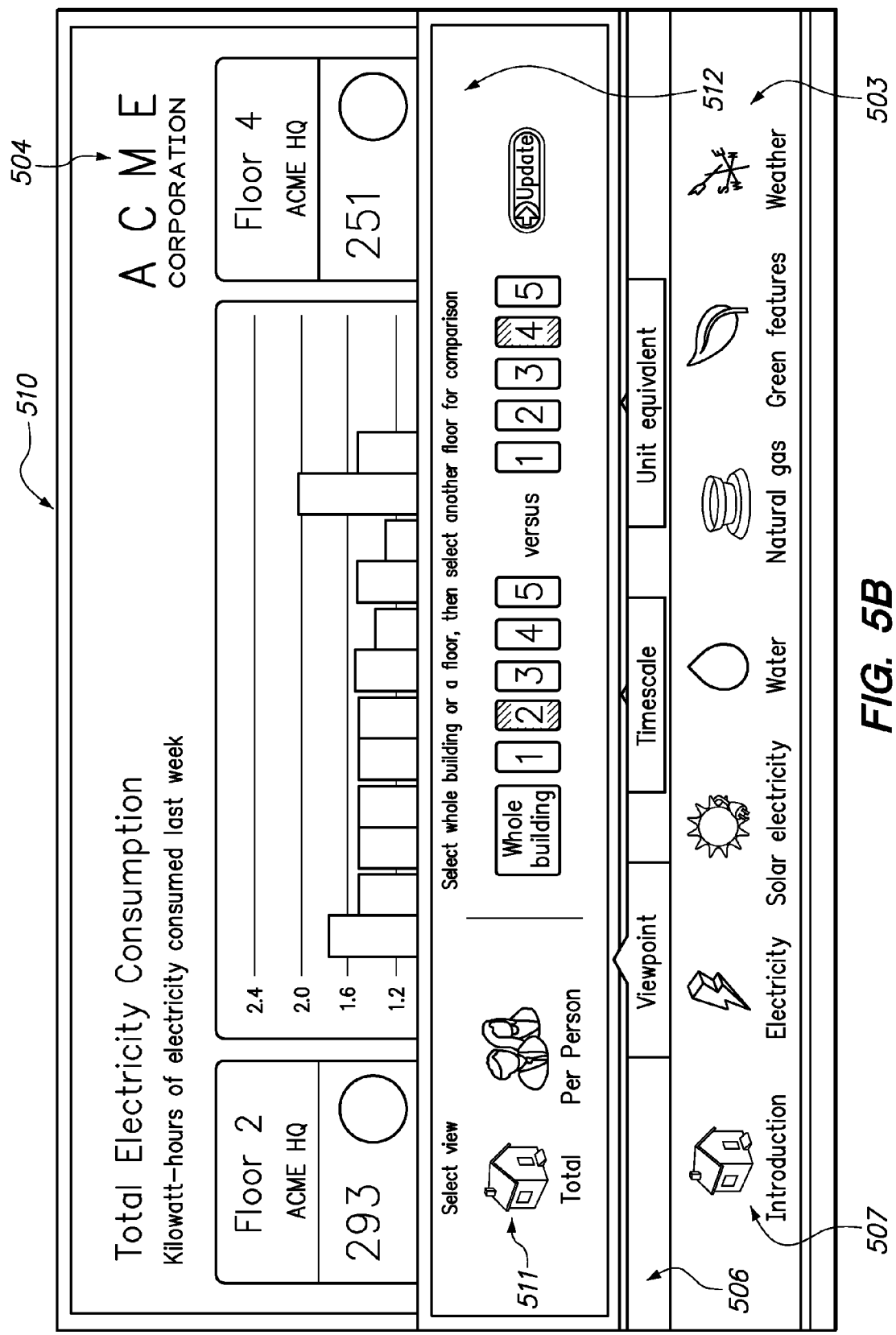

In one embodiment, various components can be configured by assigning values or pointers to any of the following:

Logo 504: Logo image, offset (X, Y), padding (X, Y);
Content 502: Content window, default, fullscreen.
Controls 506: control identifier(s), parameters, visible flag
Features 503: title(s), icon(s), theme, sound, font face, font size, text padding (X, Y), icons padding (X, Y), icon scaling factors (some of these may apply to individual icons 507)
Gauge 505: minimum and/or maximum value, period, method of measurement and/or display FIG. 5B depicts an example of a viewpoint and controls screen 510 constructed using various configurable components. Screen 510 includes a controls section 506 for changing various settings and a features section 503 for providing access to other features of the system. Screen 510 includes intra-building entity comparisons menu 512, including various configurable components. In the example, the user can select one of five buildings and/or five floors. Menu 512 includes individual controls 511 for specifying parameters for comparing resource usage.

Figure 5C:
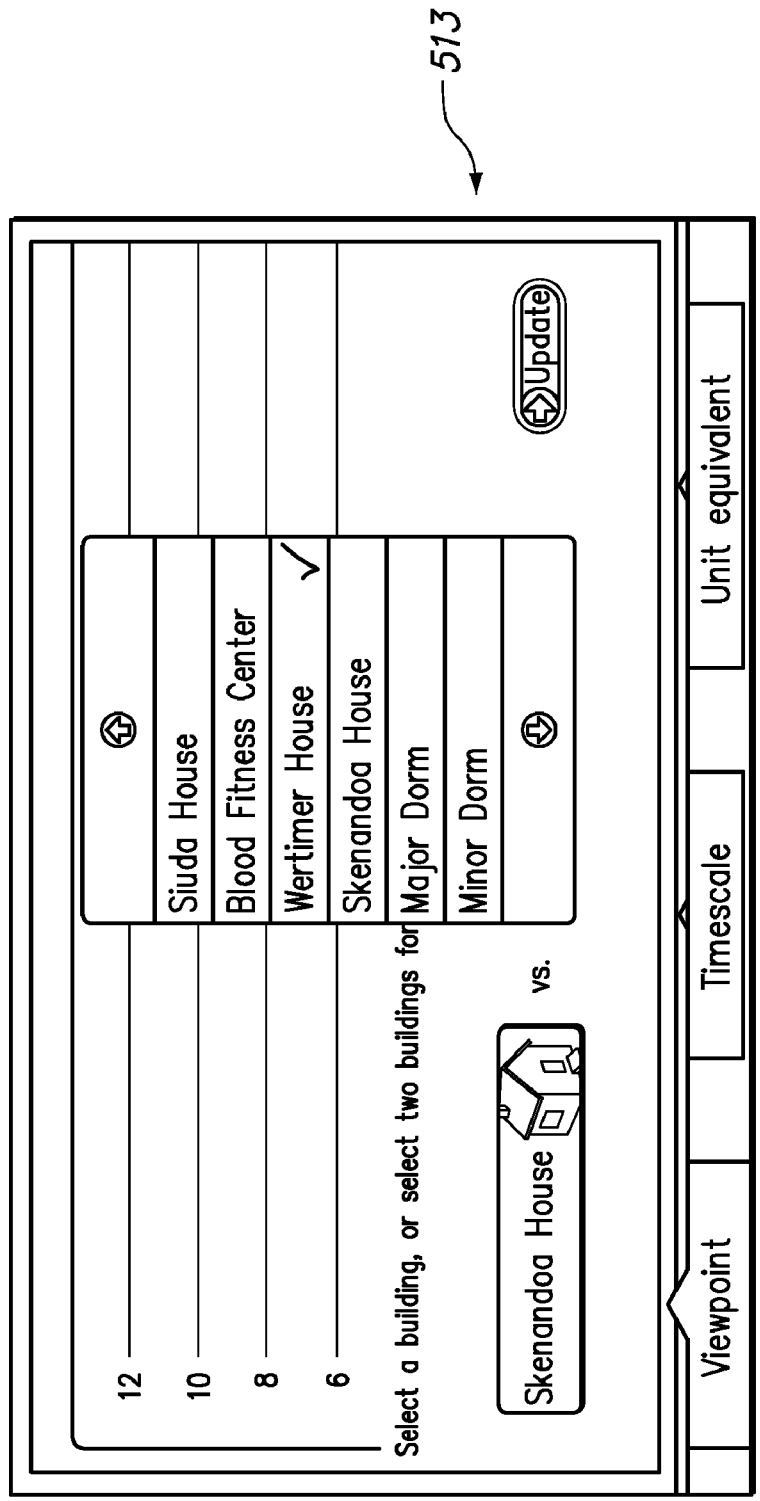

In one embodiment, various components can be configured by assigning values or pointers to any of the following:

Menu 512: set name, element padding, comparison elements, comparison text, building name, occupancy, area, subtitle, data-point name, and extra data points Menu items 511: viewpoint title comparison total, title comparison occupancy, title comparison area, entity icon, enable occupancy comparison, enable area comparison Controls 506: controls height, control_ID, title, control mc, supported methods, controls theme, sound, text padding, text alignment, animation duration, font face, font size, font color, button tails, button tails alpha FIG. 5C depicts an alternative menu 513 for selecting elements for an inter-building entity comparison. This menu 513 can be presented in lieu of any portion of menu 512.

Figure 5D:
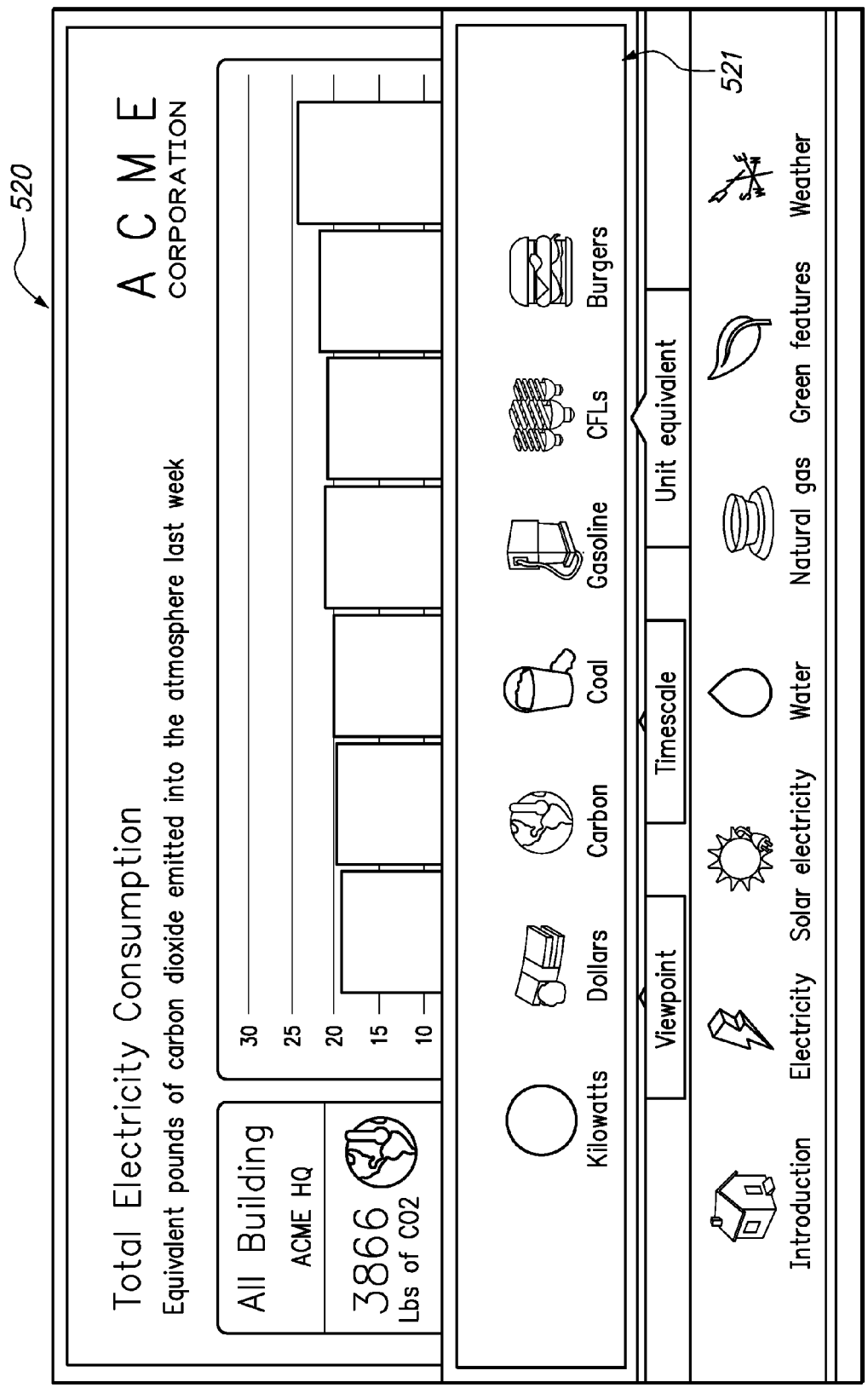

FIG. 5D depicts an example of a screen 520 for configuring controls. In the example, a unit equivalents control menu 521 can be configured by assigning values or pointers to any of the following: controls setting, set name, unit title, coefficient, icon, units icon scale, padding, font face, font size, label baseline (X, Y), description, units, units short, units rate.

Figure 5E:
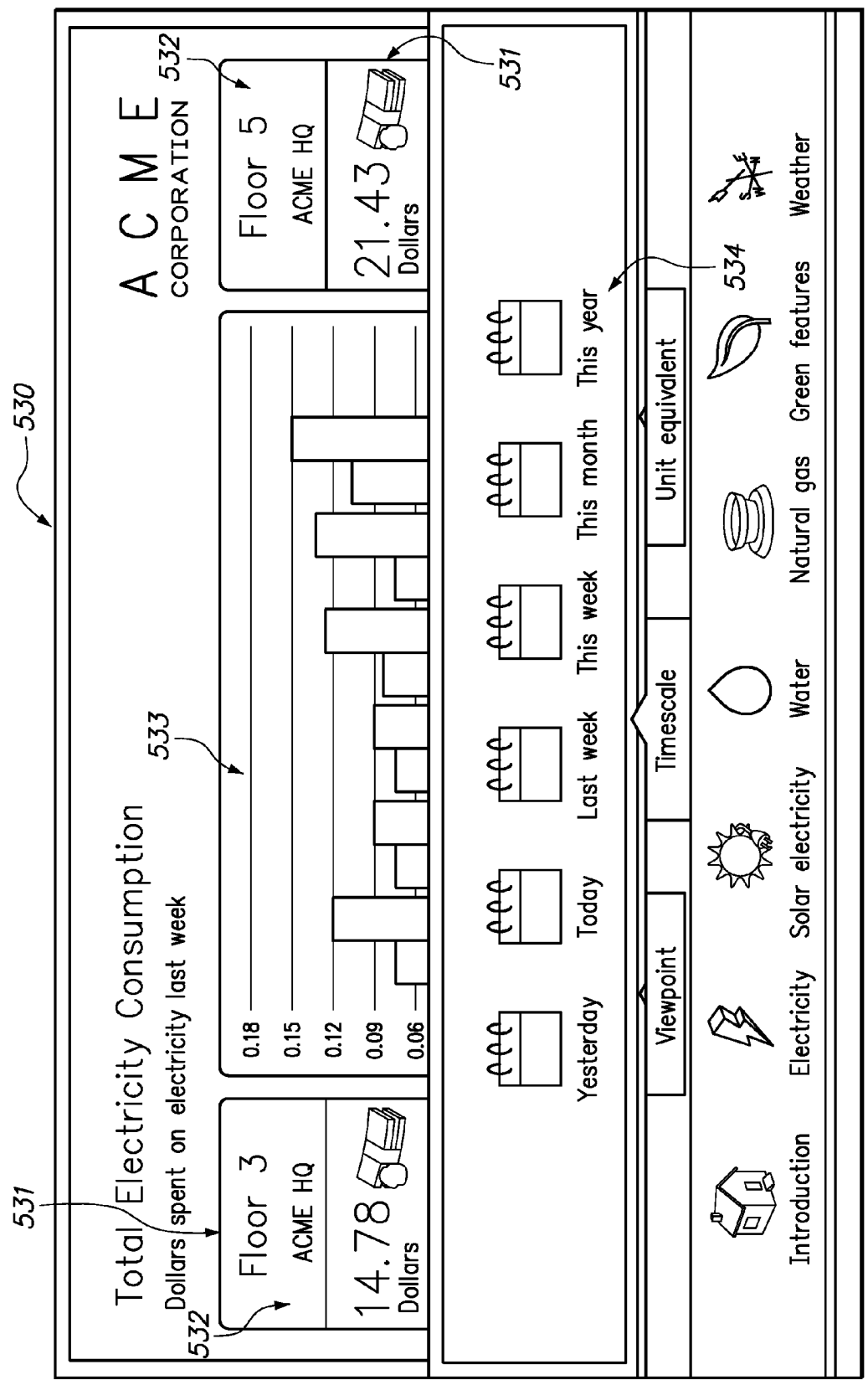

FIG. 5E depicts an example of a screen 530 including comparison panels 531. Each panel 531 can be configured by assigning values or pointers to any of the following: panel style, color, title, and the like. In addition, each panel 531 can have a title panel 532, which can be configured by assigning values or pointers to any of the following: title, subtitle, set name, and the like.

Bar graph 533 can be configured by assigning values or pointers specifying colors and other parameters for each data source being compared. In the example, the two panels 531 have different colors, and bars in graph 533 are presented in colors corresponding to panel 531 colors, so as to associate the bars with particular entities depicted in panels 531.

Time scale 534 can be configured by assigning values or pointers to any of the following: icons scale, padding, font face, font size, label baseline, set name, default, period title, icon, and the like.

In one embodiment, the present invention provides mechanisms for displaying additional content (such as maps, weather forecasts, and the like) in connection with any of the above-describe user interface frameworks. The appearance of the additional content can be configured, for example by assigning values and/or pointers to any of the following: set name, path. For example, weather content can be included, and can be configured, for example by assigning values and/or pointers to any of the following: weather icons scale, padding, font face, font size, label baseline, set name, unit title, icon, description, units, bars units, and point name.

Figure 6A:
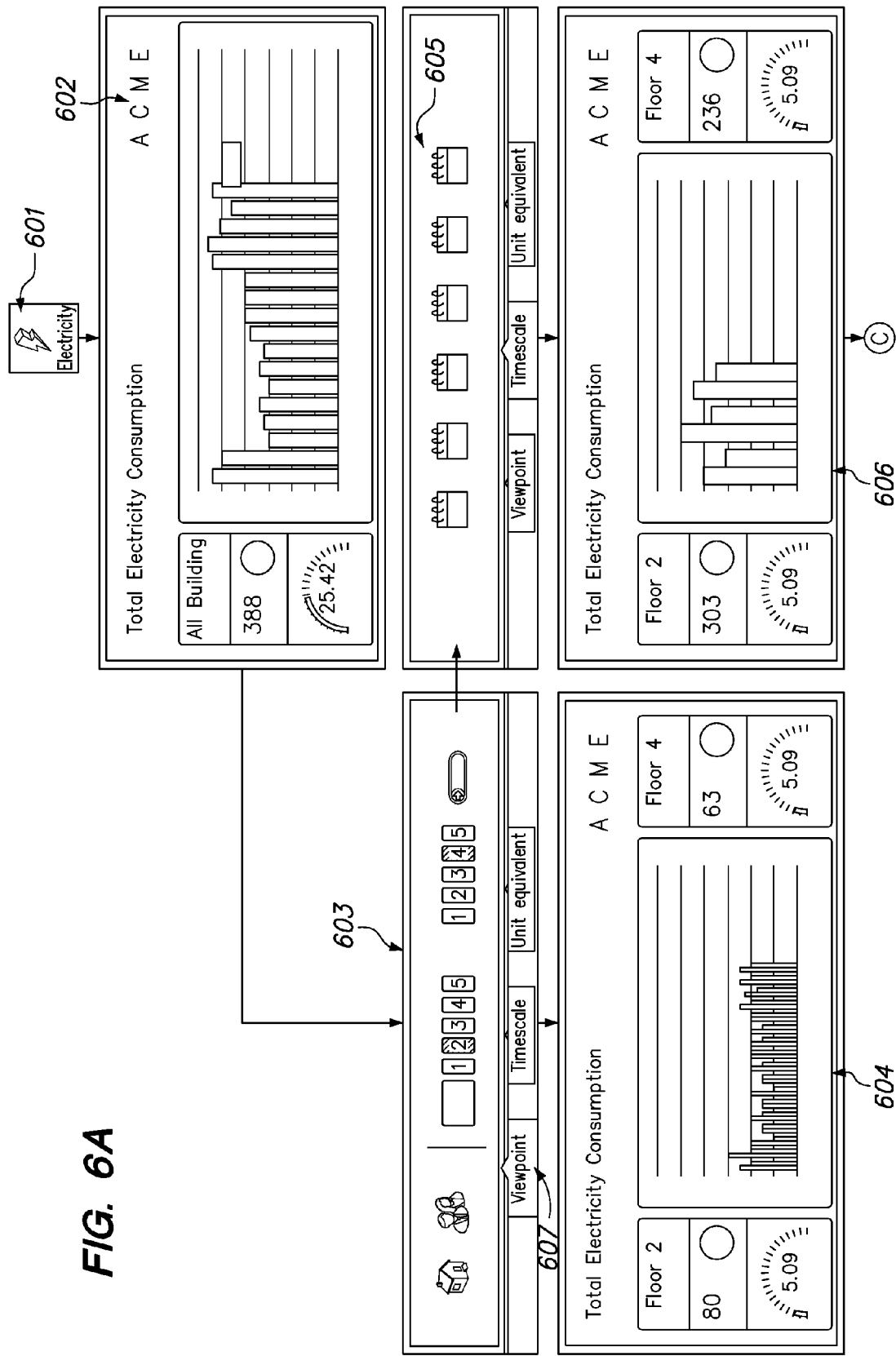
FIGS. 6A through 6B are screen shots depicting a sample user experience using electricity as an example, according to one embodiment of the present invention.
Figure 6B:
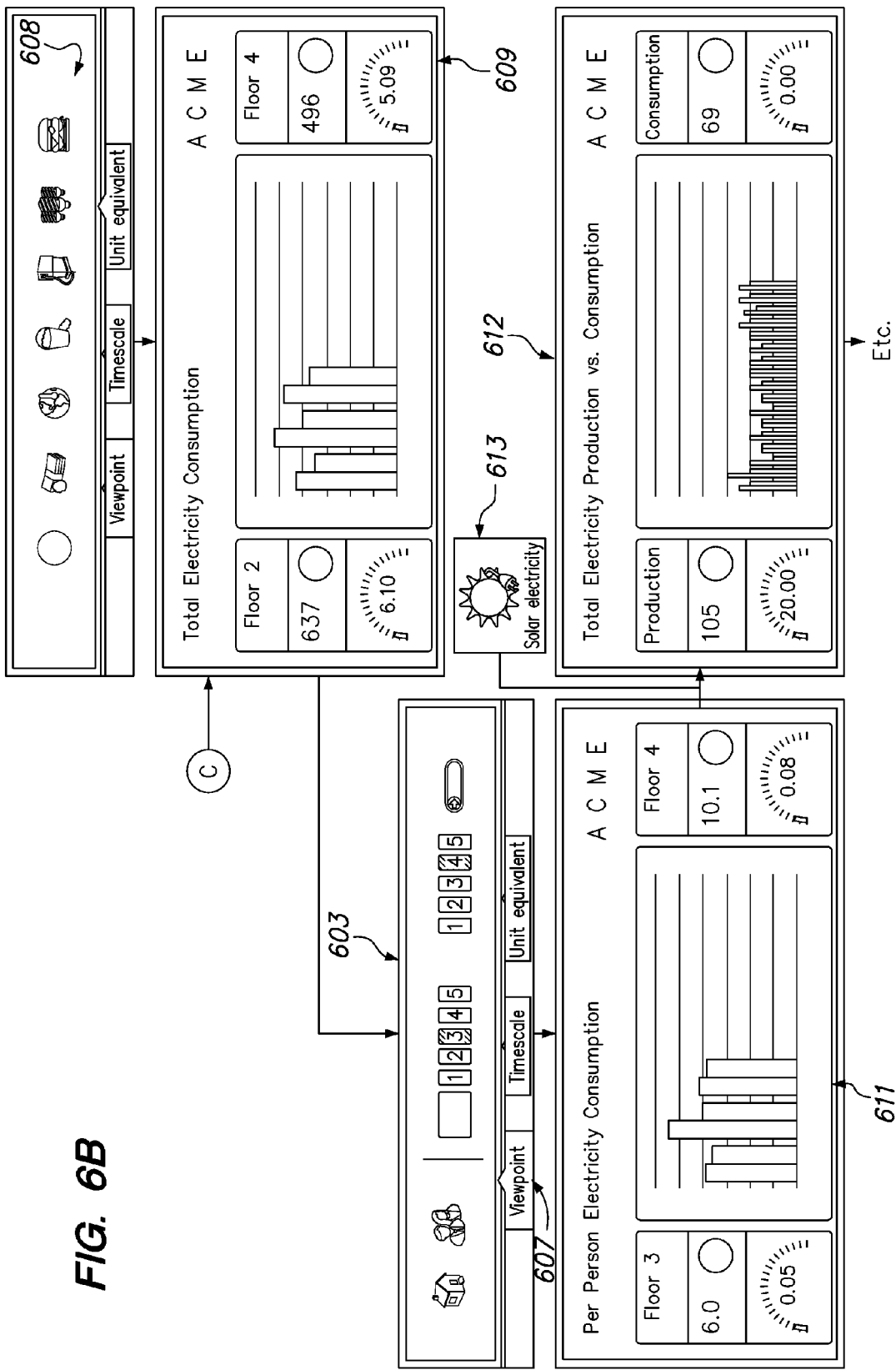

Referring now to FIGS. 6A through 6B, there is shown a sample user experience using electricity as an example. The user clicks on electricity button 601 to initiate display of electricity usage screen 602, showing real-time electricity usage as well as historical usage over a given period.

The user can click on viewpoint 607 to specify points of comparison via pane 603. This triggers display of comparison screen 604, which contains comparative information presented numerically and graphically.

The user can click on an icon within time scale pane 605 to change the displayed timescale; for example, screen 606 shows a week-long timescale for the displayed comparison.

The user can click on an icon within unit equivalent pane 608 to show electricity usage in terms of equivalent pounds of carbon dioxide, as shown in screen 609.

The user can click on viewpoint 607 to again specify points of comparison via pane 603. Screen 611 shows the resulting comparative display.

The user can click on solar electricity icon 613 to see solar production vs. consumption, as shown in screen 612.

One skilled in the art will recognize that many other interactions and displays are possible. In many such screens, a number of constituent elements are configured and assembled to generate the extensible user interface display.

Figure 7:
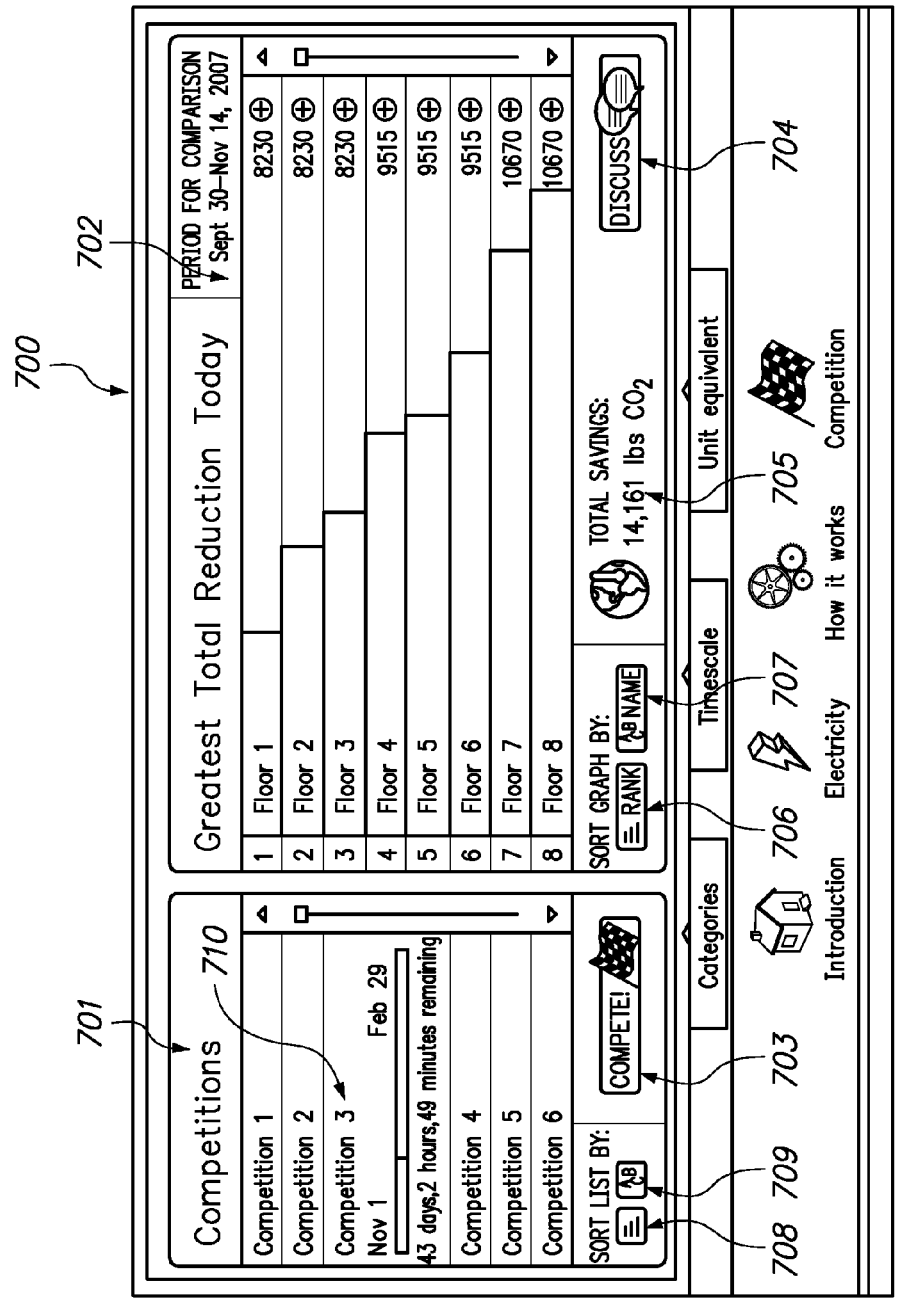
FIG. 7 is a screen shot depicting an example of a competition interface screen that can be used in connection with the present invention, according to one embodiment.

Referring now to FIG. 7, there is shown an example of a competition interface screen 700 that can be used in connection with the present invention, according to one embodiment. Screen 700 includes two sections: 1) competitions panel 701, which allows the user to select from a list of competitions and comparisons, and 2) scorecard panel 702, which shows the status of those entities participating in the currently selected competition or belonging to the currently selected comparison. In competitions panel 701, one competition 710 is selected, and particulars of that competition are shown on the display.

In one embodiment, competitions panel 701 sorts competitions by name or by expiration date, depending on which button 708, 709 is clicked. Scorecard panel 702 ranks entities by name or current rank, depending on which button 706, 707 is clicked. Compete button 703 takes the user to a wizard interface in which additional competitions may be defined and created by the end user. Discuss button 704 takes the user to a discussion/messaging module in which comments, suggestions, and ideas are shared about the resource usage data witnessed on the display. Also included is a display of total savings 705 resulting from the cumulative reductions of all entities. One skilled in the art will recognize that many other arrangements are possible.

In one embodiment, the horizontal bars are presented in different colors, corresponding to resource usage reduction. For example, green can indicate the highest level of resource usage reduction, yellow can indicate lower levels of resource usage reduction, and red can indicate the lowest levels of resource usage reduction.

Figure 8:
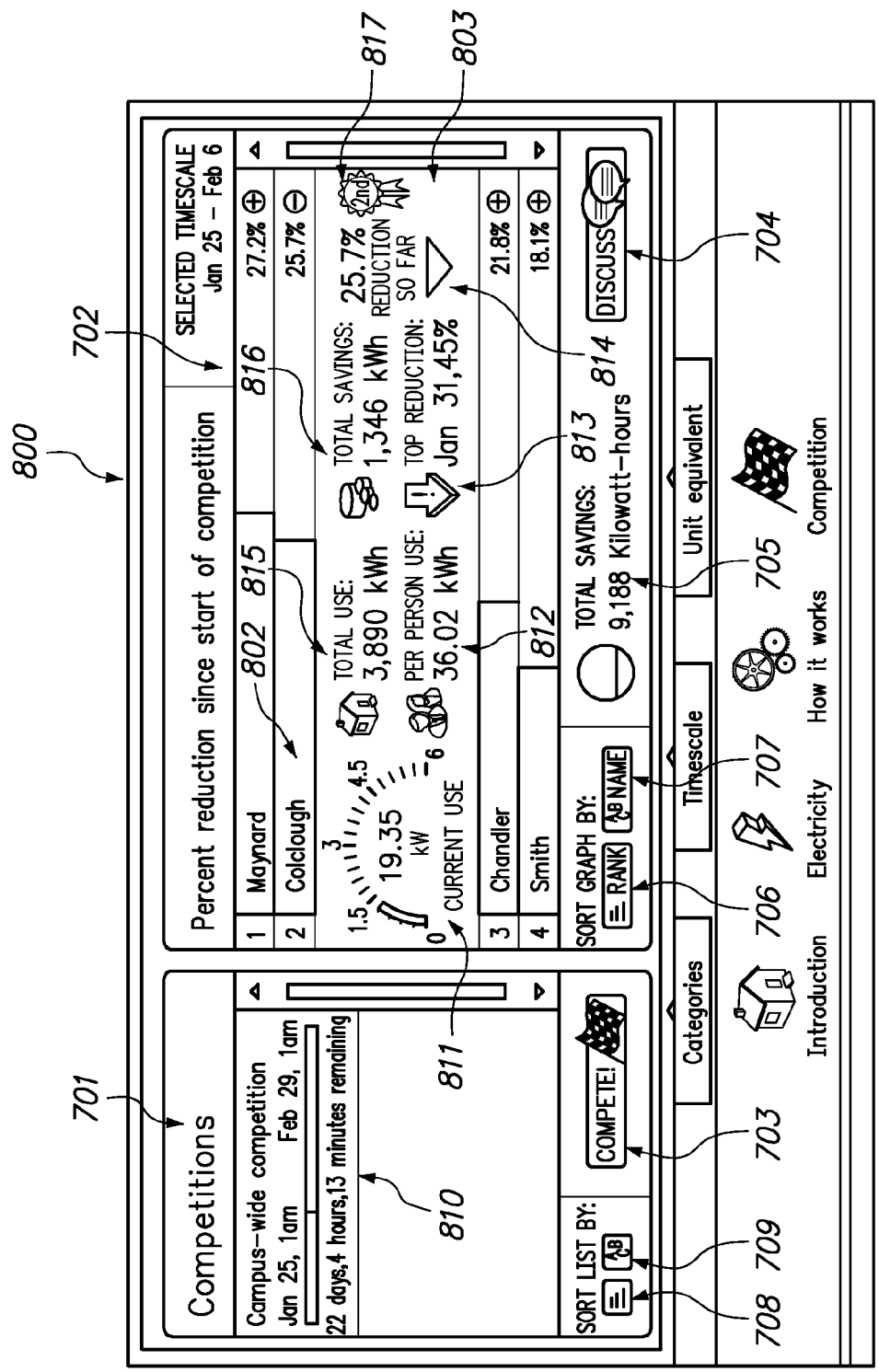
FIG. 8 is a screen shot depicting an example of a competition interface screen in which a participating entity has been selected, according to one embodiment.

Referring now to FIG. 8, there is shown an example of a competition interface screen 800 in which a participating entity within scorecard panel 702 has been selected. Upon selecting a bar 802 within the graph shown in panel 702, a cell expands from below the bar to reveal a summarizing subpanel 803 of information related to resource usage of the particular entity corresponding to the selected bar 802. For example, in FIG. 8 the information includes: gauge 811 representing current or real-time usage; total usage indicator 815; per person usage indicator 812; total savings indicator 816; indicator 813 showing which day had the greatest resource usage reduction over the selected timescale or competition period; and indicator 814 of cumulative percent reduction achieved thus far. Also included is badge 817 representing the relative rank of the entity in terms of its achieved reduction.

In one embodiment, the bars 802 are presented in different colors, corresponding to resource usage reduction. For example, green can indicate the highest level of resource usage reduction, yellow can indicate lower levels of resource usage reduction, and red can indicate the lowest levels of resource usage reduction.

Figure 9A:
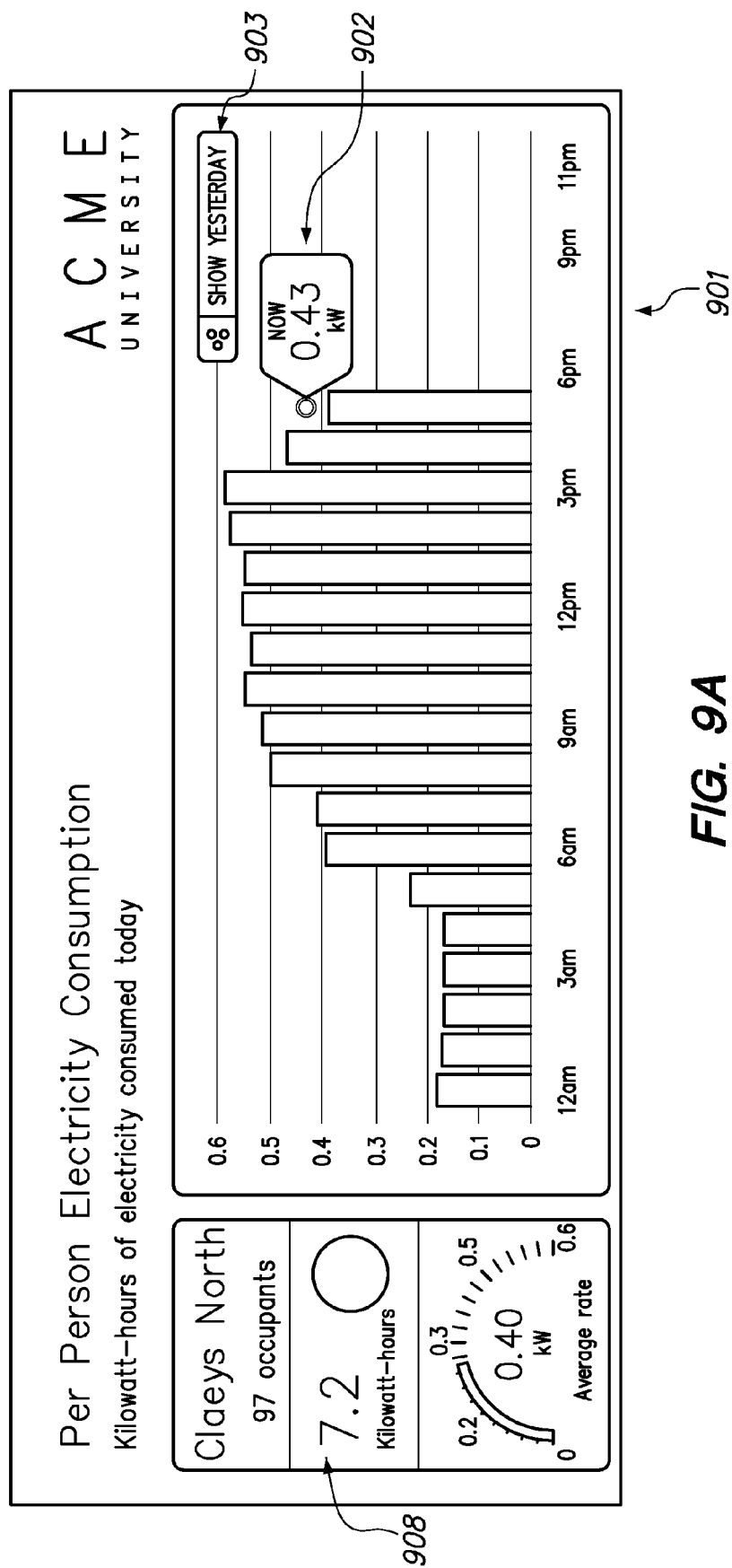
FIGS. 9A through 9E are screen shots depicting examples of user interface screens for displaying various comparisons of resource usage, according to embodiments of the present invention.

Referring now to FIGS. 9A through 9E, there are shown examples of display screens depicting various comparisons of resource usage, according to embodiments of the present invention. In FIG. 9A, a graph 901 of per-person electricity usage is shown, including a "now" marker 902 to indicate current usage. A Show Yesterday button 903 is included, enabling comparison with yesterday's data, as described below. Additional information about the resource usage of the entity is shown in pane 908.

Figure 9B:
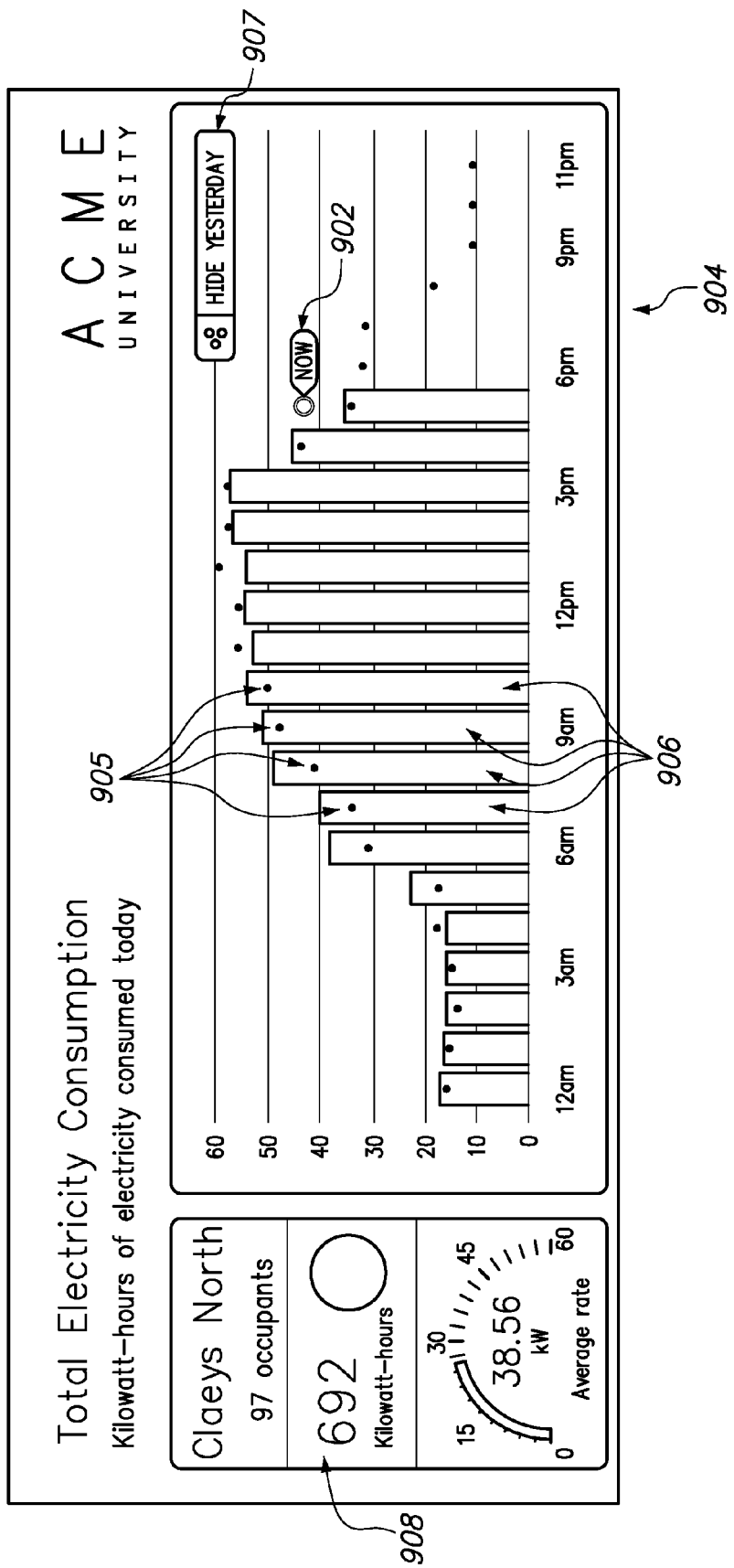

In FIG. 9B, the user has clicked on the Show Yesterday button 903. The result is a graph 904 comparing yesterday's usage (shown as dots 905) with today's usage (shown as bars 906). Superimposing the usage indicators on one another facilitates comparison between the usage patterns of the two displayed days. Show Yesterday button 903 of FIG. 9A is replaced by Hide Yesterday button 907.

Figure 9C:
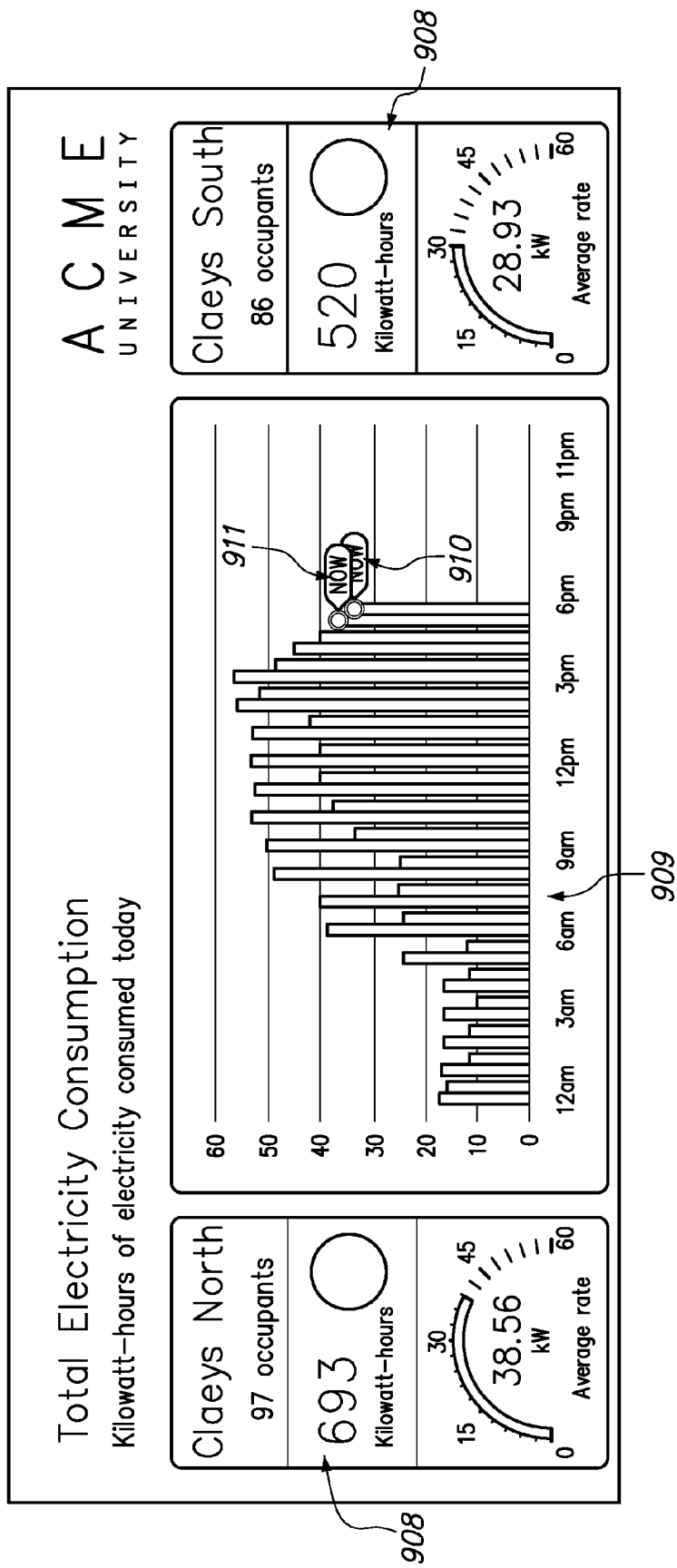

In FIG. 9C, usage by two entities is shown on the same graph 909. Color-coding is used to distinguish between the entities, although any other visually distinctive technique can be used. Panes 908 show additional information about the entities, and serve as a legend by associating each entity with a distinctive color or other visual characteristic. For example, one pane may be presented in green, and the other pane may be presented in orange. Bar graph 909 can include green bars to denote data pertaining to the green pane, and orange bars to denote data pertaining to the orange pane. "Now" markers 910, 911 are also included, and may also be color-coded to distinguish between the entities.

Figure 9D:
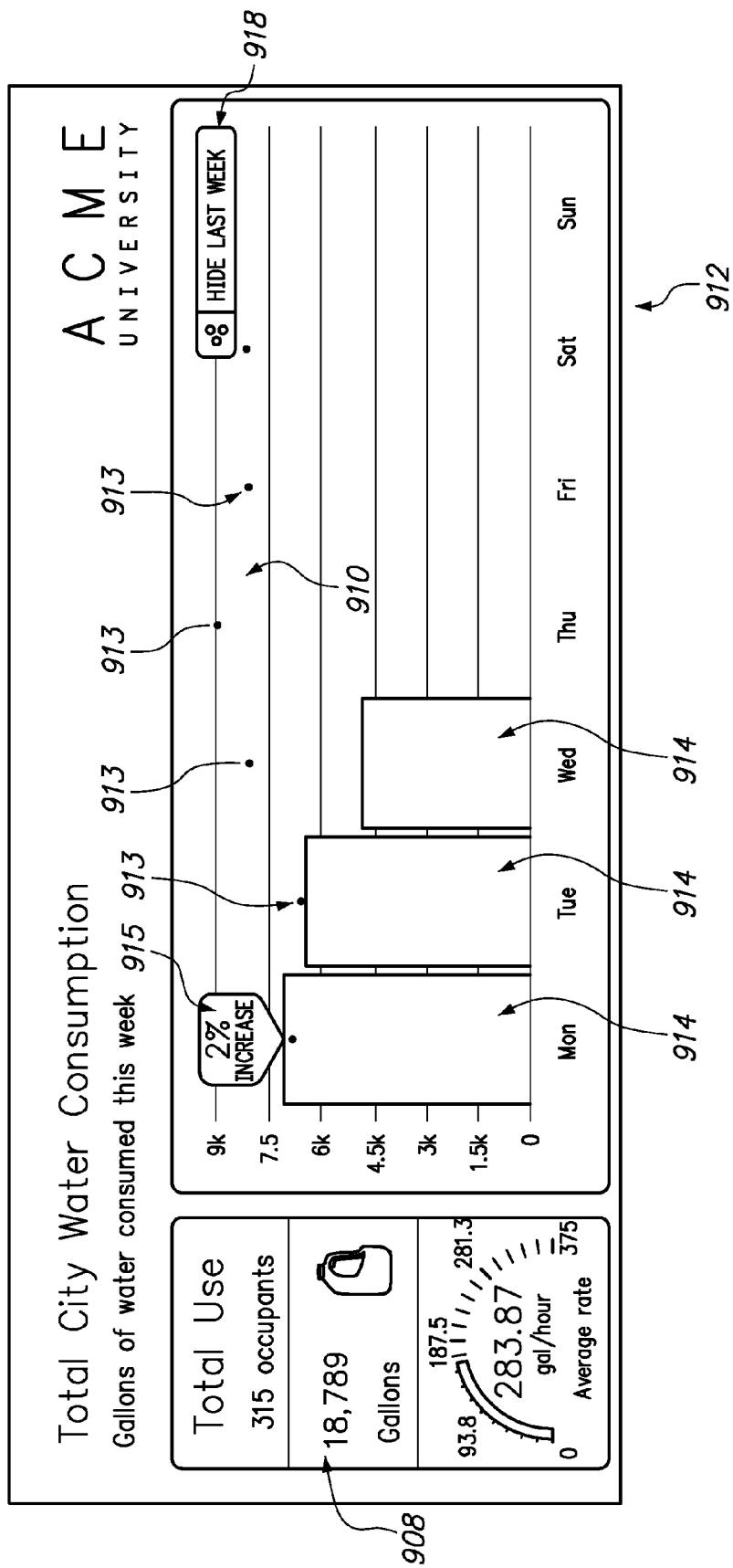

In FIG. 9D, graph 912 shows a time scale comparison of resource usage. Dots 913 indicate last week's usage, while bars 914 indicate this week's usage. Marker 915 indicates the percentage increase (or reduction) from one week to the next. In one embodiment, marker 915 appears when the user hovers over a particular dot or bar. A button 918 is included for hiding last week's usage.

Figure 9E:
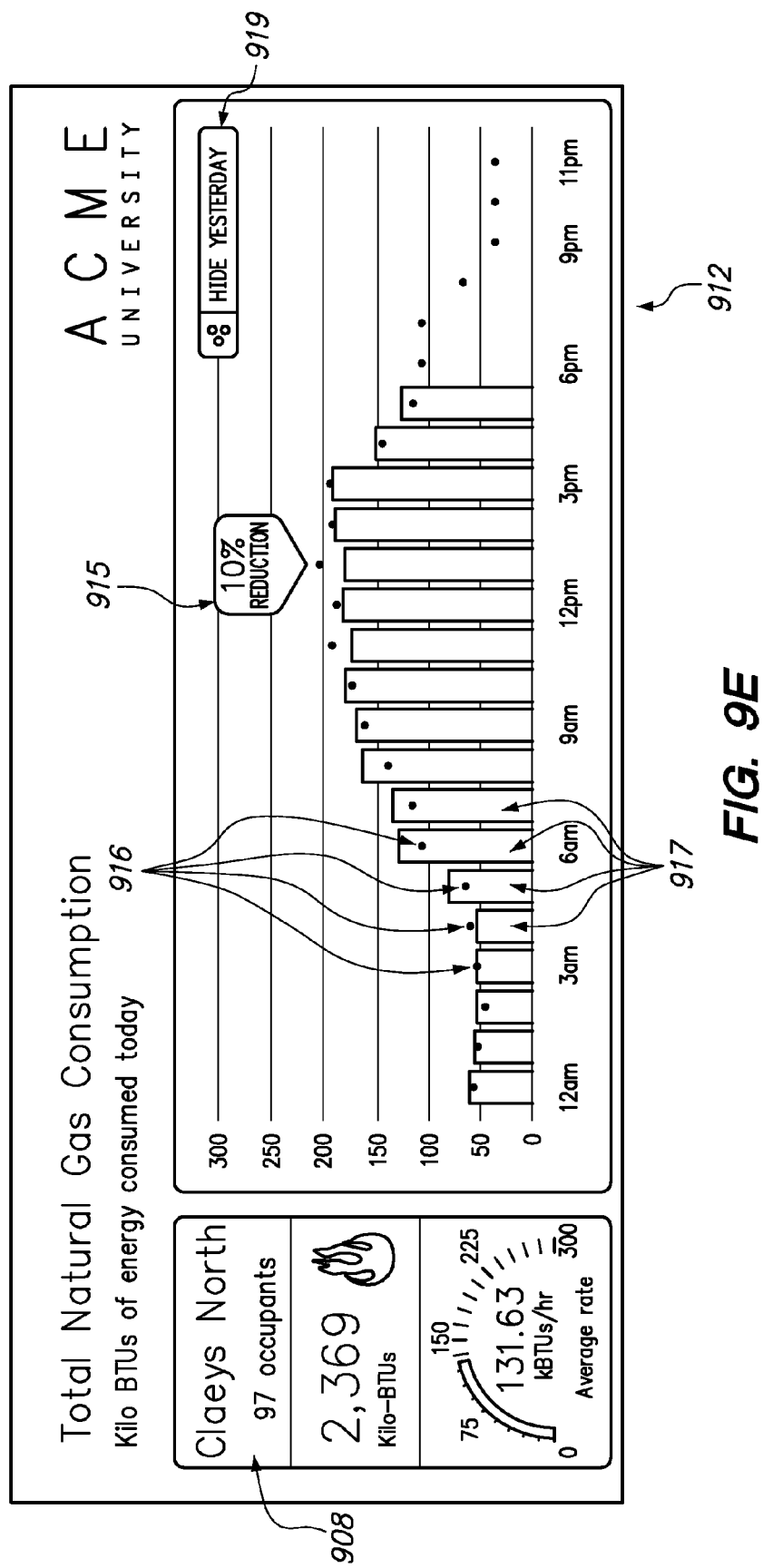

In FIG. 9E, graph 908 shows a time scale comparison of resource usage. Dots 916 indicate yesterday's usage, while bars 917 indicate today's usage. Marker 915 indicates the percentage increase (or reduction) from one day to the next. In one embodiment, marker 915 appears when the user hovers over a particular dot or bar. A button 919 is included for hiding last week's usage.

Referring now to FIG. 10, there are shown examples of user interface screens 1000 and 1020 for multiple-entity comparison of resource usage, according to one embodiment.

In one embodiment, comparisons are similar to competitions but provide some different functionality. As with competitions, in some cases a user may need to obtain permission from another user before gaining access to the other user's resource usage data. In a comparison display, as shown in FIG. 10, the time scales for comparison are not necessarily constrained to a predetermined duration of a competition period. Thus, comparisons provide a mechanism for viewing comparative resource usage data outside the context of a more structured competition. Furthermore, comparisons do not necessarily have a hard start and end date for making a comparison, nor do they necessarily require a baseline for comparison; rather a user can view his or her usage at any given time relative to a neighbor or other user.

In screen 1000, graph 1001 depicts a comparison of resource usage among multiple floors or areas of a building; in addition to a visual depiction in the form of a bar 1002, a numeric value 1003 is also shown for each floor. The user can click on an expansion button 1009 (or on any part of bar 1002) for any displayed floor to show additional information for that floor. One floor is selected for display of expanded information, and detailed information is shown for the selected floor, including current use 1004, watts per person 1005, total use for the day 1006, and per person use for the day 1007. Trends button 1008 can be used to access additional information regarding trends. The user can click on collapse button 1010 to dismiss the additional information. Total usage for the day, among all floors, is displayed in pane 1011.

The user can click on Branch Office bar 1012 to switch the display to screen 1020. Here, graph 1021 depicts a comparison of resource usage among multiple buildings. Again, in addition to the visual depiction in the form of a bar 1002, a numeric value 1003 is shown for each building. Screen 1020 operates in a manner similar to that described above for screen 1000, including expanding and collapsing components of the displayed graph. Total usage for the day, among all offices, is displayed in pane 1022. The user can click on Headquarters bar 1023 to switch the display to screen 1000.

Referring now to FIGS. 11A through 11D, there are shown examples of screens for a wizard-type user interface for creating and configuring a new competition or comparison, according to one embodiment of the present invention. In one embodiment, the wizard interface is initiated when the user activates a command for defining and creating a new competition or comparison, for example by clicking on a "Create New" button as shown in FIGS. 13A through 13E, described below.

Figure 11A:
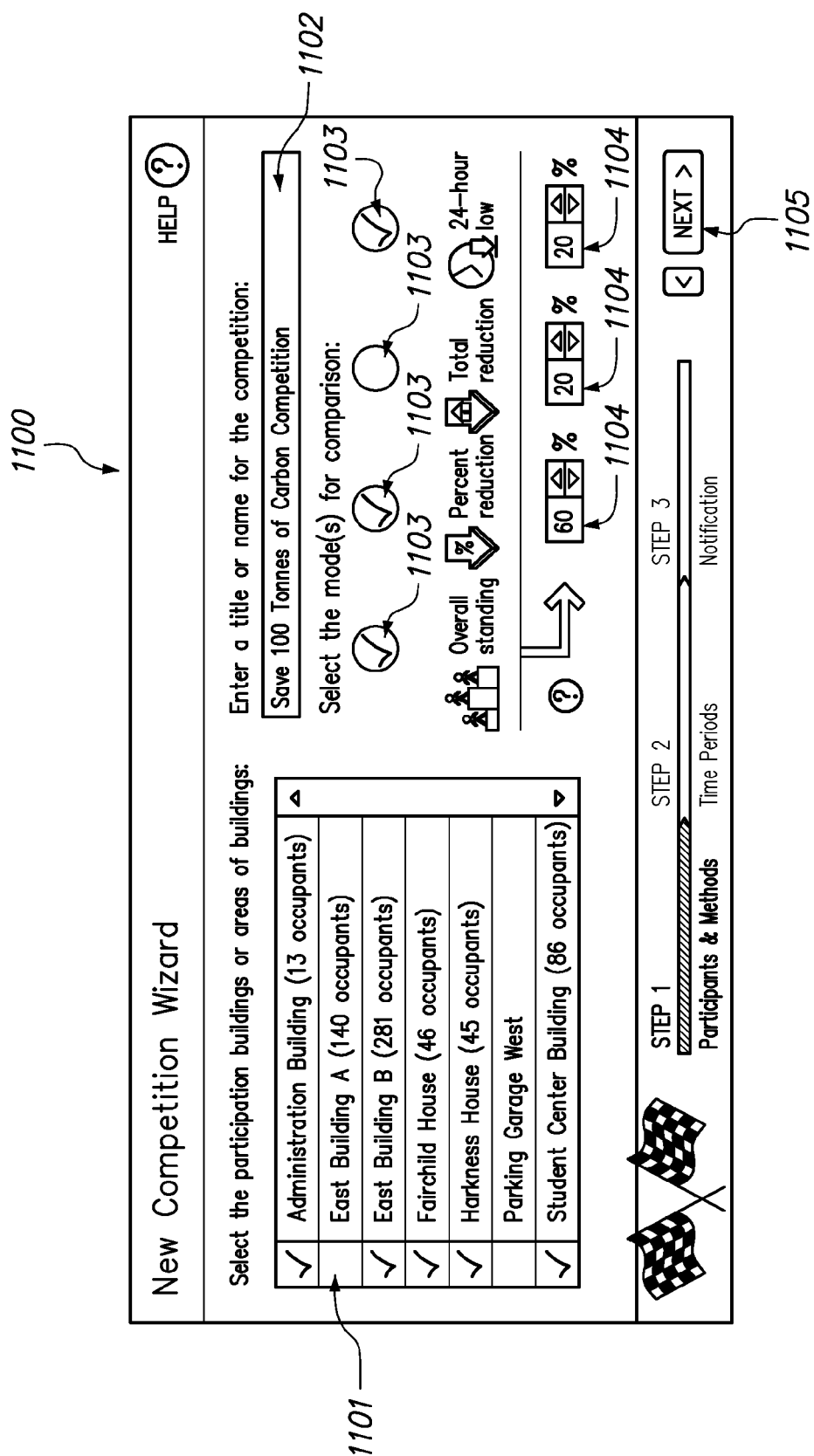
FIGS. 11A through 11D are screen shots depicting examples of screens for a wizard-type user interface for creating and configuring a new competition or comparison, according to one embodiment of the present invention.

The wizard represents a step-by-step, linearly structured interface for defining and creating a new competition or comparison. In Step 1, as shown in FIG. 11A, screen 1100 is presented, allowing a user to select participating buildings, areas of buildings, participants, or the like from list 1101. The user can enter a title for the competition in field 1102. The user then selects the mode(s) for comparison via checkboxes 1103, including for example overall standing, percent reduction, total reduction, and lowest daily use. If overall standing has been selected, then the user assigns percent values in fields 1104, each percent value corresponding to one of the remaining modes for calculation of the overall standing. The user clicks "Next" button 1105 to proceed.

Figure 11B:
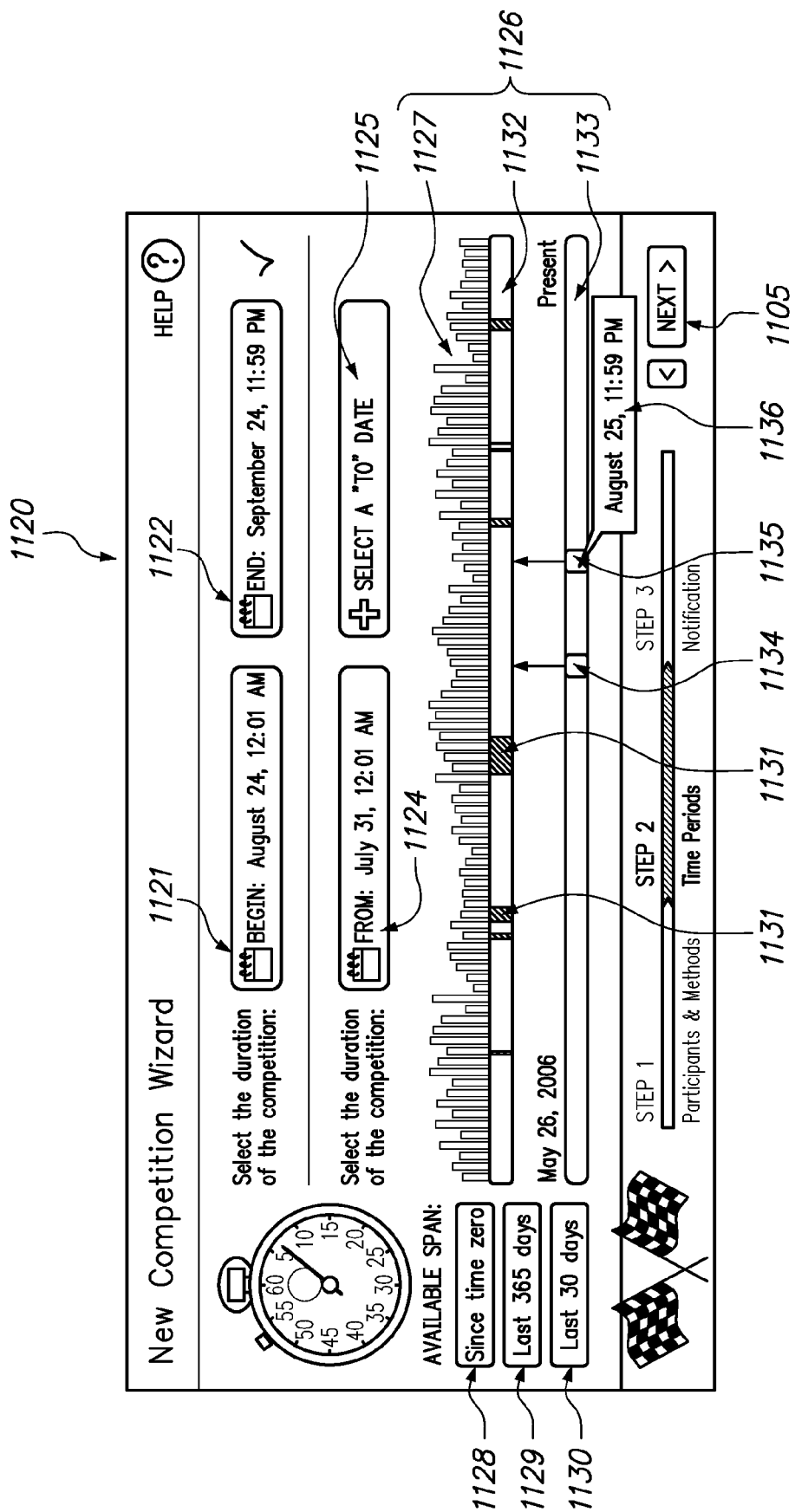
Figure 11C:
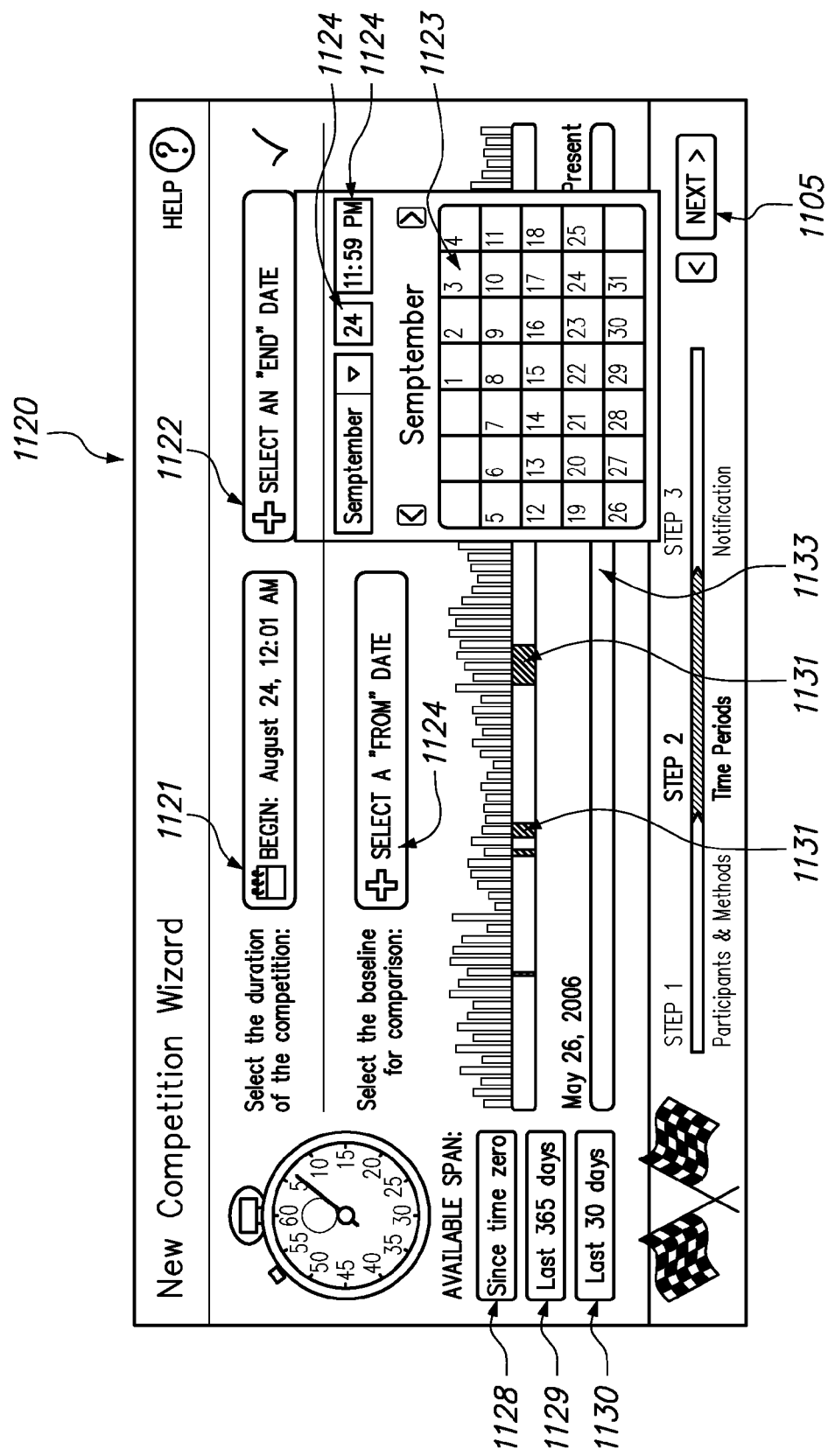

In Step 2, as shown in FIGS. 11B and 11C, screen 1120 is presented, allowing the user to specify one or more time periods for the competition. The user selects the duration of the competition, including a beginning date and time and an ending date and time, using buttons 1121 and 1122. In one embodiment, clicking on a button 1121 or 1122 opens a date selection interface pane 1123 as shown in FIG. 11C. The user can directly type the date and time into available fields 1124 or select the date and time by clicking within pane 1123.

Returning to FIG. 11B, the user selects the baseline for comparison, including a beginning date and time and an ending date and time, using buttons 1124 and 1125. This selection is accomplished in similar fashion as the selection of competition duration. In one embodiment, the baseline selection is accompanied by visual depiction 1126 of historical data for the selected period.

In one embodiment, visual depiction 1126 of historical data includes three main elements: bar graph 1127, banded timeline 1132, and interval selector 1133. Bar graph 1127 displays a snapshot of usage over an available span. The user can select which available span is displayed by clicking on one of buttons 1128, 1129, or 1130. Button 1128 causes a time span beginning at time zero to be shown; button 1129 causes data spanning the last 365 days to be shown; button 1130 causes data spanning the last 30 days to be shown.

Banded timeline 1132 includes bands 1131 representing missing or corrupted data, or some other data set affecting resource usage such as weather conditions, building management operations, or the like.

Interval selector 1133 allows the user to select the baseline via a graphical approach, by dragging handles 1134, 1135 along selector 1133. Handle 1134 represents the start of the baseline period, and handle 1135 represents the end of the baseline period. In one embodiment, a text depiction of the date and time 1136 represented by the handle 1134 or 1135 is shown while the user is dragging handle 1134 or 1135. The user clicks "Next" button 1105 to proceed.

In another embodiment, the user may specify different types of baselines, as desired. For example, the user may select to use consumption at varying resolutions or at a particular moment in the past, rather than an average of consumption over an interval of time. For instance, consumption on Jul. 4, 2007 may be compared to consumption on Jul. 4, 2006, rather than comparing consumption on Jul. 4, 2007 to average consumption over a longer baseline interval of June 1 to August 31. Alternatively, the user may select to standardize consumption based on a number of factors, including occupancy, square feet, building type, zip code, social or geographic group, or weather conditions. Alternatively, the user may select a baseline pertaining to a different building or area of a building. This would allow participating entities to try to reduce usage below levels witnessed by other entities. One skilled in the art will recognize that many other variations are possible.

Figure 11D:
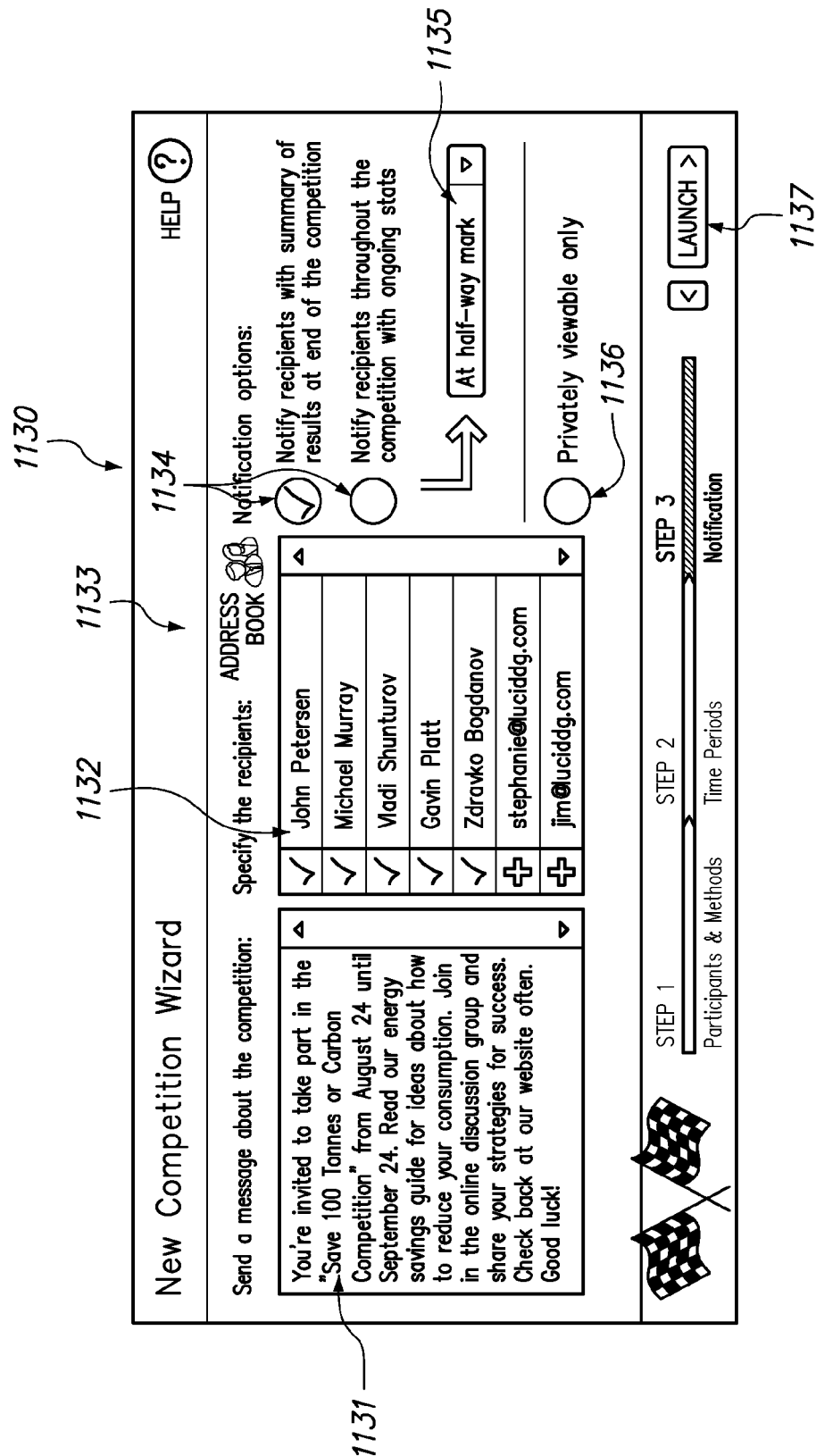

In Step 3, as shown in FIG. 11D, screen 1130 is presented, allowing the user to specify notification options for the competition. In field 1131, the user can enter a message about the competition, or can select (and, if desired, modify) a predefined or saved message from a list. The user specifies the recipients of the message with appropriate contact information, by selecting from list 1132, or accessing an address book via button 1133, or by direct entry of email addresses or other contact information. Checkboxes 1134 allow the user to specify when the recipients will be notified. Examples of notification options include: notifying recipients with a summary of the relative results of all competing entities upon completion of the competition; or sending user-generated or auto-generated recommendations and tips based on analysis of current and previous performance. The user can also specify whether or not to notify recipients throughout the competition with ongoing relative performance information of all competing entities. The user can also specify, via pop-up menu 1135, the frequency or threshold at which the information will be sent. For example, current statistics or recommendations may be sent when the competition is half way over, or when competing entities are performing very similarly, or when individual entities are under-performing or increasing and not decreasing usage. Checkbox 1136 can be used to indicate whether the information should be private or public. The user initiates the new competition by clicking on "Launch" button 1137. The user is taken back to the main competition screen (as depicted above in connection with FIG. 7) and a new competition list item appears in Competitions pane 701.

In another embodiment, the user can select different options for the display or publication of competition data. For example, the performance of a participating entity or entities in a competition may be published to or displayed on a website or blog; on a cell phone, PDA, or similar handheld device; a social networking website such as Facebook, MySpace, or Bebo; or in the form of a widget residing on a computer desktop, on a website, or on a portable or handheld device.

A similar user interface can be implemented for setting up comparisons outside the context of a competition.

Figure 12A:
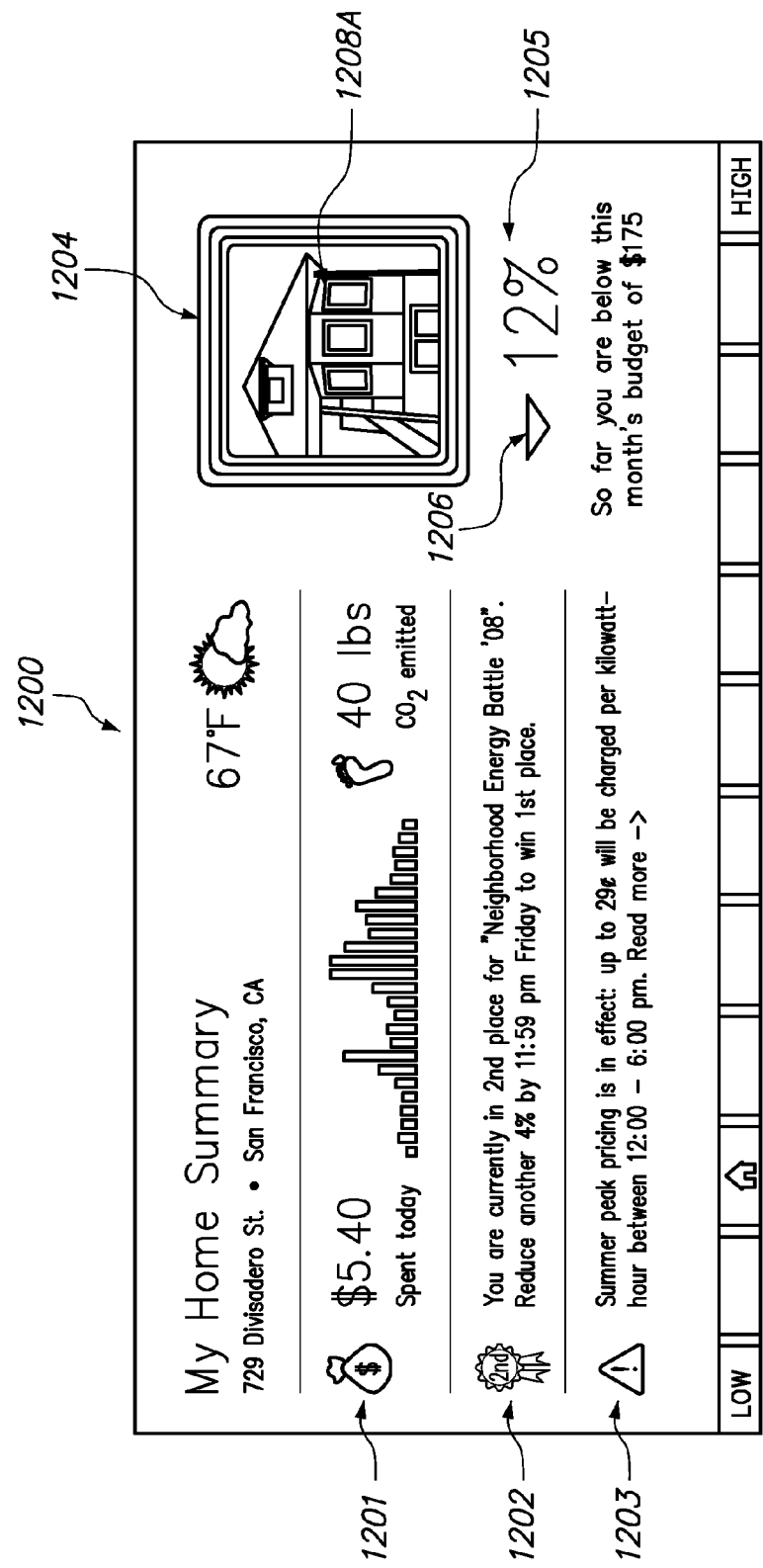
FIGS. 12A through 12D are screen shots depicting examples of user interface screens for an iconographic representation of a community comparison, wherein colors are associated with icons to indicate relative levels of resource usage, according to one embodiment of the present invention.

Comparative information, whether in the context of a comparison or outside such a context, can be presented in any of a variety of ways. For example, referring now to FIGS. 12A through 12D, there is shown an alternative representation of a community comparison, including comparative resource usage information. In this iconographic representation of a community comparison, colors are associated with icons to indicate relative levels of resource usage. In FIG. 12A, display screen 1200 includes a summary of resource usage for a home, as compared with other homes in the neighborhood, according to one embodiment. Resource usage summary 1201 shows total resource usage for the day, in text and graphical terms. Relative ranking 1202 is shown, here in the context of a competition, along with an indication of what needs to be done to improve ranking. Additional notices 1203 can also be included, including advertisements, announcements and the like.

Relative resource usage trends are indicated graphically, for example by a color-coded frame 1204 around an icon or image 1208A representing the home being measured. Here, frame 1204 is shown in green to indicate that the home is consuming resources at a lower rate than budgeted. This is reinforced by a numerical designation 1205, downward arrow 1206 (which may also be color-coded), and text box 1207 explaining the usage trend in more detail. Legend 1207 correlates colors with relative resource usage amounts. In one embodiment, legend 1207 includes a spectrum of colors, ranging from green to yellow to orange to red. Each frame 1204 is presented in a color signifying the resource usage rate for the entity associated with the icon or image 1208A surrounded by frame 1204.

Figure 12B:
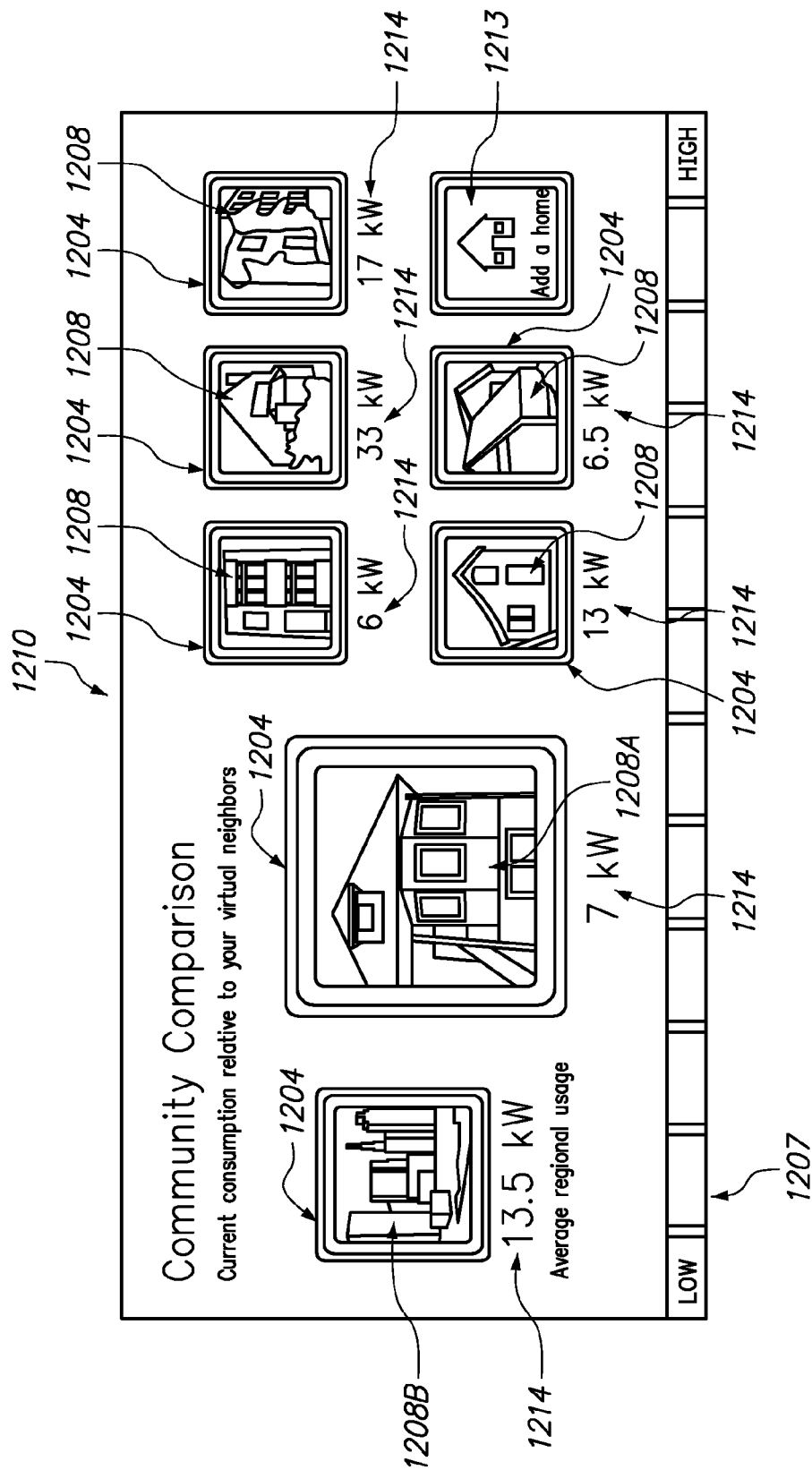

In FIG. 12B, screen 1210 shows a comparison of a particular building's resource usage with that of others, forming a set of "virtual neighbors". Each building (or other entity) is shown via an image or icon 1208, with a frame 1204 that is color-coded to indicate relative resource usage. Other visual indicators can be used in lieu of or in addition to the color-coded frame 1204. Numeric indicators 1214 can also be shown. In one embodiment, the home being compared is shown with a larger image or icon 1208A than the others. In addition, an image or icon 1208B can be included for average regional usage, with an appropriately colored frame 1204. In one embodiment, legend 1207 includes a spectrum of colors, ranging from green to yellow to orange to red. Each frame 1204 is presented in a color signifying the resource usage rate for the entity associated with the icon or image 1208, 1208A, or 1208B surrounded by frame 1204. In the example, frame 1204 surrounding image 1208B is yellow, frame 1204 surrounding image 1208A is green, and the other frames 1204 are variously green, red, orange, and yellow to indicate relative resource usage levels.

The user can click on "Add a home" button 1213 to add another building or other entity for comparison.

Figure 12C:
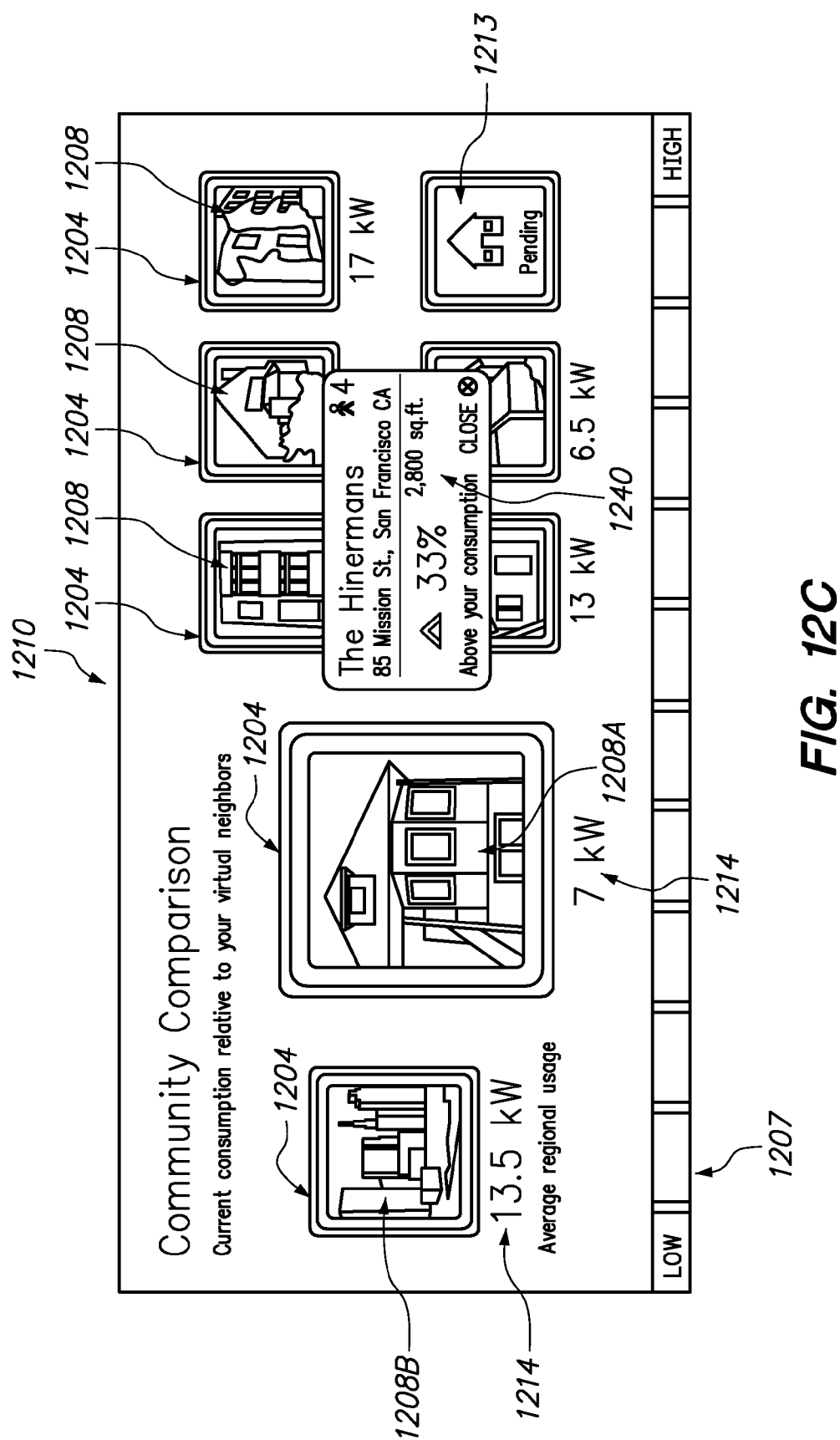

As shown in FIG. 12C, in one embodiment, hovering over a displayed image or icon 1208 causes additional information 1240 to be shown for the building or entity associated with the image or icon 1208. The additional information 1240 can include comparative information with respect to the user's home or entity (for example, "33% above your usage"). The additional information 1240 can be presented numerically, in text, and/or graphically. In the example of FIG. 12C, the relative usage of the building is shown numerically and as a color-coded upward arrow.

Figure 12D:
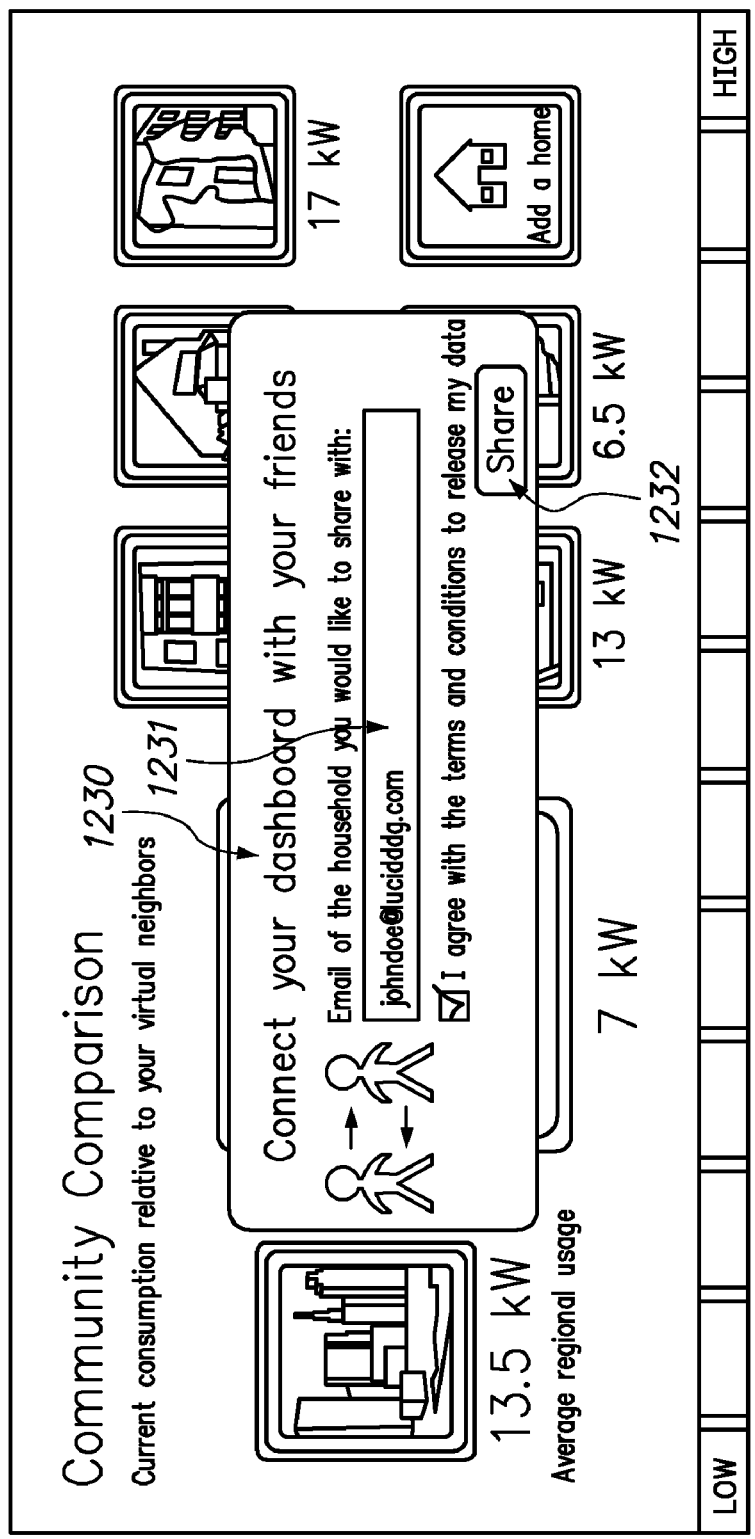

Clicking on "Add a home" button 1213 initiates the process of adding a new building (or entity) to the display. The user is given an opportunity to specify an email address of another user with which to exchange resource usage information. FIG. 12D shows an example of a dialog box 1230 including field 1231 for entering an email address. Once the user clicks on share button 1232, an email message is sent to the specified recipient, inviting the recipient to exchange resource information and thereby add the recipient's building to the user's comparative display.

Referring now to FIGS. 13A through 13E, there is shown an example of a set of screens for a user experience for viewing a competition, according to one embodiment of the present invention.

Figure 13A:
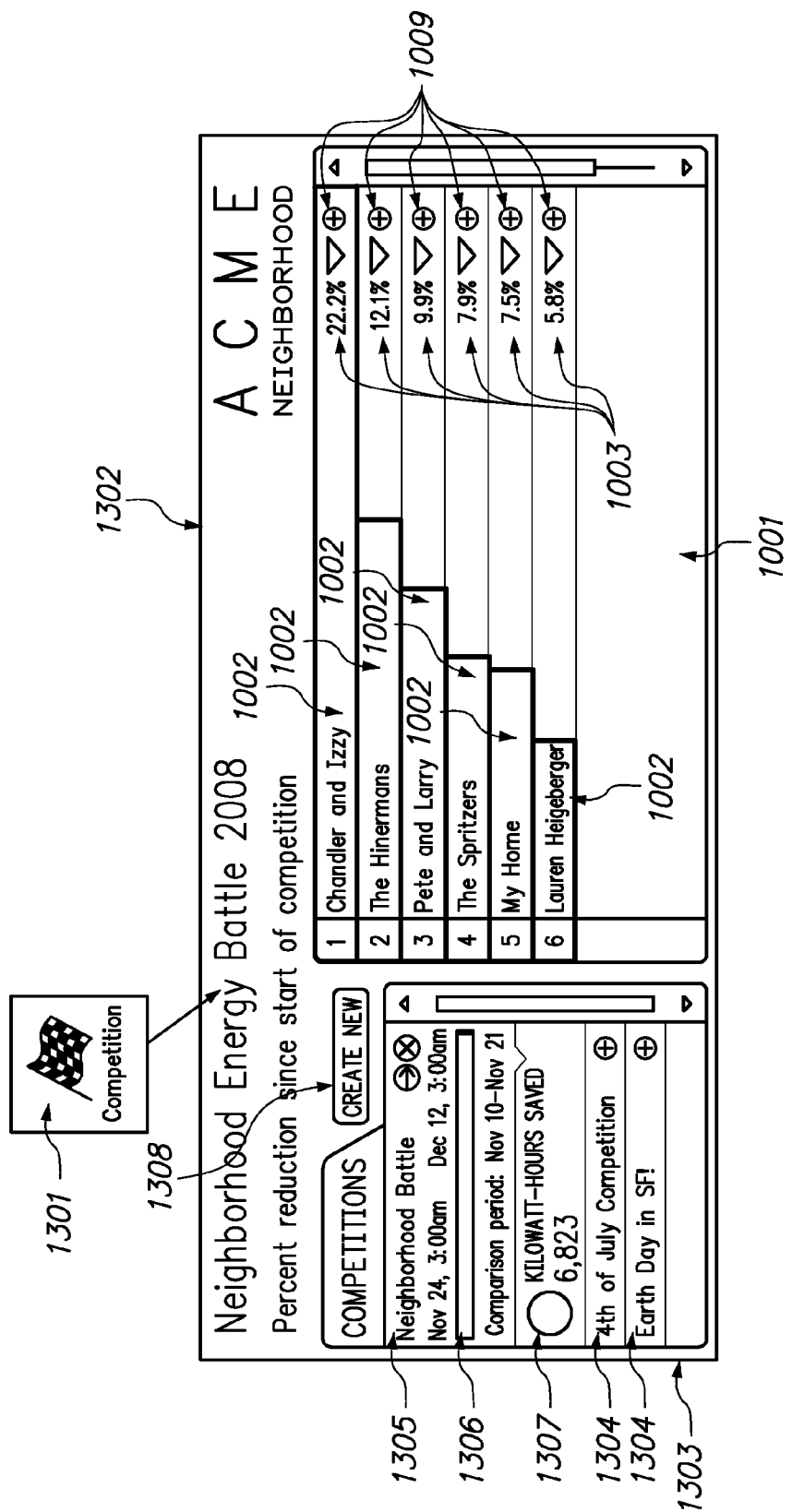
FIGS. 13A through 13E are screen shots depicting examples of screens for a user experience for viewing a competition, according to one embodiment of the present invention.

As shown in FIG. 13A, the user clicks on competition button 1301 to initiate display of screen 1302. Graph 1001 depicts a comparison of resource usage among various homes, buildings, or other entities; in addition to a visual depiction in the form of a bar 1002, a numeric value 1003 (here representing percent reduction since start of competition) is also shown for each entity. Entities are ranked by their performance, according to percent reduction since start of competition. The user can click on an expansion button 1009 (or on any part of bar 1002) for any displayed entity to show additional information for that entity.

A list 1303 of competitions 1304 is shown. The user can select any competition 1304 to see more detailed information and to open the graph for that competition. A summary 1305 of the currently open competition is shown, including an indication of the comparison period 1306 and total resources saved 1307. "Create new" button 1308 allows the user to create a new competition, for example using the wizard described above in connection with FIGS. 11A through 11D.

In one embodiment, bars 1002 are color coded to indicate relative performance in the competition. The top-ranked entity has a green bar 1002, and the bottom-ranked entity has a red bar 1002. Various colors are used for intermediate bars, indicating a spectrum of performance levels.

Figure 13B:
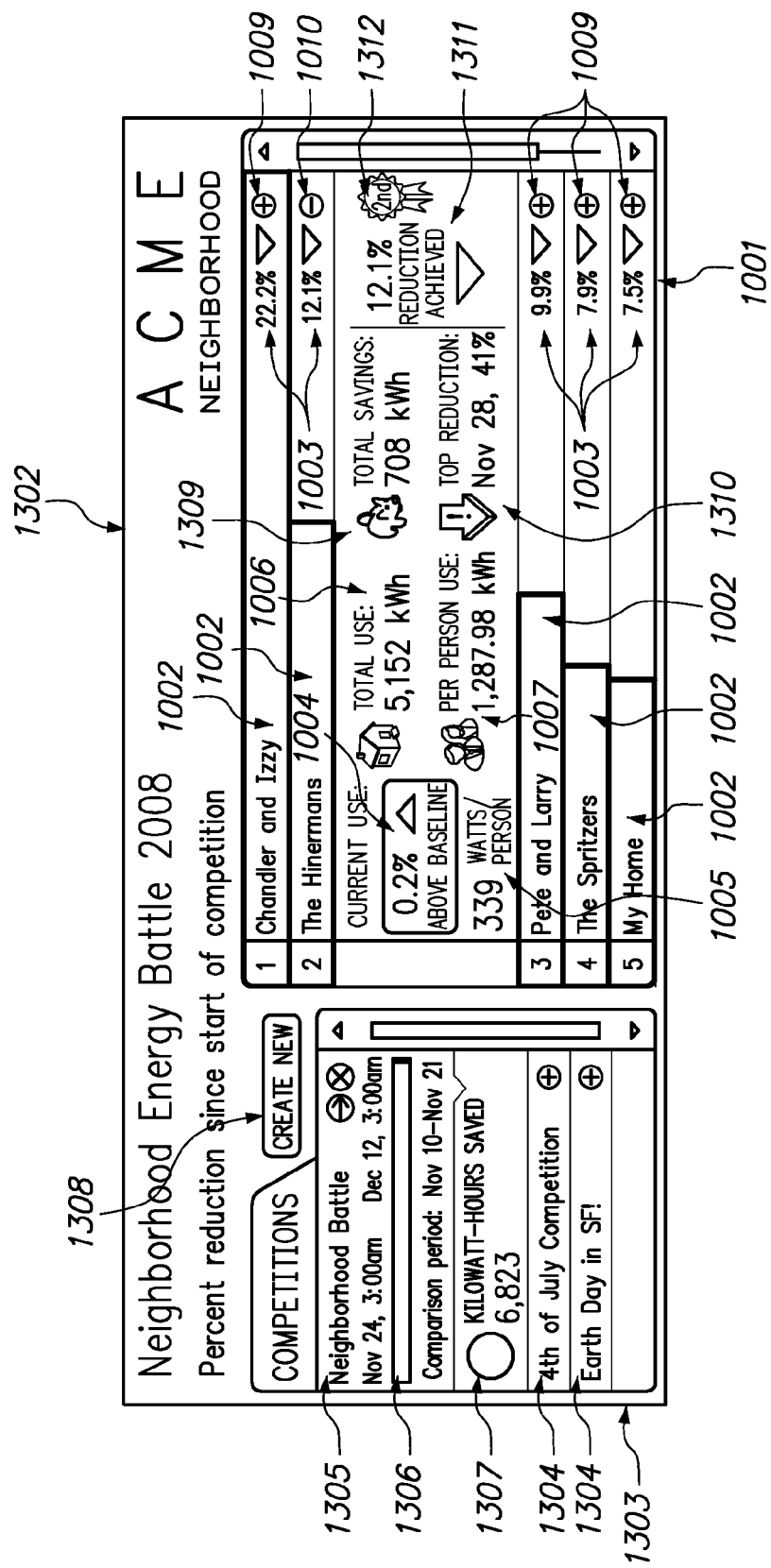

In FIG. 13B, one entity (a participant in the competition) is selected for display of expanded information, and detailed information is shown for the selected entity, including current use 1004, watts per person 1005, total use 1006, per person use 1007, total savings 1309, top reduction amount and date 1310, and total reduction achieved 1311 (expressed here as a percentage). A rank 1312 is also shown. The user can click on collapse button 1010 to dismiss the additional information.

Figure 13C:
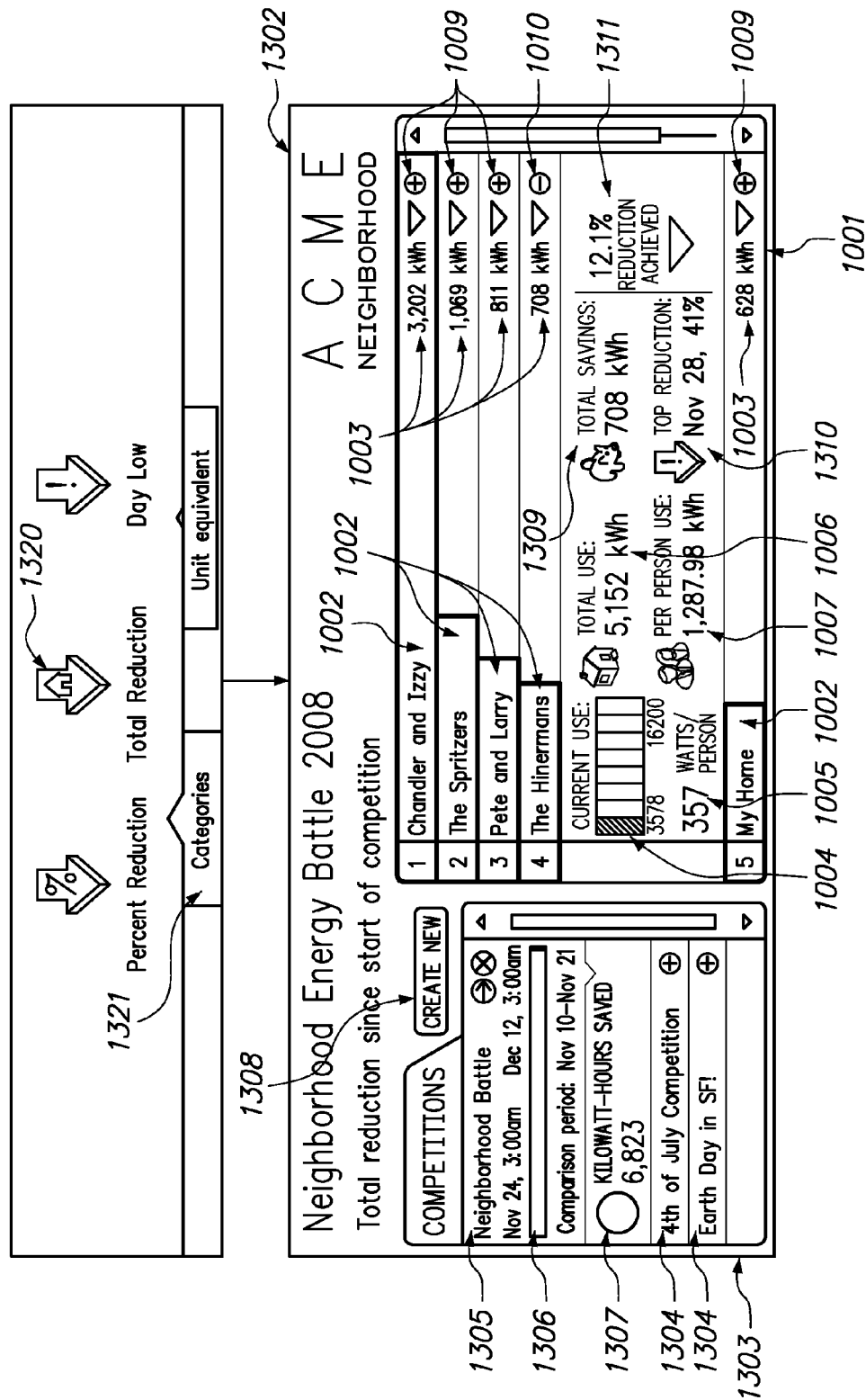

Any of several different viewpoints can be shown. As shown in FIG. 13C, clicking on an option from "Categories" menu 1321 changes the way in which entities are evaluated according to usage or reductions in usage, or how different entities are performing relative to each other or to their own previous levels of usage. For example, clicking on "total reduction" button 1320 changes the display to indicate total reduction for each entity, rather than percent reduction. Graph 1001 is resorted to rank entities by their performance, according to total reduction since start of competition.

In general, entity performance can be viewed according to any desired method, such as for example: total reduction, per person reduction, per area reduction, percent reduction, lowest daily use, top reduction, and/or relative overall standing using a custom metric. Each of these will be described in turn.

Total reduction represents the total or absolute reduction amount witnessed over a competition period as compared to a baseline period. This method is used, for example, for comparing resource usage across buildings of similar types, sizes, occupancies or other characteristics. For example, occupants in a large building may reduce usage by a greater total amount because of the building's inherent size, whereas occupants in a small building may reduce usage by a lesser total amount but still witness a greater percent reduction. Per person reduction represents the total per person reduction amount witnessed over the competition period as compared to the baseline period. Per area reduction represents the total per square foot or square meter reduction amount witnessed over the competition period as compared to the baseline period.

Percent reduction represents the percent reduction amount witnessed over the competition period as compared to the baseline period. This method is used, for example, for comparing use across dissimilar buildings. Percent reductions present a fairer competition setting in such contexts, by indirectly accounting for the range of inefficiencies, building characteristics and occupancy numbers found in different buildings.

Lowest daily use represents the day during which the lowest total use had been achieved during the competition. This method is useful for tracking reduction milestones and motivating competition participants to strive for greater reductions that surpass previous days of lowest use. Top reduction is the day during which the greatest percent reduction had been achieved during the competition.

Overall standing is a points-based mode in which entities are ranked according to a custom reduction metric. In one embodiment, the performance of each entity is determined by assigning a percent value to total reduction, percent reduction and top reduction methods, and calculating the overall ranking of all three adjusted methods combined. For example, consider a competition in which the main goal is to stimulate the greatest total reductions and cost savings. Here, a user may choose to assign, for example, 50% to total reduction, 20% to percent reduction and 30% to top reduction. This would scale the overall ranking to favor those buildings or floors that had reduced a greater number of kilowatt-hours, not those that had achieved a greater percent reduction as a function of their previous use.

Upon selecting an "Overall Standing" category (not shown), bars 1002 in graph 1001, and displayed data associated with the bars, change accordingly.

Figure 13D:
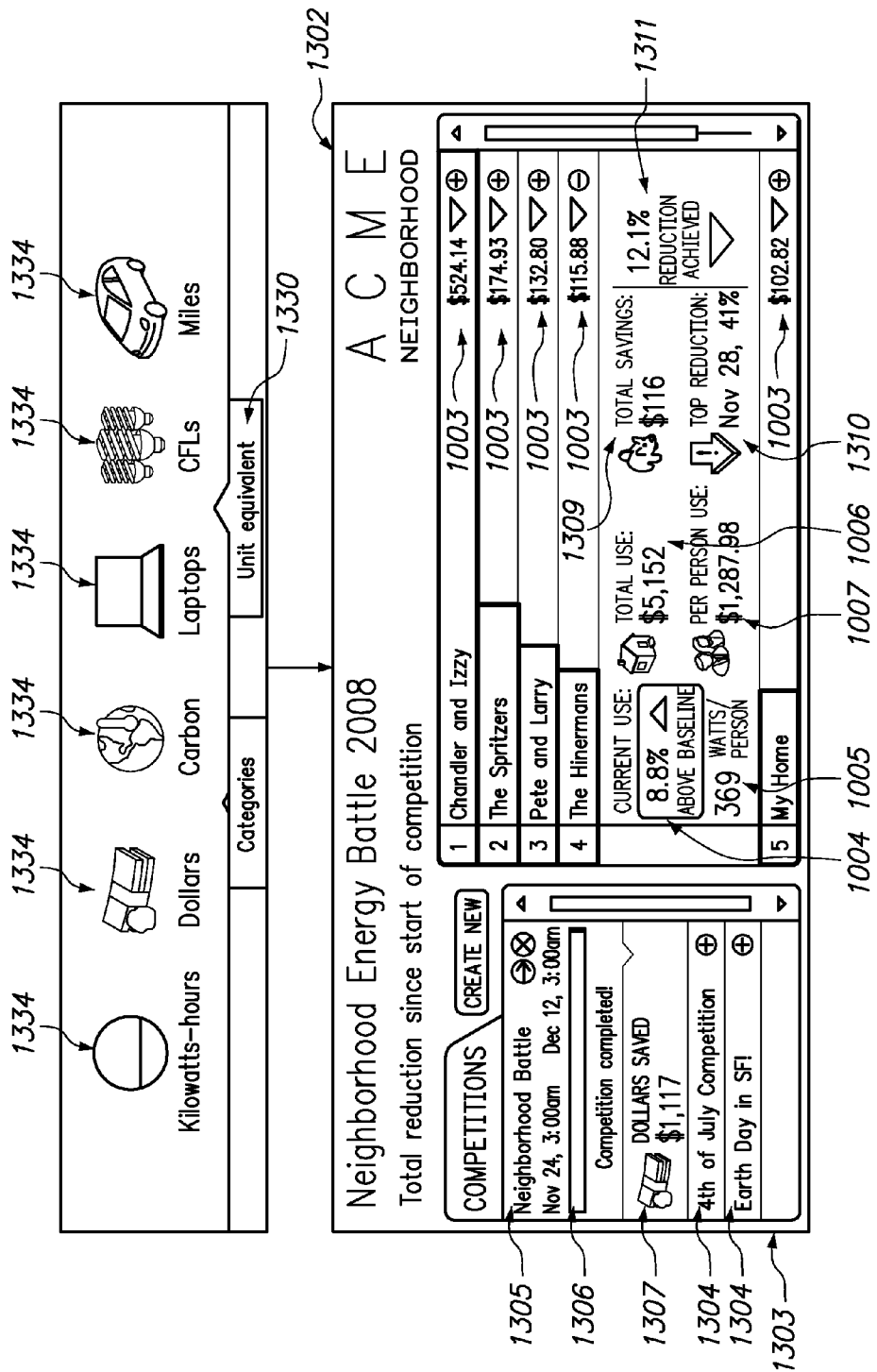

Resource usage can be expresses in any desired units. As shown in FIG. 13D, clicking on "unit equivalent" button 1330 provides access to a number of buttons 1334 for selecting units, so as to change the way in which the performance of entities is expressed. In the example, the user selects "Dollars", causing the display to indicate resource usage in dollar amounts rather than kilowatt-hours (see 1003, 1307, 1006, 1007, 1309, and 1005). Other visual indicators are updated accordingly.

Figure 13E:
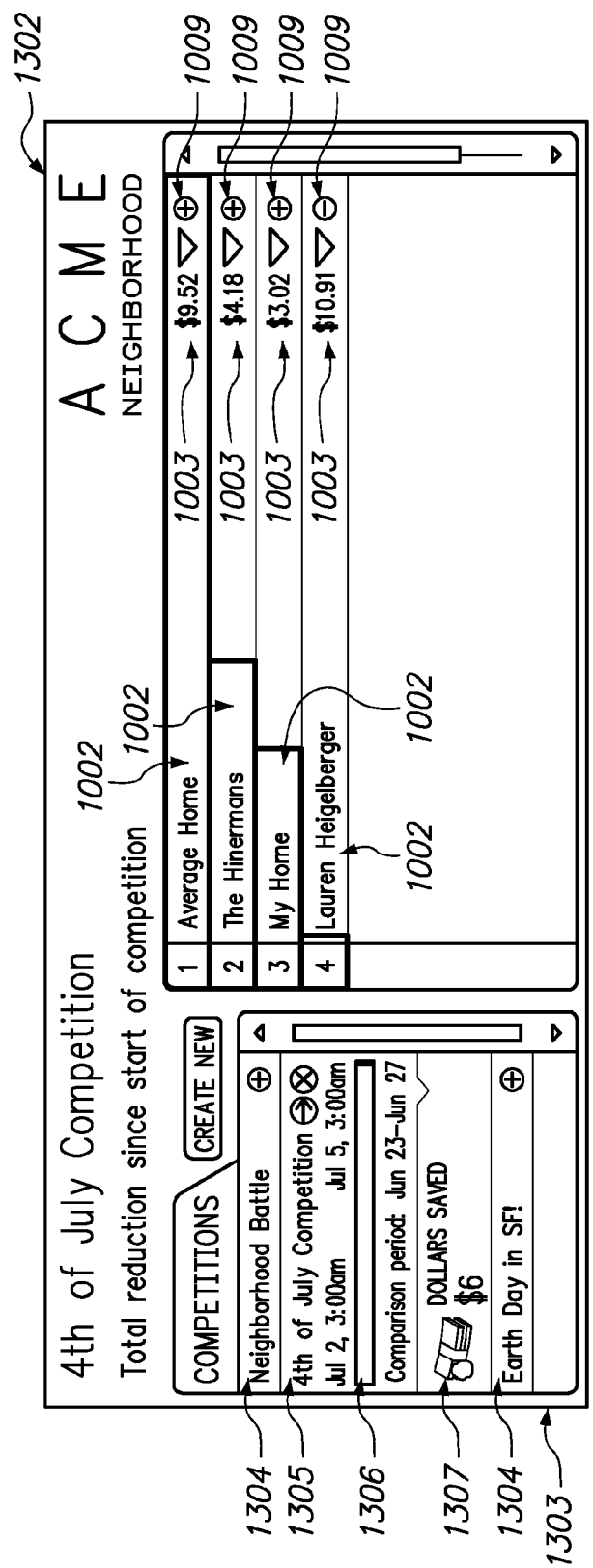

In FIG. 13E, the user has selected a different competition 1304 from list 1303. Accordingly, graph 1001 is updated to depict the selected competition. As described previously, the user can select an entity (a participant in the competition) for display of expanded information.

Referring now to FIGS. 14A through 14F, there are shown examples of screens for various views generated by Event Tagging module 165, according to one embodiment of the present invention.

Figure 14A:
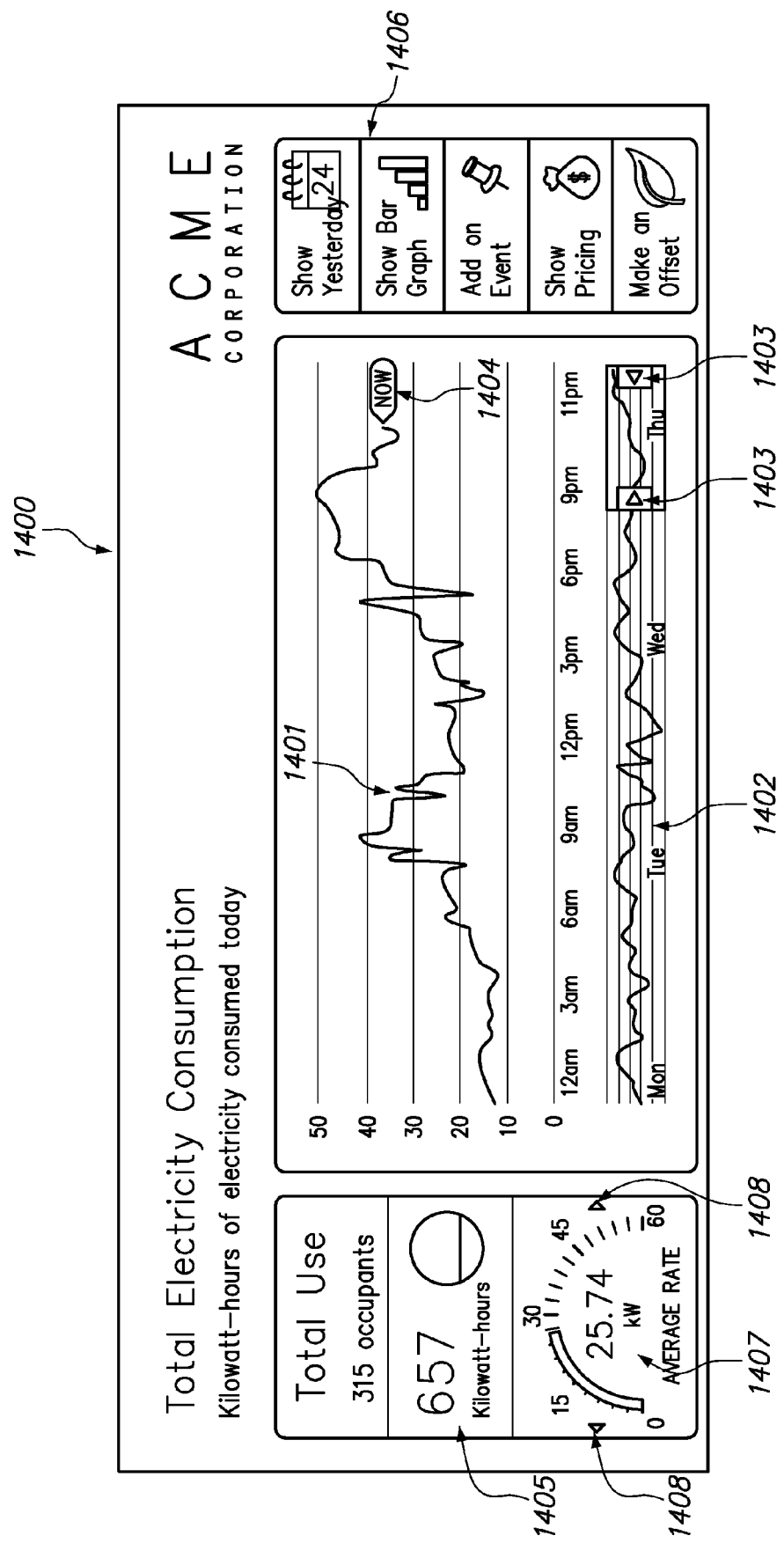
FIGS. 14A through 14F are screen shots depicting examples of user interface screens for various views of an event tagging module, according to one embodiment of the present invention.

FIG. 14A shows a screen 1400 including a time series graph 1401 showing resource usage over a user-defined custom time scale. The time scale of graph 1401 is a subsection of extended time scale 1402. The user can change the time scale of graph 1401 by dragging handles 1403. "Now" indicator 1404 shows current usage. Pane 1405 shows total use over the period and an average rate. Average rate is shown in the form of a gauge 1407, with arrows 1408 allowing the user to select alternative ways to represent this information. Menu 1406 provides buttons for displaying additional and/or different data.

Figure 14B:
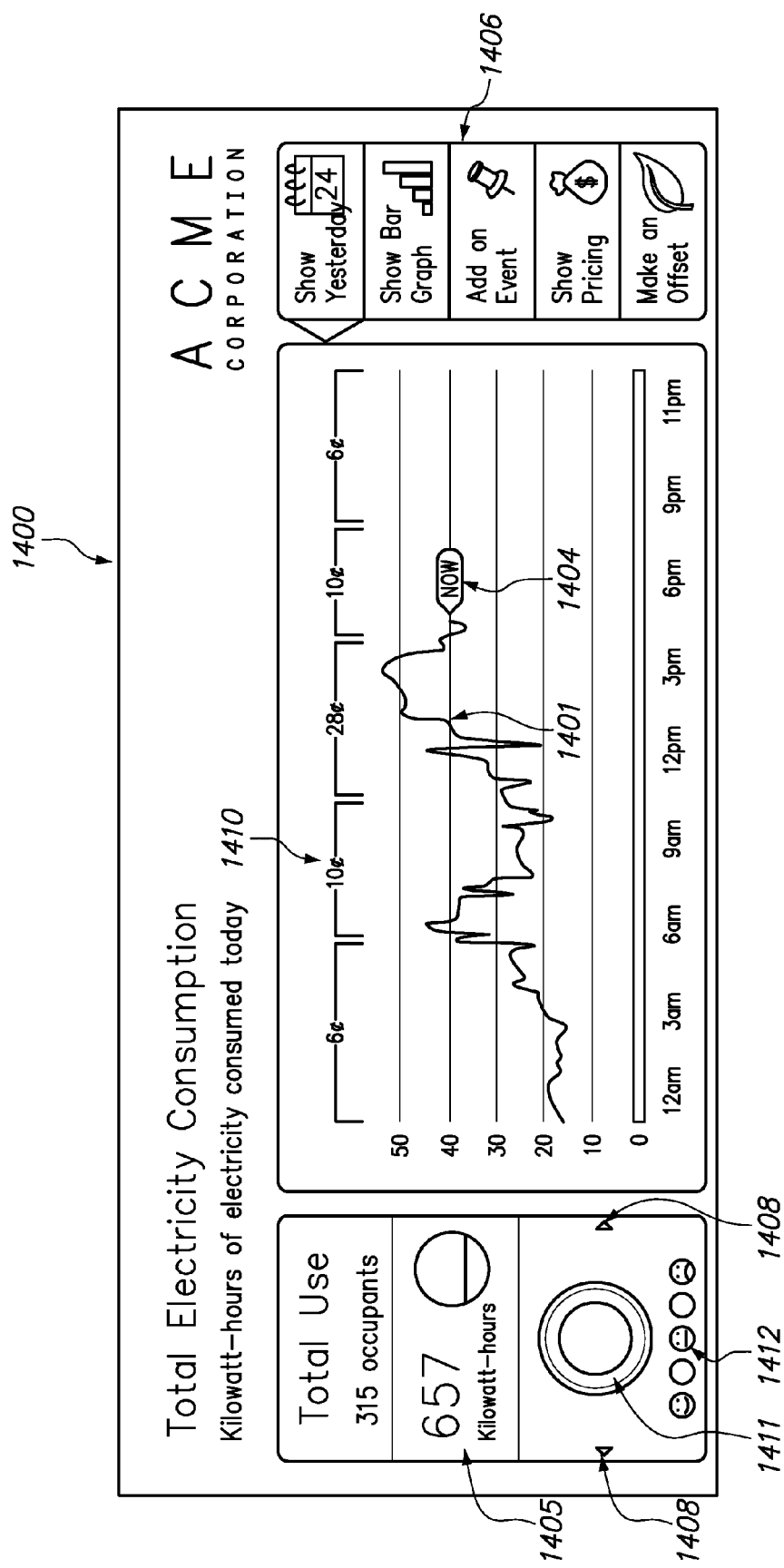

In FIG. 14B, time-of-use pricing 1410 is displayed. Also, the user has clicked on an arrow 1408 causing the resource usage rate to be displayed as a color coded glowing disc or orb 1411 (with legend 1412) in lieu of gauge 1407.

Figure 14C:
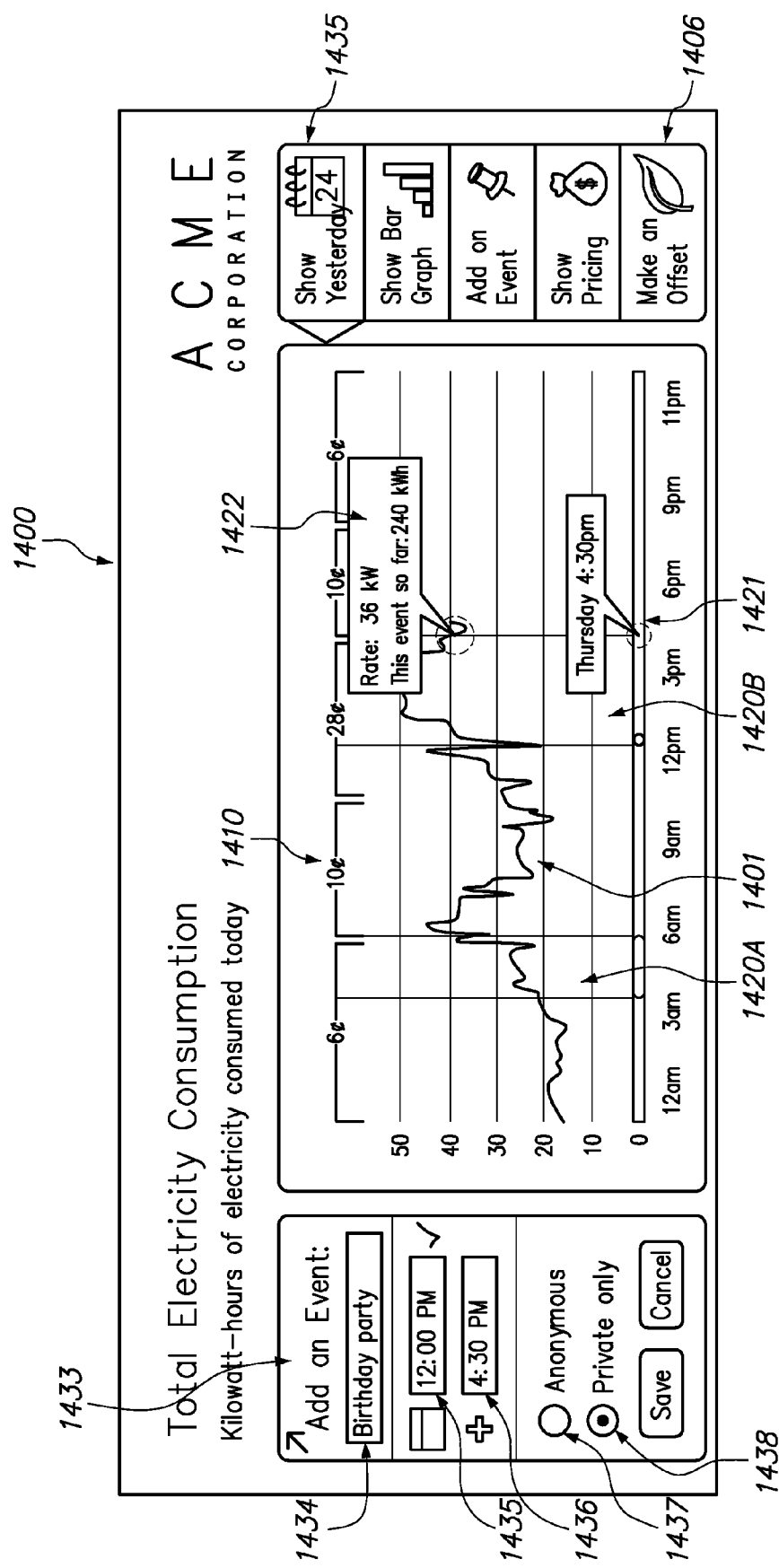

In FIG. 14C, the user has added an event 1420A, and is in the process of adding a second event 1420B. Events 1420A, 1420B are shown as shaded regions on graph 1401, representing time ranges. The user selects a time range for event 1420B by dragging from start point 1421 in a leftward direction (although the user can drag in either direction, as desired). As the user drags, resource usage information 1422 for the event is shown and dynamically updated. "Add an Event" pane 1433 appears, wherein the user can enter a title in field 1434 and/or can directly enter start/end times in fields 1435, 1436. The user can specify if the event is anonymous or private via radio buttons 1437, 1438. In one embodiment, as the user drags within graph 1401, values in fields 1434 are updated automatically; conversely, as the user enters or updates data in fields 1434, the shaded region on graph 1401 is automatically updated.

Figure 14D:
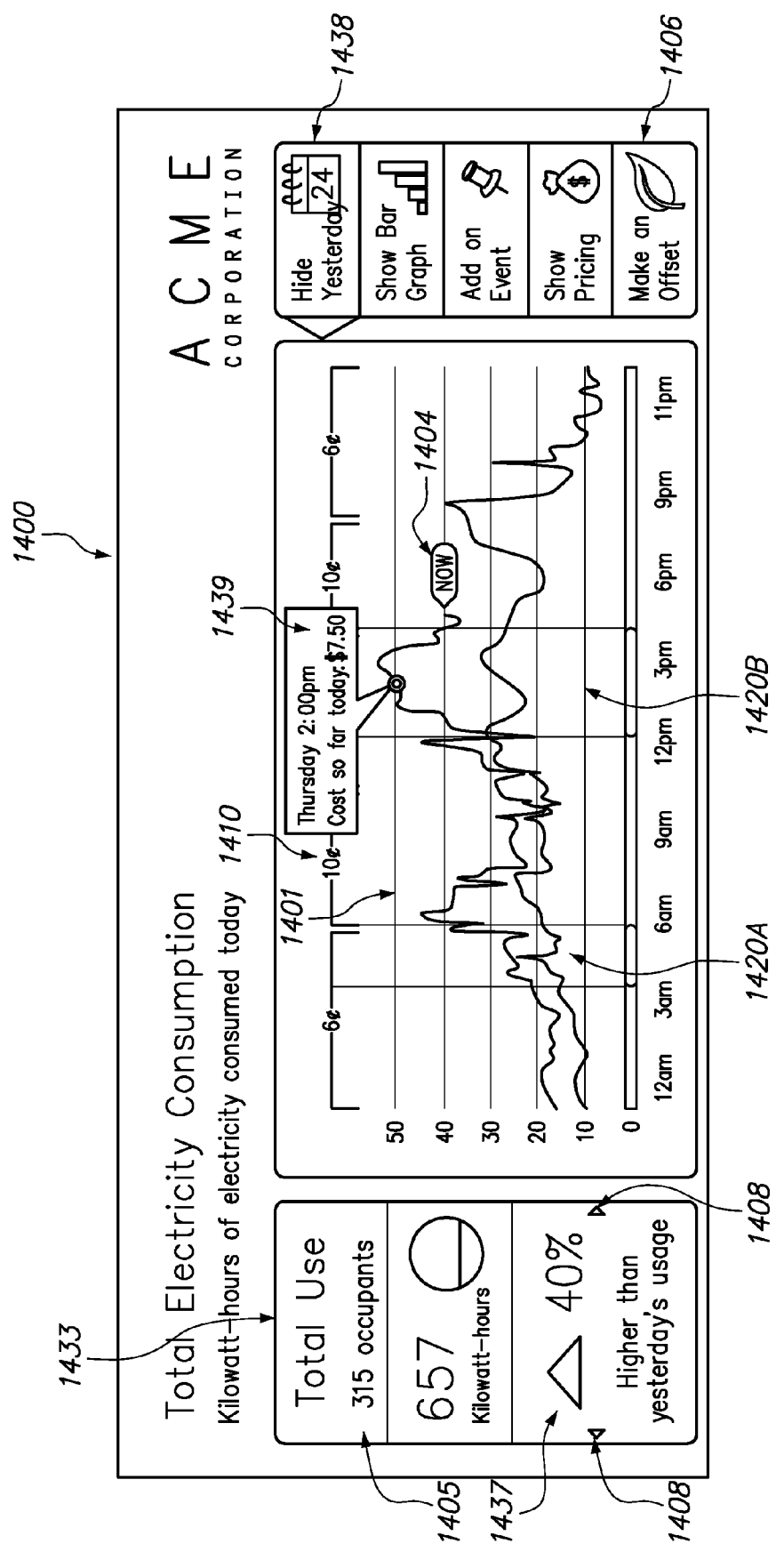

In FIG. 14D, the user has clicked on "Show Yesterday" button 1435 from FIG. 14C, causing yesterday's resource usage to be superimposed on today's resource usage. In one embodiment, color-coding is used to distinguish between the two days. Additional details 1439 for a particular point in time are shown in response to the user causing the cursor to hover over the point of interest. In addition, FIG. 14D illustrates another example of an alternative display of resource usage rate in pane 1405, selected for example by clicking on an arrow 1408. In this alternative display, resource usage is expressed as a numeric and graphical indicator 1437 comparing today's usage with yesterday's usage. "Hide Yesterday" button 1438 allows the user to dismiss the display of yesterday's data.

Figure 14E:
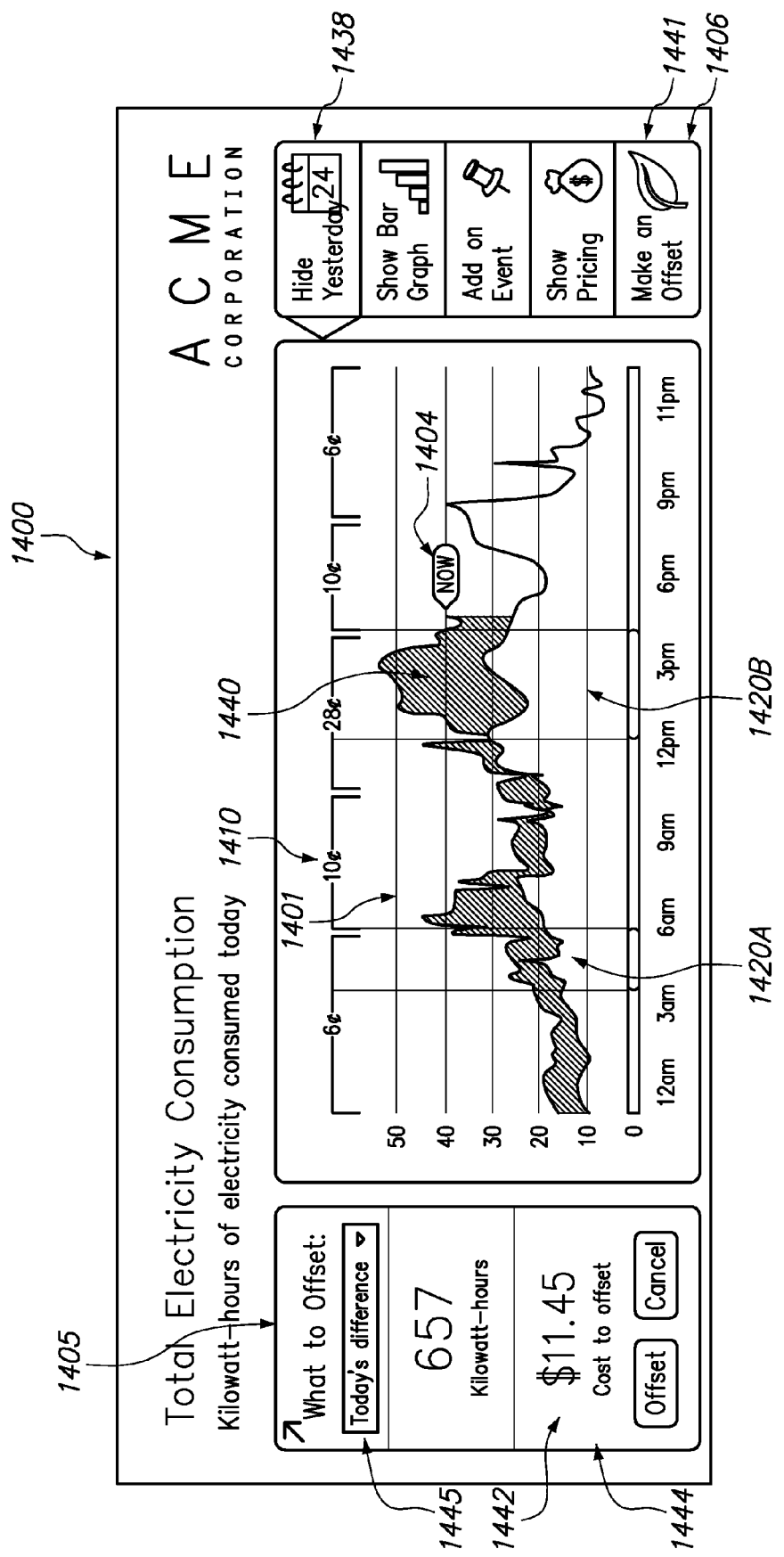

In FIG. 14E, the user has clicked on "Make an Offset" button 1441. The difference in usage between today and yesterday is emphasized by shaded regions 1440, and the user is given an opportunity to offset the difference in usage. Pane 1405 now shows a numeric indicator 1442 of the cost to offset the difference in usage. The user can select, from pop-up menu 1445, what is to be offset. In the displayed example, menu 1445 indicates that the difference in usage between today and yesterday is to be offset, as emphasized by shaded regions 1440. The user can click on "Offset" button 1444 to proceed with the offset, for example by charging a credit card.

Figure 14F:
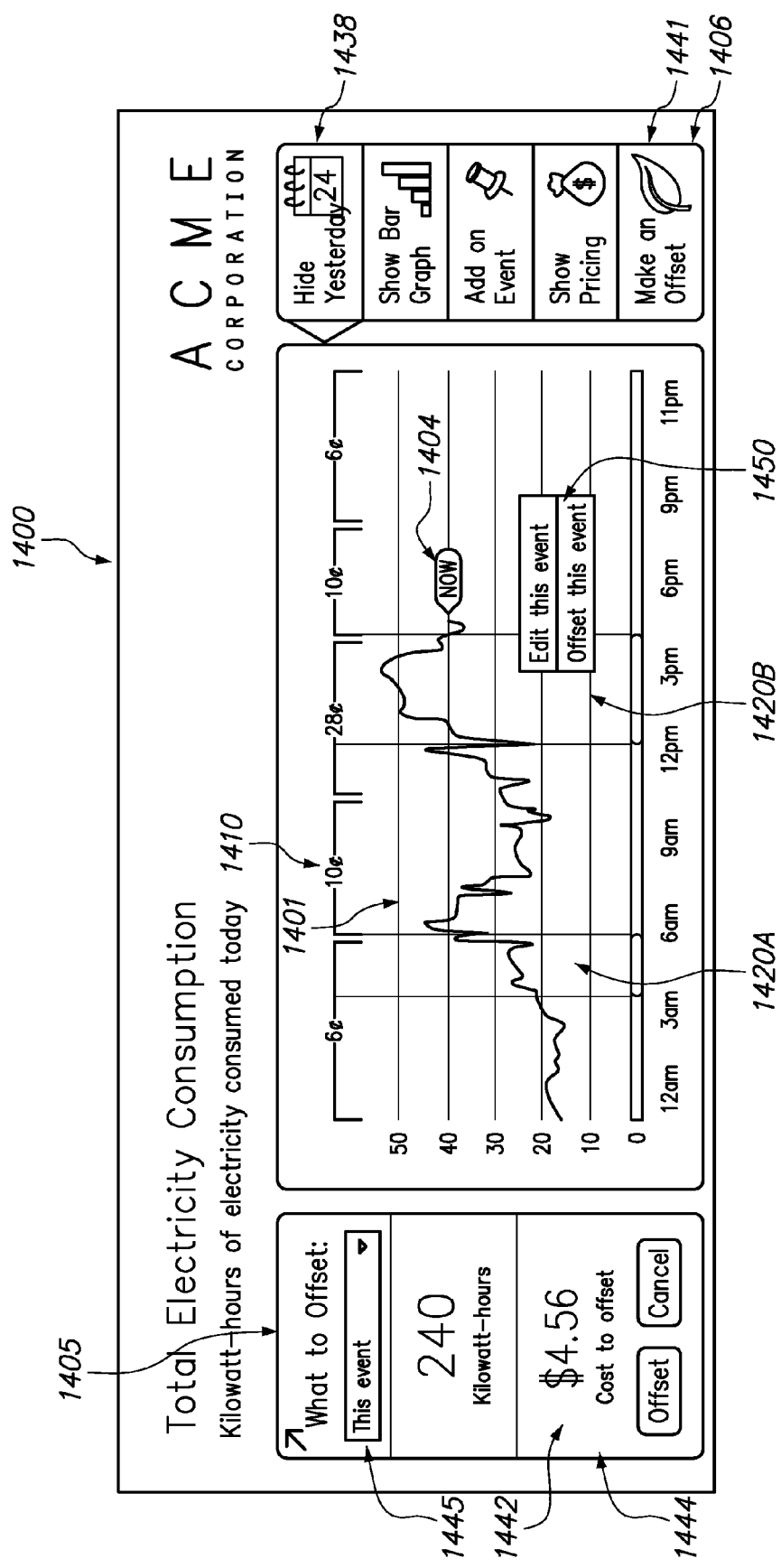

In FIG. 14F, the user selected "this event" from menu 1445, so that the offset amount now corresponds to a specific event. This gives the user the opportunity to offset usage associated with an event. The user selects or right-clicks on a displayed event 1420A or 1420B. In the example, the user has right-clicked on event 1420B, causing pop-up menu 1450 to be displayed. The user can choose to edit the event or offset it. If the user selects "offset this event", the cost to offset the selected event is shown as a numeric indicator 1442. The user can click on "Offset" button 1444 to proceed with the offset, for example by charging a credit card.

One skilled in the art will recognize that all user interfaces depicted herein are merely exemplary, and that other arrangements and displays can be implemented without departing from the essential characteristics of the claimed invention.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be down-loaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Further, the computers referred to herein may include a single processor or may be architectures employing multiple processor designs for increased computing capability.

The algorithms and displays presented herein are not inherently related to any particular computer, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for generating and displaying a user interface for interactive presentation of comparative resource usage data, comprising:
   collecting, via at least one electronic monitoring device, resource usage data associated with a plurality of entities, wherein the resource usage data indicates a consumption quantity for at least one selected from the group consisting of electricity, natural gas, and water;
   storing, in an electronic storage device, the collected resource usage data;
   at an input device, receiving user input specifying parameters for at least one comparative analysis of the collected resource usage data, the at least one comparative analysis comprising a competition among entities;
   at the input device, receiving user input specifying at least one event;
   based on the user input:
      performing at least one comparative analysis according to the specified parameters; and
      transforming the stored resource usage data to generate at least one interactive display presenting results of the comparative analysis indicating standings for the competition; and
   outputting the at least one interactive display;
   wherein performing the at least one comparative analysis comprises determining an effect of the at least one event on resource usage.

2. The computer-implemented method of claim 1, wherein receiving user input specifying parameters comprises receiving at least one selected from the group consisting of:
   a duration for the competition;
   a set of entities participating in the competition;
   a type of resource for which usage is to be compared in the competition;
   a baseline;
   a baseline calculation method;
   notification options;
   a ranking methodology for generating rankings based on comparative resource usage;
   an incentive for participating in the competition; and
   an incentive to be awarded based on results of the competition.

3. A computer-implemented method for generating and displaying a user interface for interactive presentation of comparative resource usage data, comprising:
   collecting, via at least one electronic monitoring device, resource usage data associated with a plurality of entities, wherein the resource usage data indicates a consumption quantity for at least one selected from the group consisting of electricity, natural gas, and water;

storing, in an electronic storage device, the collected resource usage data;

at an input device, receiving user input specifying parameters for at least one comparative analysis of the collected resource usage data;

at the input device, receiving user input specifying at least one event;

based on the user input:
  performing at least one comparative analysis according to the specified parameters; and
  transforming the stored resource usage data to generate at least one interactive display presenting results of the at least one comparative analysis; and outputting the at least one interactive display;

wherein performing the at least one comparative analysis comprises determining an effect of the at least one event on resource usage;

and wherein receiving user input specifying parameters comprises receiving at least one selected from the group consisting of:

a duration for the comparative analysis;

a set of entities for which resource usage data is to be compared;

a type of resource for which usage is to be compared;

a baseline;

a baseline calculation method;

notification options; and a ranking methodology for generating comparative rankings of compared entities.

4. A computer-implemented method for generating and displaying a user interface for interactive presentation of comparative resource usage data, comprising:

collecting, via at least one electronic monitoring device, resource usage data associated with a plurality of entities, wherein the resource usage data indicates a consumption quantity for at least one selected from the group consisting of electricity, natural gas, and water;

storing, in an electronic storage device, the collected resource usage data;

at an input device, receiving user input specifying parameters for at least one comparative analysis of the collected resource usage data;

at the input device, receiving user input specifying at least one event;

based on the user input:
  performing at least one comparative analysis according to the specified parameters; and
  transforming the stored resource usage data to generate at least one interactive display presenting results of the at least one comparative analysis; and outputting the at least one interactive display;

wherein performing the at least one comparative analysis comprises determining an effect of the at least one event on resource usage;

and wherein receiving user input specifying parameters comprises:

receiving user input indicating whether comparative analysis results should be publicly available;

responsive to the user input indicating that comparative analysis results should not be publicly available, receiving input specifying entities authorized to view the comparative analysis results; and responsive to a request from a requestor for the comparative analysis results:
  responsive to the user input indicating that comparative analysis results should be publicly available, making the comparative analysis results available to the requestor; and
  responsive to the user input indicating that comparative analysis results should not be publicly available:
    attempting to authenticate the identity of the requestor; and
    responsive to successful authentication of the identity of the requestor, and responsive to the authenticated identity indicating that the requestor is an authorized entity, making the comparative analysis results available to the requestor.

5. A computer-implemented method for generating and displaying a user interface for interactive presentation of comparative resource usage data, comprising:

collecting, via at least one electronic monitoring device, resource usage data associated with a plurality of entities, wherein the resource usage data indicates a consumption quantity for at least one selected from the group consisting of electricity, natural gas, and water;

storing the collected resource usage data at an electronic storage device associated with a server;

at an input device, receiving user input specifying parameters for at least one comparative analysis of the collected resource usage data;

at the input device, receiving user input specifying at least one event;

based on the user input:
  performing at least one comparative analysis according to the specified parameters; and
  transforming the stored resource usage data to generate at least one interactive display presenting results of the at least one comparative analysis;

receiving, at the server, a request from a client machine for results of the comparative analysis; and transmitting, to the client machine, data enabling the client machine to output the least one interactive display;

wherein performing the at least one comparative analysis comprises determining an effect of the at least one event on resource usage.

6. The computer-implemented method of claim 5, wherein:

receiving the request at the server comprises receiving the request via an electronic communications network; and transmitting the at least one interactive display to the client machine comprises transmitting the at least one interactive display via the electronic communications network.

7. A computer-implemented method for generating and displaying a user interface for interactive presentation of comparative resource usage data, comprising:

collecting, via at least one electronic monitoring device, resource usage data associated with a plurality of entities, wherein the resource usage data indicates a consumption quantity for at least one selected from the group consisting of electricity, natural gas, and water;

storing, in an electronic storage device, the collected resource usage data;

at an input device, receiving user input specifying parameters for at least one comparative analysis of the collected resource usage data;

at the input device, receiving user input specifying at least one event;

based on the user input:
  performing at least one comparative analysis according to the specified parameters; and
  transforming the stored resource usage data to generate at least one interactive display presenting results of the at least one comparative analysis; and
outputting the at least one interactive display;
wherein performing the at least one comparative analysis comprises determining an effect of the at least one event on resource usage;
and wherein each entity comprises at least one selected from the group consisting of:
an individual;
a family;
a group;
a corporation;
an organization;
an institution;
at least one division within an organization;
at least one department within an organization;
a building;
a municipality;
a geographically defined set of entities;
a utility district;
a service area;
a zone;
a sub-zone;
a climatic zone;
a residence;
a floor;
a room; and
an office.

8. A computer-implemented method for generating and displaying a user interface for interactive presentation of comparative resource usage data, comprising:
  collecting, via at least one electronic monitoring device, resource usage data associated with a plurality of entities, wherein the resource usage data indicates a consumption quantity for at least one selected from the group consisting of electricity, natural gas, and water;
  storing, in an electronic storage device, the collected resource usage data;
  at an input device, receiving user input specifying parameters for at least one comparative analysis of the collected resource usage data;
  at the input device, receiving user input specifying at least one event;
  based on the user input:
    performing at least one comparative analysis according to the specified parameters; and
    transforming the stored resource usage data to generate at least one interactive display presenting results of the at least one comparative analysis; and
  outputting the at least one interactive display;
  wherein performing the at least one comparative analysis comprises:
    determining an effect of the at least one event on resource usage; and
    determining a comparative rank for at least a subset of the entities with respect to resource usage.

9. A computer-implemented method for generating and displaying a user interface for interactive presentation of comparative resource usage data, comprising:
  collecting, via at least one electronic monitoring device, resource usage data associated with a plurality of entities, wherein the resource usage data indicates a consumption quantity for at least one selected from the group consisting of electricity, natural gas, and water;
  storing, in an electronic storage device, the collected resource usage data;
  at an input device, receiving user input specifying parameters for at least one comparative analysis of the collected resource usage data;
  based on the user input:
    performing at least one comparative analysis according to the specified parameters; and
    transforming the stored resource usage data to generate at least one interactive display presenting results of the at least one comparative analysis;
  outputting the at least one interactive display;
  making available, via an electronic communications medium, a tradable offset corresponding to a change in resource usage based on the comparative analysis;
  providing access, via the electronic communications medium, to a marketplace enabling transactions in tradable offsets; and
  responsive to user input received via the electronic communications medium, initiating at least one transaction in at least one tradable offset.

10. The computer-implemented method of claim 9, wherein the tradable offset comprises a carbon offset.

11. A computer-implemented method for generating and displaying a user interface for interactive presentation of comparative resource usage data, comprising:
  collecting, via at least one electronic monitoring device, resource usage data associated with a plurality of entities, wherein the resource usage data indicates a consumption quantity for at least one selected from the group consisting of electricity, natural gas, and water;
  storing, in an electronic storage device, the collected resource usage data;
  at an input device, receiving user input specifying parameters for at least one comparative analysis of the collected resource usage data;
  at the input device, receiving user input specifying at least one event;
  based on the user input:
    performing at least one comparative analysis according to the specified parameters; and
    transforming the stored resource usage data to generate at least one interactive display presenting results of the at least one comparative analysis;
  outputting the at least one interactive display; and
  configuring the at least one interactive display by:
    presenting at an output device, a plurality of user interface components; and
    receiving, via an input device, user input selecting and configuring at least one of the user interface components;
  wherein performing the at least one comparative analysis comprises determining an effect of the at least one event on resource usage;
  and wherein transforming the stored resource usage data to generate at least one interactive display comprises generating at least one interactive display according to the selected and configured user interface components.

12. A computer program product for generating and displaying a user interface for interactive presentation of comparative resource usage data, comprising:
  a nontransitory computer-readable storage medium; and
  computer program code, encoded on the medium, configured to cause a processor to perform the steps of:

collecting, via at least one electronic monitoring device, resource usage data associated with a plurality of entities, wherein the resource usage data indicates a consumption quantity for at least one selected from the group consisting of electricity, natural gas, and water;

storing, in an electronic storage device, the collected resource usage data;

receiving user input via an input device, the user input specifying parameters for at least one comparative analysis of the collected resource usage data, the at least one comparative analysis comprising a competition among entities;

receiving user input via an input device, the user input specifying at least one event;

based on the user input:
performing the at least one comparative analysis according to the specified parameters; and
transforming the stored resource usage data to generate at least one interactive display presenting results of the comparative analysis indicating standings for the competition; and causing an output device to output the at least one interactive display;

wherein the computer program code configured to cause a processor to perform the at least one comparative analysis comprises computer program code configured to cause a processor to determine an effect of the at least one event on resource usage.

13. The computer program product of claim 12, wherein the computer program code configured to cause a processor to receive user input specifying parameters comprises computer program code configured to cause a processor to receive at least one selected from the group consisting of:
a duration for the competition;
a set of entities participating in the competition;
a type of resource for which usage is to be compared in the competition;
a baseline;
a baseline calculation method;
notification options;
a ranking methodology for generating rankings based on comparative resource usage;
an incentive for participating in the competition; and
an incentive to be awarded based on results of the competition.

14. A computer program product for generating and displaying a user interface for interactive presentation of comparative resource usage data, comprising:
a nontransitory computer-readable storage medium; and
computer program code, encoded on the medium, configured to cause a processor to perform the steps of:
collecting, via at least one electronic monitoring device, resource usage data associated with a plurality of entities, wherein the resource usage data indicates a consumption quantity for at least one selected from the group consisting of electricity, natural gas, and water;
storing, in an electronic storage device, the collected resource usage data;
receiving user input via an input device, the user input specifying parameters for at least one comparative analysis of the collected resource usage data;
receiving user input via an input device, the user input specifying at least one event;
based on the user input:
performing the at least one comparative analysis according to the specified parameters; and
transforming the stored resource usage data to generate at least one interactive display presenting results of the at least one comparative analysis; and
causing an output device to output the at least one interactive display;
wherein the computer program code configured to cause a processor to perform the at least one comparative analysis comprises computer program code configured to cause a processor to determine an effect of the at least one event on resource usage;
and wherein the computer program code configured to cause a processor to receive user input specifying parameters comprises computer program code configured to cause a processor to receive at least one selected from the group consisting of:
a duration for the comparative analysis;
a set of entities for which resource usage data is to be compared;
a type of resource for which usage is to be compared;
a baseline;
a baseline calculation method;
notification options; and
a ranking methodology for generating comparative rankings of compared entities.

15. A computer program product for generating and displaying a user interface for interactive presentation of comparative resource usage data, comprising:
a nontransitory computer-readable storage medium; and
computer program code, encoded on the medium, configured to cause a processor to perform the steps of:
collecting, via at least one electronic monitoring device, resource usage data associated with a plurality of entities, wherein the resource usage data indicates a consumption quantity for at least one selected from the group consisting of electricity, natural gas, and water;
storing, in an electronic storage device, the collected resource usage data;
receiving user input via an input device, the user input specifying parameters for at least one comparative analysis of the collected resource usage data;
receiving user input via an input device, the user input specifying at least one event;
based on the user input:
performing the at least one comparative analysis according to the specified parameters; and
transforming the stored resource usage data to generate at least one interactive display presenting results of the at least one comparative analysis; and
causing an output device to output the at least one interactive display;
wherein the computer program code configured to cause a processor to perform the at least one comparative analysis comprises computer program code configured to cause a processor to determine an effect of the at least one event on resource usage;
and wherein the computer program code configured to cause a processor to receive user input comprises computer program code configured to cause a processor to perform the steps of:
receiving user input indicating whether comparative analysis results should be publicly available;
responsive to the user input indicating that comparative analysis results should not be publicly available, receiving input specifying entities authorized to view the comparative analysis results; and responsive to a request from a requestor for the comparative analysis results:

responsive to the user input indicating that comparative analysis results should be publicly available, making the comparative analysis results available to the requestor; and responsive to the user input indicating that comparative analysis results should not publicly available:

attempting to authenticate the identity of the requestor; and responsive to successful authentication of the identity of the requestor, and responsive to the authenticated identity indicating that the requestor is an authorized entity, making the comparative analysis results available to the requestor.

16. A computer program product for generating and displaying a user interface for interactive presentation of comparative resource usage data, comprising:

a nontransitory computer-readable storage medium; and computer program code, encoded on the medium, configured to cause a processor to perform the steps of:

collecting, via at least one electronic monitoring device, resource usage data associated with a plurality of entities, wherein the resource usage data indicates a consumption quantity for at least one selected from the group consisting of electricity, natural gas, and water;

storing the collected resource usage data at an electronic storage device associated with a server;

receiving user input via an input device, the user input specifying parameters for at least one comparative analysis of the collected resource usage data;

receiving user input via an input device, the user input specifying at least one event;

based on the user input:

performing the at least one comparative analysis according to the specified parameters; and transforming the stored resource usage data to generate at least one interactive display presenting results of the at least one comparative analysis; and receiving, at the server, a request from a client machine for results of the comparative analysis; and transmitting, to the client machine, data enabling the client machine to output the least one interactive display;

wherein the computer program code configured to cause a processor to perform the at least one comparative analysis comprises computer program code configured to cause a processor to determine an effect of the at least one event on resource usage.

17. The computer program product of claim 16, wherein:

the computer program code configured to cause a processor to receive the request at the server comprises computer program code configured to cause a processor to receive the request via an electronic communications network; and the computer program code configured to cause a processor to transmit the at least one interactive display to the client machine comprises computer program code configured to cause a processor to transmit the at least one interactive display via the electronic communications network.

18. A computer program product for generating and displaying a user interface for interactive presentation of comparative resource usage data, comprising:

a nontransitory computer-readable storage medium; and computer program code, encoded on the medium, configured to cause a processor to perform the steps of:

collecting, via at least one electronic monitoring device, resource usage data associated with a plurality of entities, wherein the resource usage data indicates a consumption quantity for at least one selected from the group consisting of electricity, natural gas, and water;

storing, in an electronic storage device, the collected resource usage data;

receiving user input via an input device, the user input specifying parameters for at least one comparative analysis of the collected resource usage data;

receiving user input via an input device, the user input specifying at least one event;

based on the user input:

performing the at least one comparative analysis according to the specified parameters; and transforming the stored resource usage data to generate at least one interactive display presenting results of the at least one comparative analysis; and causing an output device to output the at least one interactive display;

wherein the computer program code configured to cause a processor to perform the at least one comparative analysis comprises computer program code configured to cause a processor to determine an effect of the at least one event on resource usage;

and wherein each entity comprises at least one selected from the group consisting of:

an individual;
a family;
a group;
a corporation;
an organization;
an institution;
at least one division within an organization;
at least one department within an organization;
a building;
a municipality;
a geographically defined set of entities;
a utility district;
a service area;
a zone;
a sub-zone;
a climatic zone;
a residence;
a floor;
a room; and
an office.

19. A computer program product for generating and displaying a user interface for interactive presentation of comparative resource usage data, comprising:

a nontransitory computer-readable storage medium; and computer program code, encoded on the medium, configured to cause a processor to perform the steps of:

collecting, via at least one electronic monitoring device, resource usage data associated with a plurality of entities, wherein the resource usage data indicates a consumption quantity for at least one selected from the group consisting of electricity, natural gas, and water;

storing, in an electronic storage device, the collected resource usage data;

receiving user input via an input device, the user input specifying parameters for at least one comparative analysis of the collected resource usage data;

receiving user input via an input device, the user input specifying at least one event;

based on the user input:

performing the at least one comparative analysis according to the specified parameters; and transforming the stored resource usage data to generate at least one interactive display presenting results of the at least one comparative analysis; and causing an output device to output the at least one interactive display;

wherein the computer program code configured to cause a processor to perform the at least one comparative analysis comprises:

computer program code configured to cause a processor to determine an effect of the at least one event on resource usage; and computer program code configured to cause a processor to determine a comparative rank for at least a subset of the entities with respect to resource usage.

20. A computer program product for generating and displaying a user interface for interactive presentation of comparative resource usage data, comprising:

a nontransitory computer-readable storage medium; and computer program code, encoded on the medium, configured to cause a processor to perform the steps of:

collecting, via at least one electronic monitoring device, resource usage data associated with a plurality of entities, wherein the resource usage data indicates a consumption quantity for at least one selected from the group consisting of electricity, natural gas, and water;

storing, in an electronic storage device, the collected resource usage data;

receiving user input via an input device, the user input specifying parameters for at least one comparative analysis of the collected resource usage data;

based on the user input:

performing the at least one comparative analysis according to the specified parameters; and transforming the stored resource usage data to generate at least one interactive display presenting results of the at least one comparative analysis; and causing an output device to output the at least one interactive display;

making available, via an electronic communications medium, a tradable offset corresponding to a change in resource usage based on the comparative analysis;

providing access, via the electronic communications medium, to a marketplace enabling transactions in tradable offsets; and responsive to user input received via the electronic communications medium, initiating at least one transaction in at least one tradable offset.

21. The computer program product of claim 20, wherein the tradable offset comprises a carbon offset.

22. A computer program product for generating and displaying a user interface for interactive presentation of comparative resource usage data, comprising:

a nontransitory computer-readable storage medium; and computer program code, encoded on the medium, configured to cause a processor to perform the steps of:

collecting, via at least one electronic monitoring device, resource usage data associated with a plurality of entities, wherein the resource usage data indicates a consumption quantity for at least one selected from the group consisting of electricity, natural gas, and water;

storing, in an electronic storage device, the collected resource usage data;

receiving user input via an input device, the user input specifying parameters for at least one comparative analysis of the collected resource usage data;

receiving user input via an input device, the user input specifying at least one event;

based on the user input:

performing the at least one comparative analysis according to the specified parameters; and transforming the stored resource usage data to generate at least one interactive display presenting results of the at least one comparative analysis;

causing an output device to output the at least one interactive display; and configuring the at least one interactive display by:

presenting at an output device, a plurality of user interface components; and receiving, via an input device, user input selecting and configuring at least one of the user interface components;

wherein the computer program code configured to cause a processor to perform the at least one comparative analysis comprises computer program code configured to cause a processor to determine an effect of the at least one event on resource usage;

and wherein the computer program code configured to cause a processor to transform the stored resource usage data to generate at least one interactive display comprises computer program code configured to cause a processor to generate at least one interactive display according to the selected and configured user interface components.

23. A system for generating and displaying a user interface for interactive presentation of comparative resource usage data, comprising:

at least one electronic monitoring device, configured to collect resource usage data associated with a plurality of entities, wherein the resource usage data indicates a consumption quantity for at least one selected from the group consisting of electricity, natural gas, and water;

an electronic storage device, communicatively coupled to the at least one electronic monitoring device, configured to store the collected resource usage data;

an input device, configured to receive user input specifying parameters for at least one comparative analysis of the collected resource usage data, the at least one comparative analysis comprising a competition among entities, and further configured to receive user input specifying at least one event; and an electronic processing device, communicatively coupled to the input device and to the electronic storage device, configured to, based on the user input:

perform the at least one comparative analysis according to the specified parameters;

transform the stored resource usage data to generate at least one interactive display presenting results of the comparative analysis indicating standings for the competition; and
determine an effect of the at least one event on resource usage; and
an output device, communicatively coupled to the electronic processing device, configured to output the at least one interactive display.

24. The system of claim 23, wherein the input device is configured to receive user input specifying at least one selected from the group consisting of:
a duration for the competition;
a set of entities participating in the competition;
a type of resource for which usage is to be compared in the competition;
a baseline;
a baseline calculation method;
notification options;
a ranking methodology for generating rankings based on comparative resource usage;
an incentive for participating in the competition; and
an incentive to be awarded based on results of the competition.

25. A system for generating and displaying a user interface for interactive presentation of comparative resource usage data, comprising:
at least one electronic monitoring device, configured to collect resource usage data associated with a plurality of entities, wherein the resource usage data indicates a consumption quantity for at least one selected from the group consisting of electricity, natural gas, and water;
an electronic storage device, communicatively coupled to the at least one electronic monitoring device, configured to store the collected resource usage data;
an input device, configured to receive user input specifying parameters for at least one comparative analysis of the collected resource usage data and further configured to receive user input specifying at least one event; and
an electronic processing device, communicatively coupled to the input device and to the electronic storage device, configured to, based on the user input:
perform the at least one comparative analysis according to the specified parameters;
transform the stored resource usage data to generate at least one interactive display presenting results of the at least one comparative analysis; and
determine an effect of the at least one event on resource usage; and
an output device, communicatively coupled to the electronic processing device, configured to output the at least one interactive display;
wherein the input device is configured to receive user input specifying at least one selected from the group consisting of:
a duration for the comparative analysis;
a set of entities for which resource usage data is to be compared;
a type of resource for which usage is to be compared;
a baseline;
a baseline calculation method;
notification options; and
a ranking methodology for generating comparative rankings of compared entities.

26. A system for generating and displaying a user interface for interactive presentation of comparative resource usage data, comprising:
at least one electronic monitoring device, configured to collect resource usage data associated with a plurality of entities, wherein the resource usage data indicates a consumption quantity for at least one selected from the group consisting of electricity, natural gas, and water;
an electronic storage device, communicatively coupled to the at least one electronic monitoring device, configured to store the collected resource usage data;
an input device, configured to receive user input specifying parameters for at least one comparative analysis of the collected resource usage data and further configured to receive user input specifying at least one event; and
an electronic processing device, communicatively coupled to the input device and to the electronic storage device, configured to, based on the user input:
perform the at least one comparative analysis according to the specified parameters;
transform the stored resource usage data to generate at least one interactive display presenting results of the at least one comparative analysis; and
determine an effect of the at least one event on resource usage;
an output device, communicatively coupled to the electronic processing device, configured to output the at least one interactive display; and
a network interface, communicatively coupled to the electronic processing device, configured to transmit the results of the at least one comparative analysis to a requestor in response to a request for the analysis.

27. The system of claim 26, further comprising an authentication module, configured to authenticate identity of a requestor of comparative analysis results, and wherein the network interface is configured to transmit the results of the at least one comparative analysis to the requestor in response to the requestor identity being authenticated and the authenticated identity indicating that the requestor is authorized to receive the comparative analysis results.

28. A system for generating and displaying a user interface for interactive presentation of comparative resource usage data, comprising:
at least one electronic monitoring device, configured to collect resource usage data associated with a plurality of entities, wherein the resource usage data indicates a consumption quantity for at least one selected from the group consisting of electricity, natural gas, and water;
an electronic storage device associated with a server and communicatively coupled to the at least one electronic monitoring device, configured to store the collected resource usage data;
an input device, configured to receive user input specifying parameters for at least one comparative analysis of the collected resource usage data and further configured to receive user input specifying at least one event; and
an electronic processing device, communicatively coupled to the input device and to the electronic storage device, configured to, based on the user input:
perform the at least one comparative analysis according to the specified parameters;
transform the stored resource usage data to generate at least one interactive display presenting results of the at least one comparative analysis; and
determine an effect of the at least one event on resource usage;
an output device, associated with a client machine and communicatively coupled to the electronic processing device, configured to output the at least one interactive display; and a network interface, configured to transmit, from the server to the client machine, data enabling the client machine to output the least one interactive display.

29. A system for generating and displaying a user interface for interactive presentation of comparative resource usage data, comprising:
  at least one electronic monitoring device, configured to collect resource usage data associated with a plurality of entities, wherein the resource usage data indicates a consumption quantity for at least one selected from the group consisting of electricity, natural gas, and water;
  an electronic storage device, communicatively coupled to the at least one electronic monitoring device, configured to store the collected resource usage data;
  an input device, configured to receive user input specifying parameters for at least one comparative analysis of the collected resource usage data and further configured to receive user input specifying at least one event; and
  an electronic processing device, communicatively coupled to the input device and to the electronic storage device, configured to, based on the user input:
    perform the at least one comparative analysis according to the specified parameters;
    transform the stored resource usage data to generate at least one interactive display presenting results of the at least one comparative analysis; and
    determine an effect of the at least one event on resource usage; and
  an output device, communicatively coupled to the electronic processing device, configured to output the at least one interactive display;
  wherein each entity comprises at least one selected from the group consisting of:
  an individual;
  a family;
  a group;
  a corporation;
  an organization;
  an institution;
  at least one division within an organization;
  at least one department within an organization;
  a building;
  a municipality;
  a geographically defined set of entities;
  a utility district;
  a service area;
  a zone;
  a sub-zone;
  a climatic zone;
  a residence;
  a floor;
  a room; and
  an office.

30. A system for generating and displaying a user interface for interactive presentation of comparative resource usage data, comprising:
  at least one electronic monitoring device, configured to collect resource usage data associated with a plurality of entities, wherein the resource usage data indicates a consumption quantity for at least one selected from the group consisting of electricity, natural gas, and water;
  an electronic storage device, communicatively coupled to the at least one electronic monitoring device, configured to store the collected resource usage data;
  an input device, configured to receive user input specifying parameters for at least one comparative analysis of the collected resource usage data and further configured to receive user input specifying at least one event; and
  an electronic processing device, communicatively coupled to the input device and to the electronic storage device, configured to, based on the user input:
    perform the at least one comparative analysis according to the specified parameters;
    transform the stored resource usage data to generate at least one interactive display presenting results of the at least one comparative analysis; and
    determine an effect of the at least one event on resource usage; and
  an output device, communicatively coupled to the electronic processing device, configured to output the at least one interactive display;
  wherein the electronic processing device is configured to determine a comparative rank for at least a subset of the entities with respect to resource usage.

31. A system for generating and displaying a user interface for interactive presentation of comparative resource usage data, comprising:
  at least one electronic monitoring device, configured to collect resource usage data associated with a plurality of entities, wherein the resource usage data indicates a consumption quantity for at least one selected from the group consisting of electricity, natural gas, and water;
  an electronic storage device, communicatively coupled to the at least one electronic monitoring device, configured to store the collected resource usage data;
  an input device, configured to receive user input specifying parameters for at least one comparative analysis of the collected resource usage data; and
  an electronic processing device, communicatively coupled to the input device and to the electronic storage device, configured to, based on the user input:
    perform the at least one comparative analysis according to the specified parameters; and
    transform the stored resource usage data to generate at least one interactive display presenting results of the at least one comparative analysis;
  and further configured to make available a tradable offset corresponding to a change in resource usage based on the comparative analysis;
  an output device, communicatively coupled to the electronic processing device, configured to output the at least one interactive display; and
  a network interface, configured to provide access to a marketplace enabling transactions in tradable offsets, and further configured to, responsive to user input received via the input device, initiate at least one transaction in at least one tradable offset.

32. The system of claim 31, wherein the tradable offset comprises a carbon offset.

33. A system for generating and displaying a user interface for interactive presentation of comparative resource usage data, comprising:
  at least one electronic monitoring device, configured to collect resource usage data associated with a plurality of entities, wherein the resource usage data indicates a consumption quantity for at least one selected from the group consisting of electricity, natural gas, and water;
  an electronic storage device, communicatively coupled to the at least one electronic monitoring device, configured to store the collected resource usage data;
  an input device, configured to receive user input specifying parameters for at least one comparative analysis of the collected resource usage data and further configured to receive user input specifying at least one event; and an electronic processing device, communicatively coupled to the input device and to the electronic storage device, configured to, based on the user input:

perform the at least one comparative analysis according to the specified parameters;

transform the stored resource usage data to generate at least one interactive display presenting results of the at least one comparative analysis; and determine an effect of the at least one event on resource usage; and an output device, communicatively coupled to the electronic processing device, configured to present a plurality of user interface components and to output the at least one interactive display;

wherein:

the input device is configured to receive user input selecting and configuring at least one of the user interface components; and the electronic processing device is configured to generate at least one interactive display according to the selected and configured user interface components.

* * * * *